(12) United States Patent
Tsuchiya et al.

(10) Patent No.: US 9,880,429 B2
(45) Date of Patent: Jan. 30, 2018

(54) LIQUID CRYSTAL DISPLAY DEVICE

(71) Applicant: Sharp Kabushiki Kaisha, Osaka (JP)

(72) Inventors: Hiroshi Tsuchiya, Osaka (JP); Tsuyoshi Okazaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 285 days.

(21) Appl. No.: 14/430,121

(22) PCT Filed: Sep. 19, 2013

(86) PCT No.: PCT/JP2013/075221
§ 371 (c)(1),
(2) Date: Mar. 20, 2015

(87) PCT Pub. No.: WO2014/050672
PCT Pub. Date: Apr. 3, 2014

(65) Prior Publication Data
US 2015/0234244 A1    Aug. 20, 2015

(30) Foreign Application Priority Data

Sep. 26, 2012    (JP) .................................. 2012-212745

(51) Int. Cl.
*G02F 1/1343* (2006.01)
*G02F 1/1335* (2006.01)

(52) U.S. Cl.
CPC .. *G02F 1/134363* (2013.01); *G02F 1/133528* (2013.01); *G02F 1/134309* (2013.01); *G02F 2001/134318* (2013.01)

(58) Field of Classification Search
CPC ................................................ G02F 1/134363
See application file for complete search history.

(56) References Cited

U.S. PATENT DOCUMENTS

| 6,266,116 B1 | 7/2001 | Ohta et al. |
| 6,281,958 B1 | 8/2001 | Nakajima |
| 2002/0008799 A1* | 1/2002 | Ota ................... G02F 1/134363 349/43 |

FOREIGN PATENT DOCUMENTS

| JP | 3383205 B2 | 3/2003 |
| JP | 3427611 B2 | 7/2003 |
| JP | 2003-280037 A | 10/2003 |

\* cited by examiner

*Primary Examiner* — Wen-Ying P Chen
(74) *Attorney, Agent, or Firm* — Chen Yoshimura LLP

(57) ABSTRACT

The present invention provides a liquid crystal display device that is capable of achieving good display characteristics even if the pixel size is reduced. A liquid crystal display device of the present invention includes a first substrate, a second substrate and a liquid crystal layer that is sandwiched between the first substrate and the second substrate. The liquid crystal layer contains a liquid crystal material that has negative dielectric anisotropy. The first substrate has a first hook-like electrode and a second hook-like electrode, which are independent from each other. When the first substrate is seen in a plan view, the inner profile line of the first hook-like electrode and the inner profile line of the second hook-like electrode face each other.

17 Claims, 45 Drawing Sheets

LIQUID CRYSTAL DISPLAY DEVICE

TECHNICAL FIELD

The present invention relates to a liquid crystal display device. More specifically, the present invention relates to a horizontal electric field-type liquid crystal display device.

BACKGROUND ART

The liquid crystal display device is a device that controls whether to transmit/shield light by controlling the orientation of liquid crystal molecules having birefringent properties. Liquid crystal orientation modes in liquid crystal display devices include a twisted nematic (TN) mode in which liquid crystal molecules having positive dielectric anisotropy are aligned in a state of being twisted through 90° when viewed along the substrate normal direction, a vertical alignment (VA) mode in which liquid crystal molecules having negative dielectric anisotropy are aligned perpendicular to the substrate surface, an in-plane switching (IPS) mode in which the liquid crystal molecules having positive or negative dielectric anisotropy are aligned so as to be horizontal with respect to the substrate surface and a horizontal electric field is applied to the liquid crystal layer, and a fringe field switching (FFS) mode.

One widespread method for driving liquid crystal display devices is an active matrix driving method. According to this method, active devices such as thin-film transistors (TFTs) are provided at each pixel and a high image quality is realized. An array substrate including a plurality of TFTs and pixel electrodes has a plurality of pixel scan signal lines and a plurality of data signal lines that intersect with each other, and a TFT is provided at each intersection. Each TFT is connected to the pixel electrode and the supply of the image signal to the pixel electrode is controlled using the TFT switching function. The array substrate or an opposite substrate is further provided with a common electrode, and a voltage is applied within the liquid crystal layer via a pair of electrodes.

In IPS mode, which is one of the modes for controlling the orientation of the liquid crystal molecules by applying a lateral electric field, the pixel electrode and the common electrode are formed on the same substrate, and both electrodes are formed to have a plurality of comb-tooth projections. The comb-teeth projections of the pixel electrode and the comb-tooth projections of the common electrodes are parallel to each other. The orientation of the liquid crystal molecules is controlled based on the potential difference between the comb-teeth projections of the pixel electrode and the comb-tooth projections of the common electrode. The comb-tooth projections of the electrodes may be configured with a portion that is bent. By such a method it is possible to achieve excellent viewing angle characteristics (for example, see Patent Documents 1 to 3).

RELATED ART DOCUMENTS

Patent Documents

Patent Document 1: Japanese Patent No. 3427611 Specification
Patent Document 2: Japanese Patent No. 3383205 Specification
Patent Document 3: Japanese Patent Application Laid-Open Publication No. 2003-280037

SUMMARY OF THE INVENTION

Problems to be Solved by the Invention

The inventors noticed a shift to higher pixel resolutions and carried out wide-ranging research on designs in anticipation of smaller pixel sizes. In the course of this research, they discovered that with electrode structures of the conventional lateral electric field modes (IPS mode, FFS mode and the like), it was not always possible to secure sufficient transmittance. FIG. 66 is a schematic plan view showing an example of electrode arrangements in a conventional IPS mode liquid crystal display device. As illustrated in FIG. 66, in a conventional liquid crystal display device of the IPS mode, each pixel includes a pixel electrode 111 and a common electrode 115, each electrode having a plurality of comb-tooth projections, and a portion of each projection being bent to provide a V-like form. Wide viewing angle characteristics are obtained with an arrangement in which the lengthwise direction of the comb-tooth projections of the electrodes 111 and 115 are inclined with respect to the wiring.

However, when the comb-tooth projections with the V-like form are employed, the number of comb-tooth projections that can be formed comes to be restricted as the pixel size is reduced and, consequently, the per-pixel transmittance drops. The reason for this drop is that it is difficult to ensure that a strong electric field covers the liquid crystal molecules positioned far away from the electrodes. Hence, it is not possible to obtain the desired orientation. As a result, areas positioned at the corners of the pixels become dark areas (the areas indicated by the dashed line in the right hand figure of FIG. 66). If the pixel size is sufficiently large, the occurrence of dark areas does not preclude a bright display overall due to the compensating action of the brightness in other areas. However, as pixel size is reduced, the proportion of the surface area of the entire pixel occupied by the dark areas increases. Hence, for higher resolution pixels, the effect of the drop in transmittance becomes more pronounced.

Another way of making the comb-tooth projections of the pixel electrode 111 and the common electrode 115 fit the shape of the pixel would be to alter the V-like form to a linear form. However, in this case, viewing angle characteristics, which provide the advantages of the IPS mode, cannot be obtained to a sufficient extent.

Moreover, use of other modes in place of the IPS mode might also be considered. However, when the pixel size is reduced, the only mode that provides a high transmittance is the TN mode, and the TN mode has issues with the viewing angle characteristics. Thus, currently, there is no way to achieve both high transmittance and wide viewing angle characteristics.

The present invention was conceived upon consideration of the above-described situation with the aim of providing a liquid crystal display device capable of achieving preferable display characteristics even after pixel size is reduced.

Means for Solving the Problem

The inventors turned their attention to the structure of the pixel electrode and the common electrode, making a judgment that it is difficult to simultaneously achieve a high transmittance and wide viewing angle characteristics by simply changing the form of the comb-tooth projections of the pixel electrode and the common electrode in the conventional manner. As well as examining the issue of the combination of the pixel electrode and the common electrode each having the plurality of comb-tooth projections, the inventors made an intensive study of the particular case in which a liquid crystal material having negative dielectric anisotropy is used. As a result, they discovered that the orientation of the liquid crystal molecules could be controlled by adjusting the form of each of the pixel electrode and the common electrode so as to have, when the substrate is viewed in a plan view, a portion with an angled hook form, and arranging the electrodes so that inner profile lines at the corner portions of the pair of hook-like electrodes face each other. Further, they found that by arranging the electrodes as described, it is possible to control the orientation of the liquid crystal molecules with fewer electrodes and also to support the case in which the pixel size is small.

Thus, the inventors conceived that they would able to solve the above-described problems and thereby arrived at the present invention.

Specifically, one aspect of the present invention is a liquid crystal display device including a first substrate; a second substrate; and a liquid crystal layer sandwiched between the first substrate and the second substrate, wherein the liquid crystal layer includes liquid crystal material having negative dielectric anisotropy, wherein the first substrate includes a first hook-like electrode and a second hook-like electrode that are electrically isolated from each other, and wherein, when the first substrate is seen in a plan view, an inner profile line of the first hook-like electrode and an inner profile line of the second hook-like electrode face one another.

The above-described liquid crystal display device includes the first substrate, the second substrate and the liquid crystal layer sandwiched between the first substrate and the second substrate. The first substrate includes the first hook-like electrode and the second hook-like electrode that are independent of each other. An electric field is formed within the liquid crystal layer based on a potential difference between the first and second hook-like electrodes. Depending on the strength of the electric field, the orientation of the liquid crystal molecules changes, thereby adjusting an amount of light passing through and controlling ON and OFF of the display. There are no particular limits on the potential difference supplied to the first and second hook-like electrodes. The potential differences can be adjusted as appropriate according to the design.

In the present specification, "hook-like electrode" is used to mean an electrode having an abruptly turning section (corner portion) and sections (end portions) positioned to both sides so as to sandwich the corner portion. Further, "inner profile line" is used to mean the line that forms an outer edge on the abruptly turning side (acute angle side) on an inner side of the "hook-like electrode" when the first substrate is viewed in a plan view. Similarly, "outer profile line" is used to mean the line that forms the outer edge on the turning side (obtuse angle side) on the outer side of the "hook-like" electrode.

The above-described liquid crystal display device is formed to include the above-described elements as essential elements. Provided that these elements are included, the configuration is not limited by other elements thereof. For instance, the above-described first and second hook-like electrodes may be provided with other electrodes (such as third, fourth and higher numbered electrodes), which may or may not be hook-like electrodes.

In the following, preferable embodiments of the above-described liquid crystal display device are described in detail. Note that any two or more of the preferable embodiments of the display device to be described below can be combined to form another preferable embodiment of the liquid crystal display device.

To further improve orientation control properties of the liquid crystal molecules, it is preferable that, when the first substrate is viewed in a plan view, a tip of at least one end portion of the first hook-like electrode be pointed, and more preferable that both end portions be pointed. Further, when the first substrate is viewed in a plan view, it is preferable that a tip of at least one end portion of the second hook-like electrode be pointed, and more preferable that both end portions be pointed. With this arrangement, it is less likely that orientation disorder of the liquid crystal will occur in proximity to the end portions of the hook-like electrodes. Accordingly, a liquid crystal orientation of high uniformity can be achieved over the entire region surrounded by the pair of hook-like electrodes.

To further improve orientation control properties of the liquid crystal molecules, it is preferable that, when the first substrate is seen in a plan view, the inner profile line of the first hook-like electrode be formed by at least three lines having different angles. Further, when the first substrate is seen in a plan view, it is preferable that the inner profile line of the second hook-like electrode be formed by at least three lines having different angles. With this arrangement, it is less likely that orientation disorder of the liquid crystal will occur in proximity to corner portions of the hook-like electrodes. Accordingly, a liquid crystal orientation of high uniformity can be achieved over the entire region surrounded by the pair of hook-like electrodes. To further improve orientation control properties of the liquid crystal molecules, it is preferable that, when the first substrate is seen in a plan view, any line among at least three lines having different angles of the inner profile line of the first hook-like electrode be parallel to a line among at least three lines having different angles of the inner profile line of the second hook-like electrode.

To further improve the degree of freedom of the design, it is preferable that, when the first substrate is seen in a plan view, two lines among the at least three lines having different angles of the inner profile line of the first hook-like electrode be perpendicular to each other. Further, it is preferable that, when the first substrate is seen in a plan view, two lines among the at least three lines having different angles of the inner profile line of the second hook-like electrode be perpendicular to each other. According to electrode arrangements of this type, the enclosure effect with respect to the liquid crystal molecules, which are controlled by the electric field formed between the first hook-like electrode and the second hook-like electrode, is larger. As a result, the configuration enables approximately the same transmittance and viewing angle characteristics to be obtained irrespective of the initial alignment orientation, thereby increasing the degree of freedom in the design.

To further improve orientation control properties of the liquid crystal molecules, it is preferable that, when the first substrate is seen in a plan view, the inner profile line of the first hook-like electrode be curved. Further, it is preferable that, when the first substrate is seen in a plan view, the inner profile line of the second hook-like electrode be curved. With this arrangement, it is less likely that orientation disorder of the liquid crystal will occur in proximity to corner portions of the hook-like electrodes. Accordingly, a liquid crystal orientation of high uniformity can be achieved over the entire region surrounded by the pair of hook-like electrodes.

To further improve orientation control properties of the liquid crystal molecules, it is preferable that, when the first substrate is seen in a plan view, the first hook-like electrode and the second hook-like electrode be line-symmetrical to each other about a straight reference axis that passes between the first hook-like electrode and the second hook-like electrode. Accordingly, the symmetry of the electric field formed by the pair of hook-like electrodes is improved, and highly uniform liquid crystal orientation can be achieved.

To further improve orientation control properties of the liquid crystal molecules, it is preferable that, when the first substrate is seen in a plan view, the first hook-like electrode and the second hook-like electrode be point-symmetrical to each other about a reference point located between the first hook-like electrode and the second hook-like electrode. Accordingly, the symmetry of the electric field formed by the pair of hook-like electrodes is improved, and highly uniform liquid crystal orientation can be achieved.

It is preferable that the first hook-like electrode and the second hook-like electrode be provided in a same layer. It is still possible to form a lateral direction electric field when the first hook-like electrode and the second hook-like electrode are formed in different layers. However, since the field will also include a vertical component, the actual result will be the formation of an inclined field. In such a case, some of the liquid crystal molecules may rotate to align with the electric field, causing degradation of transmittance and viewing angle characteristics. Forming the first hook-like electrode and the second hook-like electrode in the same layer makes it less likely that an electric field having an inclined component will be formed. Hence, a more uniform lateral electric field can be formed and degradation of transmittance and viewing angle characteristics can be prevented.

To further improve viewing angle characteristics, it is preferable that the first substrate have a plurality of electrode pairs, each pair including the first hook-like electrode and the second hook-like electrode, and that the first hook-like electrode and the second hook-like electrode included in each of two mutually adjacent electrode pairs are line-symmetrical to each other about a straight reference axis that passes between the electrode pairs. Note that, here, a hook-like electrode located further from the reference axis is the "first hook-like electrode" and a hook-like electrode located nearer to the reference axis is the "second hook-like electrode". The first hook-like electrode and the second hook-like electrode included in each of two mutually adjacent electrode pairs are supplied with a signal having the same potential. According to the above electrode arrangement, the electric fields formed between the respective electrode pairs can be made symmetrical even when the pixel size is reduced. It is therefore possible to obtained wide viewing angle characteristics without a reduction in transmittance.

It is preferable that the liquid crystal display device further include a scan signal line that passes between the second hook-like electrodes of the two mutually adjacent electrode pairs. Since no potential difference is generated in the region between the second hook-like electrodes of the two mutually adjacent electrode pairs, this region cannot be used for display. Hence, an efficient configuration can be obtained by using this region for the scan signal line.

It is preferable that the liquid crystal display device further include a switching element connected to each of the second hook-like electrodes of the two mutually adjacent electrode pairs. Since the two second hook-like electrodes are supplied with the same potential, the above-described arrangement enables an efficient configuration. This arrangement is particularly effective when pixel size is reduced since the size of the switching element is directly linked to the aperture ratio.

It is preferable that: the first substrate further include a first polarizing plate and the second substrate further include a second polarizing plate; a polarizing axis of the first polarizing plate be perpendicular to a polarizing axis of the second polarizing plate; and when the first substrate is seen in a plan view, the inner profile line of the first hook-like electrode be arranged so as to form an angle with the polarizing axis of the first polarizing plate and the polarizing axis of the second polarizing plate. Further, it is preferable that, when the first substrate is seen in a plan view, the inner profile line of the second hook-like electrode be arranged so as to form an angle with the polarizing axis of the first polarizing plate and the polarizing axis of the second polarizing plate. Specifically, in the present embodiment, the first polarizing plate and the second polarizing plate are arranged in a crossed Nicols state. Since an electric field is formed between the first hook-like electrode and the second hook-like electrode, a display with favorable gradation and whites can be achieved by adjusting the axes of the polarizing plates so as to form an angle with the orientation of the electric field.

It is preferable that a rectangular area generally defined by the first hook-like electrode and the second hook-like electrode have an aspect ratio of 1. The obtainable viewing angle characteristics differ depending on the form of the virtual fixed range area formed by the first hook-like electrode and the second hook-like electrode. The design providing most favorable viewing angle characteristics is one in which form of the above-described area is square, which is to say that the ration between the vertical and horizontal of the area is 1:1. In this specification, "rectangle" and "square" used to mean a shape in which the four sides are substantially perpendicular or parallel to one another. Very fine recesses or protrusions may be formed at a portion of the shapes.

Effects of the Invention

According to the present invention, it is possible to provide a liquid crystal display device capable of achieving preferable display characteristics even after pixel size is reduced.

DETAILED DESCRIPTION OF EMBODIMENTS

In the following, the present invention is described in more detail by provision of embodiments and with reference to figures. It is to be noted, however, that the present invention is not limited to these embodiments.

The liquid crystal display device of the following Embodiments 1 to 8 is specifically applicable to televisions, personal computers, cell phone, car navigation systems, information displays and the like.

In the present specification, a region over which the orientation of liquid crystal molecules is controlled by a pixel electrode controlled by a single switching element, and a common electrode that opposes the pixel electrode is defined a single "pixel". In the case that a single switching element simultaneously contributes to controlling a plurality of pixel electrodes, the entire region over which the orientation of liquid crystal molecules is controlled by each of the plurality of pixel electrodes and each of the common electrodes that opposes each of the plurality of pixel electrodes is a single "pixel".

The effects of the present invention are more apparent when the pixel size is small. However, the invention is also applicable in cases where the pixel size is large, such as when a plurality of electrode pairs are provided within a single pixel. Note, however, that as a reference of the pixel size at which the effects of the present invention can be efficiently obtained, any given side of the pixel should be no longer than 20 μm and preferably no longer than 17 μm.

Embodiment 1

Figure 1:
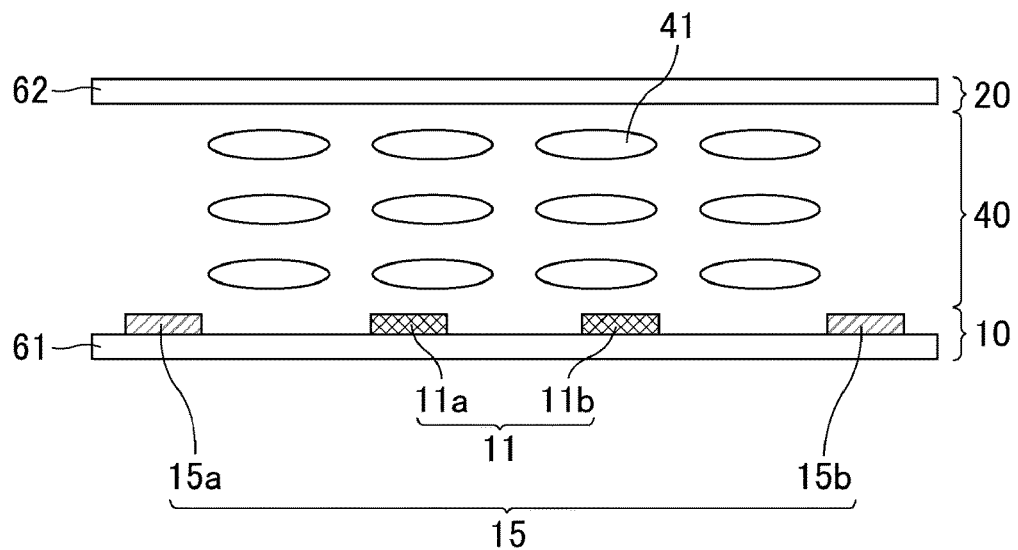
FIG. 1 is a schematic cross-sectional view showing a liquid crystal display device of Embodiment 1, illustrating when no voltage is applied.
Figure 2:
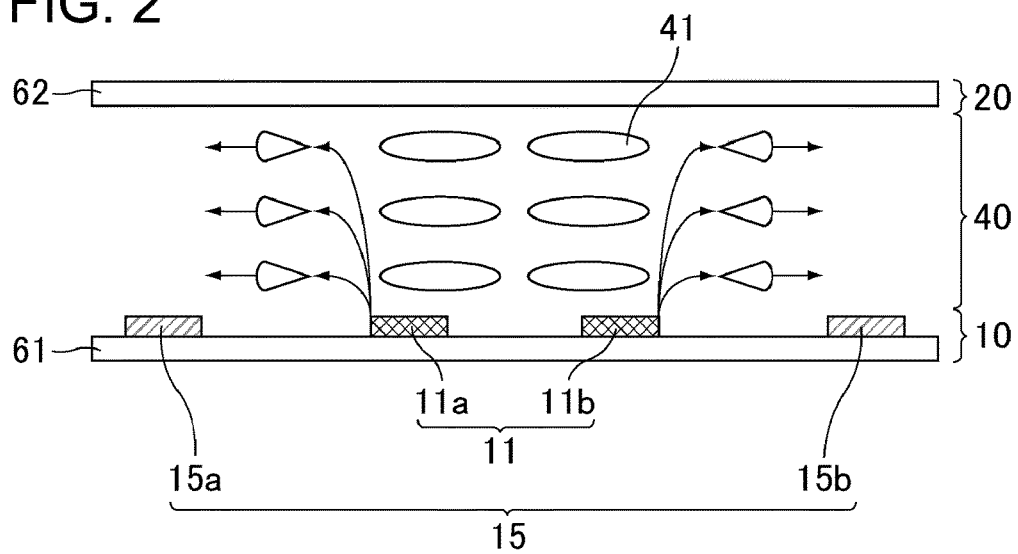
FIG. 2 is a schematic cross-sectional view showing a liquid crystal display device of Embodiment 1, illustrating when a white voltage is applied.

FIGS. 1 and 2 are schematic cross-sectional views showing a liquid crystal display device of Embodiment 1. FIG. 1 shows a state in which no voltage is applied, and FIG. 2 shows a state in which a white voltage is applied. The liquid crystal display device of Embodiment 1 includes a TFT substrate (first substrate) 10, an opposite substrate (second substrate) 20 and a liquid crystal layer 40 sandwiched between the TFT substrate 10 and the opposite substrate 20. The liquid crystal layer 40 contains liquid crystal molecules 41 having negative dielectric anisotropy. The liquid crystal molecules 41 align horizontally with the surfaces of the substrates 10 and 20 when no voltage is applied and when a voltage is applied. The TFT substrate 10 includes a supporting substrate 61, a TFT (switching element), a scan signal line, a data signal line, a common signal line, a pixel electrode (second hook-like electrode) 11, a common electrode (first hook-like electrode) 15, and, in different layers to the pixel electrode 11 and the common electrode 15, an isolated insulating film, an alignment film, and the like. The opposite substrate 20 includes a supporting substrate 62, a color filter, a black matrix, an alignment film, and the like. The pixel electrode 11 and the common electrode 15 are independent of each other and are supplied with signals having different-sized potentials. Hence, a voltage can be applied within the liquid crystal layer 40.

The pixel electrode 11 is further divided into a first pixel electrode 11a and a second pixel electrode 11b. The first pixel electrode 11a and the second pixel electrode 11b are disposed in the same layer, and are each supplied with image signals (pixel potential) of the same-sized potential. In Embodiment 1, the single TFT is connected to each of the first pixel electrode 11a and the second pixel electrode 11b. The first pixel electrode 11a and the second pixel electrode 11b may be connected by a member other than the TFT or may not be connected at all.

The common electrode 15 is further divided between a first common electrode 15a and a second common electrode 15b. The first common electrode 15a and the second common electrode 15b are disposed in the same layer, and each is supplied with a common signal of the same potential. The first common electrode 15a and the second common electrode 15b may be connected by another member or may not be connected at all.

The first pixel electrode 11a, the second pixel electrode 11b, the first common electrode 15a and the second common electrode 15b may all be arranged in the same layer. Accordingly, it is less likely that an electric field having a component inclined to the substrate surface will be formed. Hence, a more uniform lateral electric field can be formed and degradation of transmittance and viewing angle characteristics can be prevented. For the members positioned in the layer below the electrodes, an insulating film formed on the supporting substrate 61 may be used. The insulating film may be formed from an organic material or an inorganic material and may include a single film or a plurality of films.

A polarizing plate (first polarizing plate) is adhered on the side of the TFT substrate 10 opposite to the liquid crystal layer 40. Further, a polarizing plate (second polarizing plate) is adhered on a surface of the opposite substrate 20, the surface being on the opposite side to the liquid crystal layer 40.

The first polarizing plate adhered on the surface of the TFT substrate 10, and the second polarizing plate adhered on the surface of the opposite substrate 20 are arranged so that the respective polarizing axes are perpendicular to each other. The first polarizing plate and the second polarizing plate are arranged so that the respective polarizing axes are at an angle to the inner profile lines of each of the first pixel electrode 11a, the second pixel electrode 11b, the first common electrode 15a, and the second common electrode 15b. Further, the alignment films formed on both substrates undergo alignment treatment in directions parallel or perpendicular to the respective polarizing axes of the first polarizing plate and the second polarizing plate. Accordingly, when no voltage is applied, light passing through the liquid crystal molecules is blocked by the polarizing plates, resulting in a black display. However, when a voltage of a threshold value or higher is applied, it is possible to adjust the amount of light passed by changing the orientation direction of the liquid crystal molecules through further adjustment to the size of the voltage, and thus realize a display with gradation and a white display. Note that, here, "parallel" and "perpendicular" do not refer solely to perfectly parallel and perpendicular arrangements, but include substantially parallel and perpendicular arrangements. For example, it may even be the case that inclining the alignment treatment direction by a few degrees with respect to the polarizing axis of the polarizing plate provides an advantage, such as being able to align the liquid crystal molecules in a uniform manner.

Figure 3:
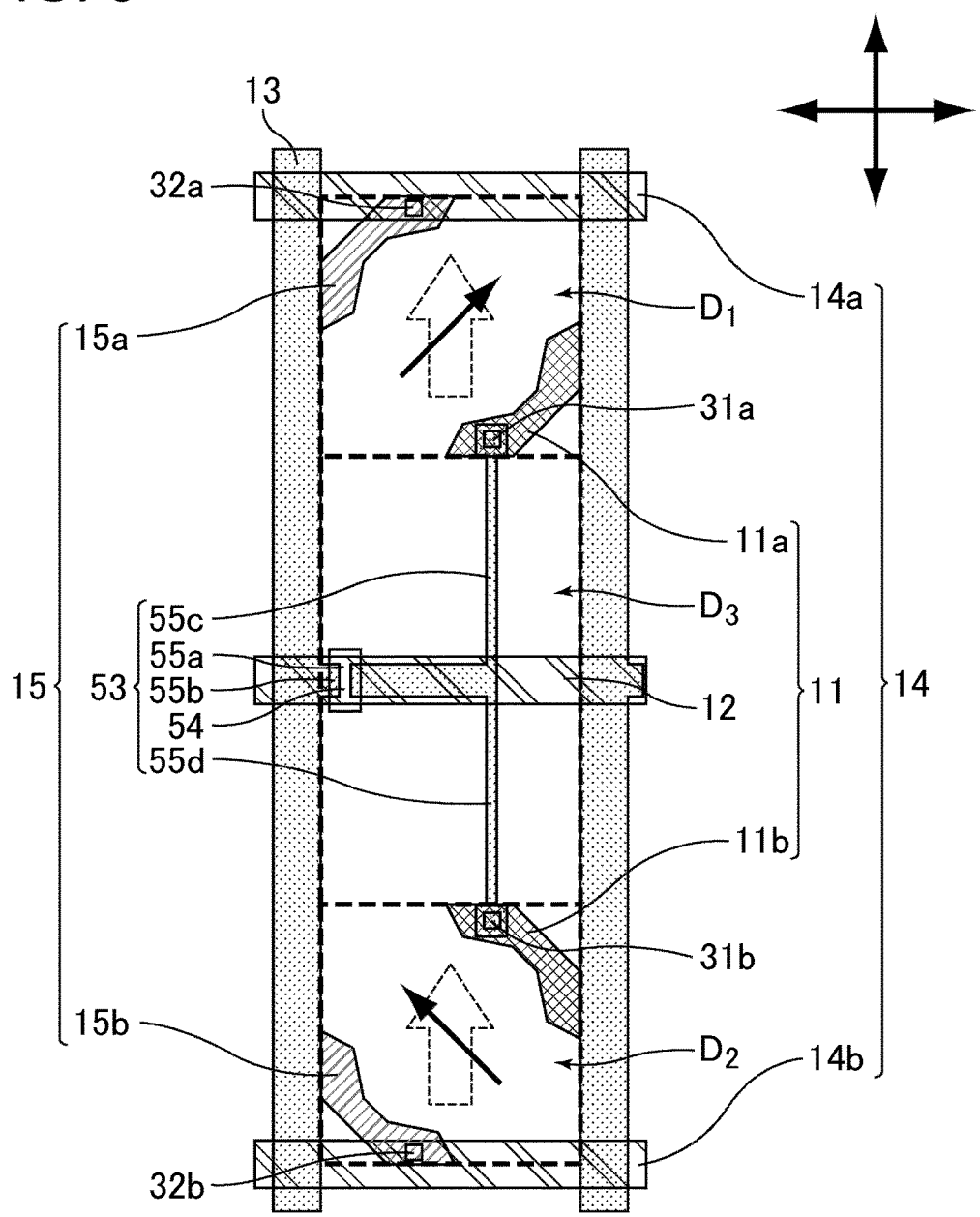
FIG. 3 is a schematic plan view showing a TFT substrate of the liquid crystal display device of Embodiment 1.
Figure 4:
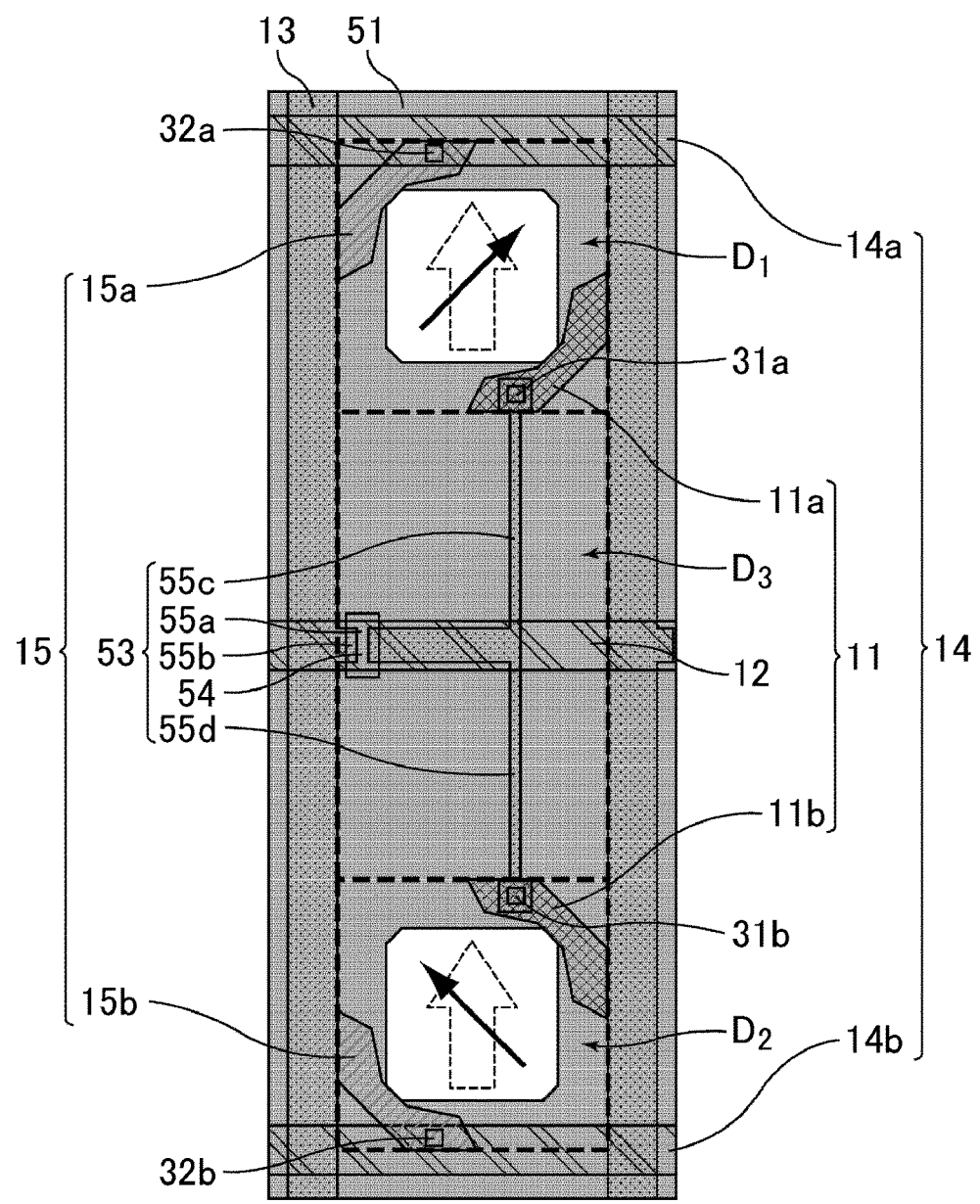
FIG. 4 is a schematic plan view showing the TFT substrate of Embodiment 1 with the location of a black matrix added.

FIGS. 3 and 4 are schematic plan views showing the liquid crystal display device of Embodiment 1. FIG. 3 is a schematic plan view of the TFT substrate, and FIG. 4 is a schematic plan view of the TFT substrate with the location of the black matrix added. As shown in FIG. 3, when the TFT substrate 10 of Embodiment 1 is viewed in a plan view, a scan signal line 12 and a data signal line 13 are arranged to intersect with each other. A TFT (thin-film transistor) 53 is provided in proximity to the contact point of the scan signal line 12 and the data signal line 13. A common signal line 14 that extends parallel to the scan signal line 12 is provided between scan signal lines 12. The initial orientation direction of the liquid crystal molecules 41 is perpendicular to the extension direction of the scan signal line 12 and the common signal line 14, and parallel to an extension direction of the data signal line 13. The two arrows in FIG. 3 indicate the orientation of the polarizing axes of the polarizing plates.

The TFT 53 is a switching element that includes a semiconductor layer 54, a gate electrode 55a, a source electrode 55b, a first drain electrode 55c and a second drain electrode 55d. The gate electrode 55a is used unaltered as part of the scan signal line 12. The source electrode 55b is configured by branching from the data signal line 13. The drain electrode is divided into the first drain electrode 55c that is extended towards the first pixel electrode 11a and the second drain electrode 55d that is extended towards the second pixel electrode 11b. The first drain electrode 55c is formed so as to widen at a position overlapping the first pixel electrode 11a and is connected to the first pixel electrode 11a via a first contact 31a that pierces the insulating film. The second drain electrode 55d is formed so as to widen at a position overlapping the second pixel electrode 11d and is connected to the second pixel electrode 11b via a second contact 31b that pierces the insulating film. The gate electrode 55a and the semiconductor layer 54 overlap each other via a gate insulation film. The source electrode 55b is connected to the drain electrodes 55c and 55d via the semiconductor layer 54. The size of the current flowing in the semiconductor layer 54 is adjusted using a scan signal input to the gate electrode 55a via the scan signal line 12. Transmission of the image signal input to the source electrode 55b, the semiconductor layer 54, the first drain electrode 55c or the second drain electrode 55d, and the first pixel electrode 11a or the second pixel electrode 11b, in the stated order, is controlled via the data signal line 13.

As shown in FIG. 3, the first pixel electrode 11a and the second pixel electrode 11b each has a hook-like form, and each is line-symmetrical about a certain reference axis. Further, the end portions of both the first pixel electrode 11a and the second pixel electrode 11b are pointed. Moreover, for both the first pixel electrode 11a and the second pixel electrode 11b, the inner profile line is formed by at least three lines inclined at different angles (five lines in FIG. 3). The centrally positioned line is perpendicular to bisecting line electrodes (symmetry axis for the line-symmetry).

As shown in FIG. 3, the first common electrode 15a and the second common electrode 15b each has a hook-like form, and each is line-symmetrical about a certain reference axis. Further, the end portions of both the first common electrode 15a and the second common electrode 15b are pointed. Moreover, for both the first common electrode 15a and the second common electrode 15b, the inner profile line is formed by at least three lines inclined at different angles (five lines in FIG. 3). The centrally positioned line is perpendicular to a bisecting line of the electrodes (symmetry axis for the line-symmetry).

As illustrated in FIG. 3, the inner profile lines of the first pixel electrode 11a and the first common electrode 15a oppose each other, and each has a section that is parallel to the other. Further, the inner profile lines of the second pixel electrode 11b and the second common electrode 15b oppose each other, and each has a section that is parallel to the other.

The scan signal line 12 is formed so as to pass between the first pixel electrode 11a and the second pixel electrode 11b. The first common electrode 15a is arranged so as to overlap with a first common signal line 14a via an insulating film. The first common electrode 15a is connected to the first common signal line 14a via a first contact 32a that pierces the insulating film. The second common electrode 15b is arranged so as to overlap with a second common signal line 14b via an insulating film. The second common electrode 15b is connected to the second common signal line 14b via a second contact 32b that pierces the insulating film. The first common signal line 14a and the second common signal line 14b may, for example, be connected to each other via a common bus line. However, provided that the two signal lines are supplied with a potential of the same size, the two signal lines need not be connected. Note also that in Embodiment 1, the common signal lines are not necessarily provided separately from the common electrodes. For example, the first common electrode and the second common electrode may themselves be lengthily extended irrespective of the pixel boundary.

As illustrated in FIG. 3, the combination of the first pixel electrode 11a and first common electrode 15a, and the combination of the second pixel electrode 11b and the second common electrode 15b are each formed as electrode pairs, and the TFT substrate 10 has a plurality of such electrode pairs formed thereon.

The combination of the first pixel electrode 11a and first common electrode 15a have line-symmetry about a linear axis passing between the two electrodes 11a and 15a. The two electrodes 11a and 15a also have point-symmetry about a point located between the two electrodes 11a and 15a.

The combination of the second pixel electrode 11b and second common electrode 15b have line-symmetry about a linear axis passing between the two electrodes 11b and 15b. The two electrodes 11b and 15b also have point-symmetry about a point located between the two electrodes 11b and 15b.

Further, the arrangement of the first pixel electrode 11a, the second pixel electrode 11b, the first common electrode 15a and the second common electrode 15b is determined so that these electrodes have line symmetry about a linear reference axis passing between the first pixel electrode 11a and the second pixel electrode 11b. In Embodiment 1, the first pixel electrode 11a, the second pixel electrode 11b, the first common electrode 15a and the second common electrode 15b each have the same dimensions and differ only in orientation.

A length from one end to the other (length of outer profile line or inner profile line) of each of the first pixel electrode 11a, the second pixel electrode 11b, the first common electrode 15a and the second common electrode 15b differs according to the set pixel size but is set in the range 10 to 20 µm, for example. Further, a width of each of the first pixel electrode 11a, the second pixel electrode 11b, the first common electrode 15a and the second common electrode 15b differs according to the set pixel size and the position on the electrode but is set in the range so that the maximum width is approximately 2 µm, for example.

As illustrated in FIG. 3, each pixel includes: an area bounded by an outer profile line of the first pixel electrode 11a, extension lines from both ends of the outer profile line of the first pixel electrode 11a, an outer profile line of the first common electrode 15a, and the extension lines from both ends of the outer profile line of the first common electrode 15*a* (hereinafter also referred to as first segmented area D1); and an area bounded by an outer profile line of the second pixel electrode 11*b*, extension lines from both ends of the outer profile line of the second pixel electrode 11*b*, an outer profile line of the second common electrode 15*b*, and the extension lines from both ends of the outer profile line of the second common electrode 15*b* (hereinafter also referred to as second segmented area D2). Further, an area (hereinafter also referred to as middle area D3) located between the first segmented area D1 and the second segmented area D2 also forms part of the pixel.

Figure 5:
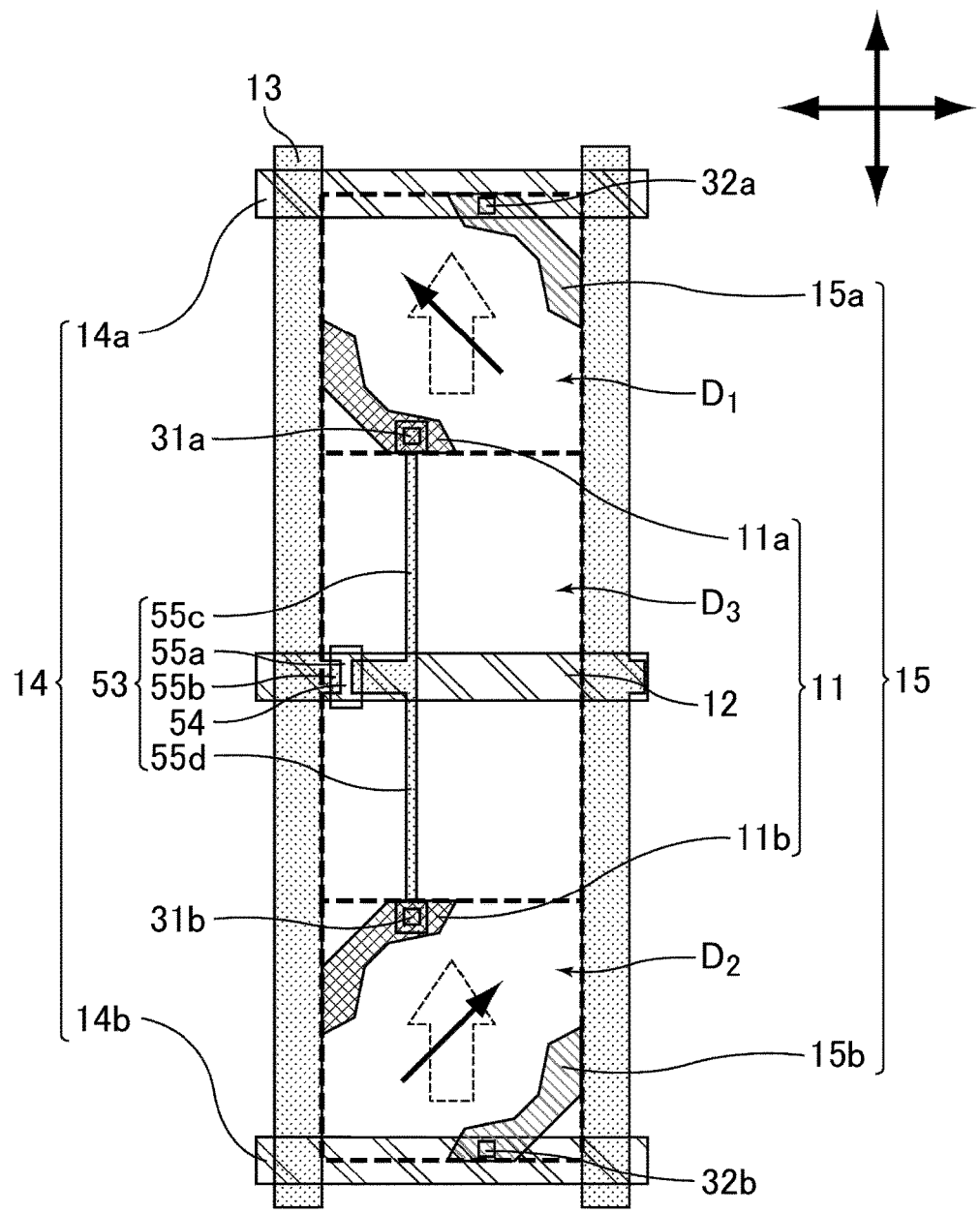
FIG. 5 is a schematic plan view showing a TFT substrate of a liquid crystal display device of a modification example of Embodiment 1.

In FIG. 3, an embodiment is disclosed in which the first pixel electrode 11*a* is located to the bottom right of the first segmented area D1, the first common electrode 15*a* is located to the top left of the first segmented area D1, the second pixel electrode 11*b* is located to the top right of the second segmented area D2, and the second common electrode 15*b* is located to the bottom left of the second segmented area D2. However, it is sufficient that the inner profile lines of the pixel electrodes and the common electrodes oppose each other. For example, an embodiment of the type illustrated in FIG. 5 is also acceptable, which is to say the first pixel electrode 11*a* may be located to bottom left of the first segmented area D1, the first common electrode 15*a* may be located to the top right of the first segmented area D1, the second pixel electrode 11*b* may be located to the top left of the second segmented area D2 and the second common electrode 15*b* may be located to the bottom right of the second segmented area D2 (modification example of Embodiment 1). Note also that in this case, the orientation of the liquid crystal molecules when a voltage is applied will change from that of the example illustrated in FIG. 3.

As illustrated in FIG. 4, a black matrix 51 is provided with openings corresponding to the areas over which the orientation of the liquid crystal molecules is controlled by the electrodes. Specifically, the black matrix 51 is formed so that outer edges of the openings are formed along the first segmented area D1 and the second segmented area D2. As a result, when viewed as a whole, the black matrix 51 is configured in a lattice. Note also that the middle area D3 is covered by the black matrix 51. Further, the plurality of openings formed in and surrounded by the black matrix 51 in this way fulfill the role of areas that allow display light to pass through.

As illustrated in FIG. 4, cutouts are provided at the four corners of the openings in the black matrix 51. Specifically, each corner of each opening in the black matrix 51 includes a portion that is parallel to the inner profile line of the adjacent first pixel electrode 11*a*, the first common electrode 15*a*, the second pixel electrode 11*b* or the second common electrode 15*b*.

In the example illustrated in FIG. 4, the openings in the black matrix 51 are set to be slightly smaller than the first segmented area D1 and the second segmented area D2. It is preferable that a length of a side of the first segmented area D1 and the second segmented area D2 be at least equal to but no greater than 110% of the length of the side of the corresponding opening.

As illustrated in FIGS. 3 and 4, when no voltage is applied, the liquid crystal molecules 41 are aligned at an angle to the respective bisecting lines of the first pixel electrode 11*a*, the second pixel electrode 11*b*, the first common electrode 15*a*, and the second common electrode 15*b*. The white dashed-line arrows in FIGS. 3 and 4 represent the orientation direction (lengthwise axis direction) of the liquid crystal molecules when no voltage is applied.

On other hand, as illustrated in FIGS. 3 and 4, when a voltage is applied, the liquid crystal molecules 41 are aligned parallel to or perpendicular to the respective bisecting lines of the first pixel electrode 11*a*, the second pixel electrode 11*b*, the first common electrode 15*a*, and the second common electrode 15*b*. The black arrows in FIGS. 3 and 4 represent the orientation direction (lengthwise axis direction) of the liquid crystal molecules when the voltage is applied.

In Embodiment 1, both the first segmented area D1 and the second segmented area D2 are rectangular or square. With such an arrangement, excellent transmittance and wide viewing angle characteristics can be obtained.

Further, in Embodiment 1, points contributing to providing excellent transmittance and wide viewing angle characteristics include: (i) the tip of the end portions of the electrodes being pointed; (ii) each electrode being line-symmetrical about a reference axis (iii) the inner profile line of each electrode being formed by at least three lines inclined at different angles, and the centrally-located line being perpendicular to the bisecting line between electrodes; (iv) the combinations of the pixel electrode and the common electrode being symmetrically configured (specifically, these electrodes have line and point symmetry); (v) the electrode pair configuring the first segmented area D1 and the electrode pair configuring the second segmented area D2 having a symmetrical structure (specifically, the pairs have line-symmetry); and (vi) the dimension of the electrodes forming a single pixel being the same.

Figure 6:
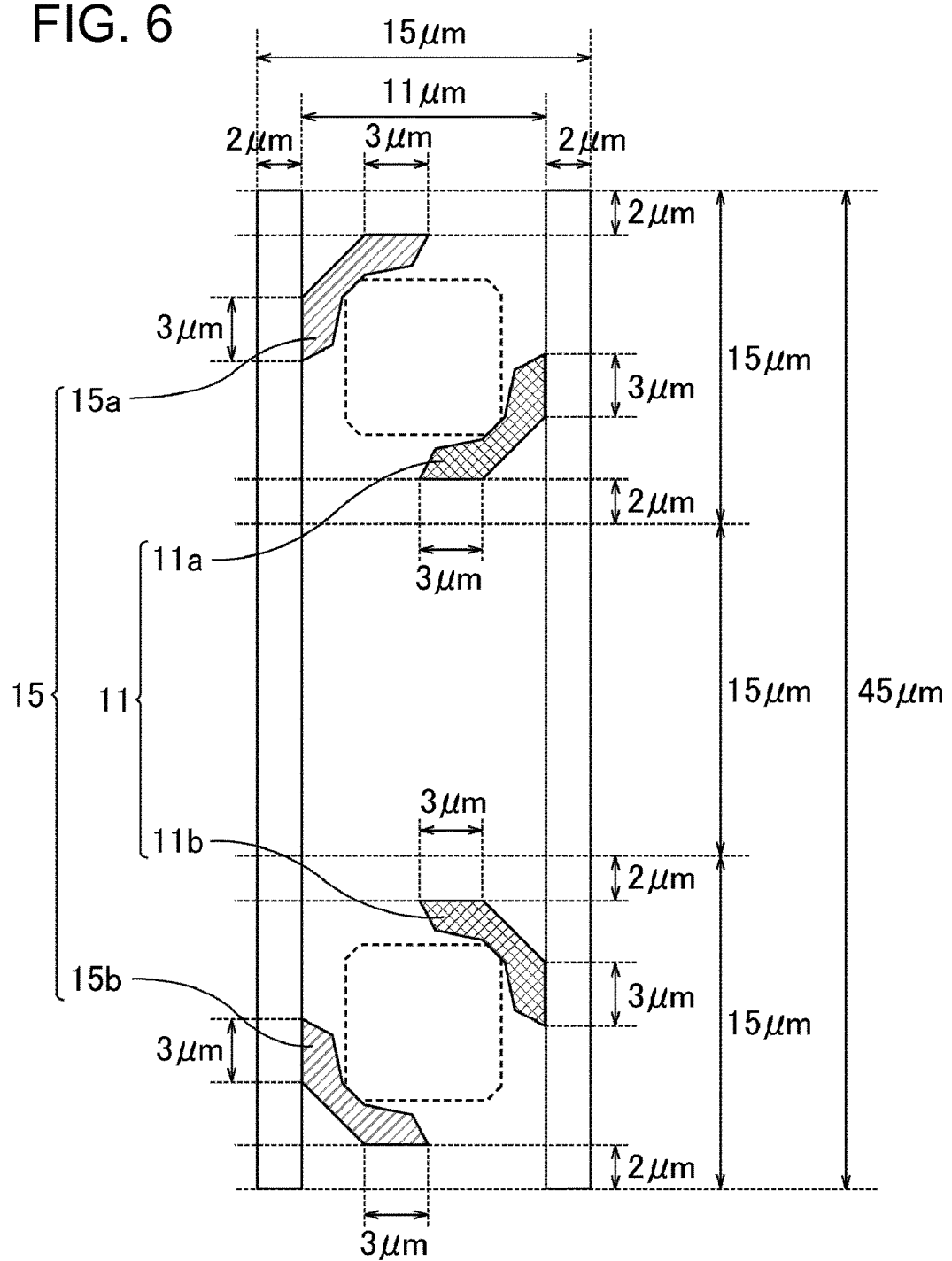
FIG. 6 is a schematic view showing a configuration of a pixel supposed for Working Example 1, illustrating a side of the TFT substrate.
Figure 7:
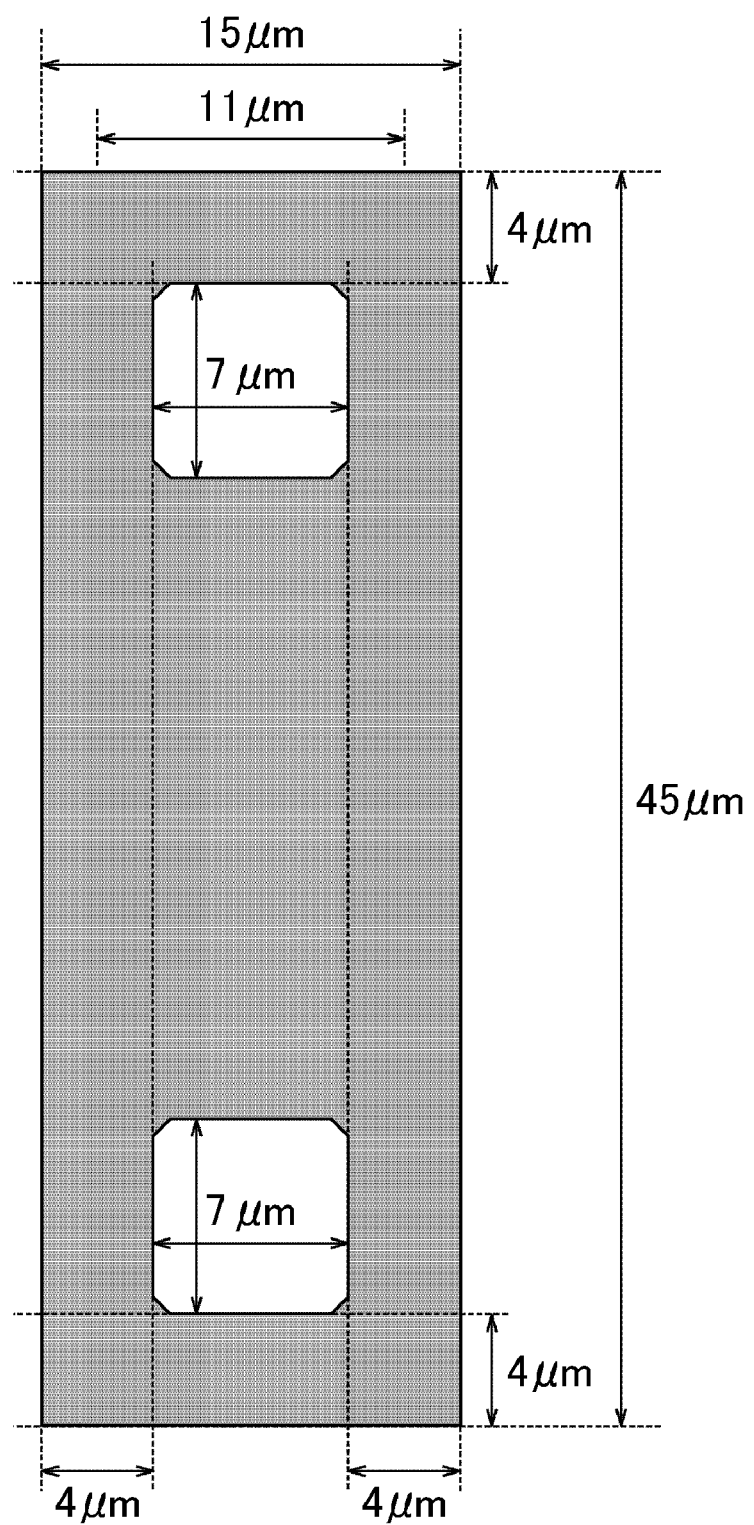
FIG. 7 is a schematic view illustrating a configuration of a pixel supposed for Working Example 1, illustrating an opposite substrate side.

When a specific simulation for the liquid crystal display device of Embodiment 1 was performed, the following results were obtained (Working Example 1). FIGS. 6 and 7 are schematic views illustrating a configuration of a pixel supposed for Working Example 1. FIG. 6 shows the TFT substrate side while FIG. 7 shows the opposite substrate side. The conditions of the simulation of Working Example 1 were set as follows. For the dielectric anisotropy of the liquid crystal material, the negative type ($\Delta\epsilon=-7$) was used. The pixel size was set to 15 µm×45 µm. The lengths of the outer profile lines at both end portions of the pixel electrode and the common electrode were set to 3 µm. The inner profile lines of the pixel electrode and the common electrode were formed using five lines inclined at different angles, and the angles formed between the lines were all obtuse. Accordingly, it is possible to eliminate areas with locally radial electric fields. More specifically, angles between, among the five lines, the centrally-positioned line (hereinafter also referred to as the inner profile line of the corner portion) and the lines on either side thereof were set to 152°. Further, angles between the outer profile line of the corner portion that links the outer profile lines of the end portions, and the outer profile lines of the end portions was set to 28°. A distance between the pixel electrode and the common electrode (specifically, the length of a straight line linking a deepest part of the corner portion of the pixel electrode to a deepest part of a corner portion of the common electrode) was set to 8.5 ($=6\sqrt{2}$) µm. Margins of 2 µm were allowed between the outer edges of the pixel and the outer profile lines of the electrodes. Lengths of vertical and horizontal sides of the first segmented area D1 and the second segmented area D2 were each set to 11 µm. Hence, aspect ratios of the segmented areas D1 and D2 were each 1:1. The openings in the black matrix were set to a size of 7 µm×7 µm with a right-angle isosceles triangle of side-length 1 µm chamfered from the four corners. Thus, the aspect ratios of the openings in the black matrix were 1:1.

Thus, by providing the pixel electrode and the common electrode with a hook-like form and arranging openings of the black matrix with a fixed spacing therebetween, it is possible to control the orientation of the electric field to a desired direction without generating local fields in a virtual area formed by the pixel electrode, the common electrode and lines linking tips of the end portions of these electrodes. Moreover, by gradually changing the inclination of the inner profile lines of the pixel electrode and the common electrode, it is possible to reduce the proportion of electric field with altered orientation, and thus to suppress the occurrence of orientation disorder in the liquid crystal.

Figure 8:
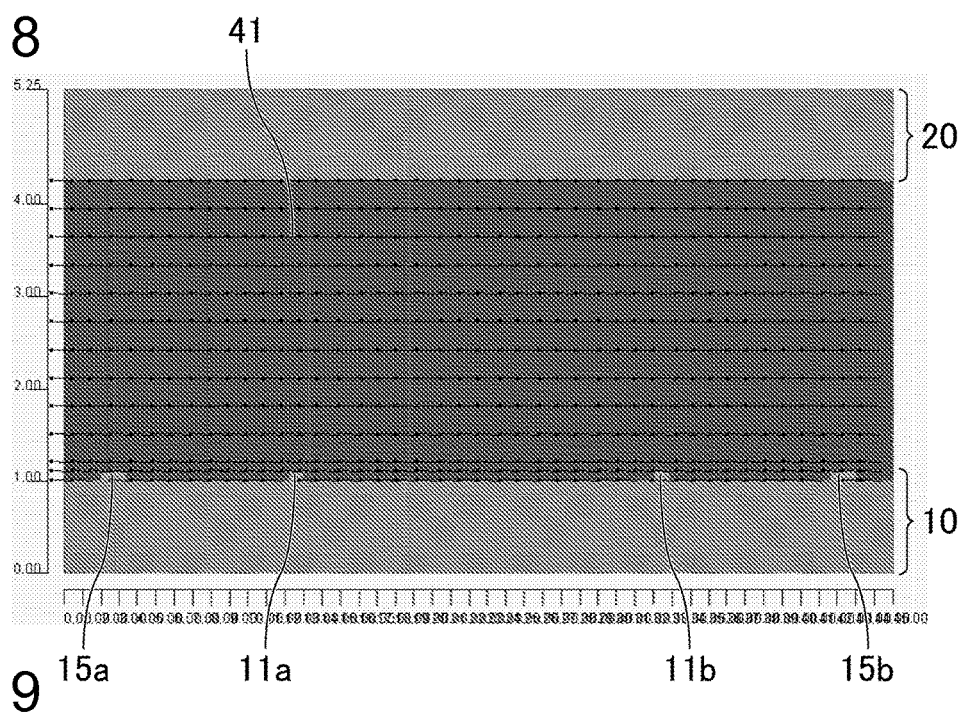
FIG. 8 is a simulation image illustrating behavior of the liquid crystal molecules in Working Example 1, showing a cross-sectional image from when no voltage (0V) is applied.
Figure 9:
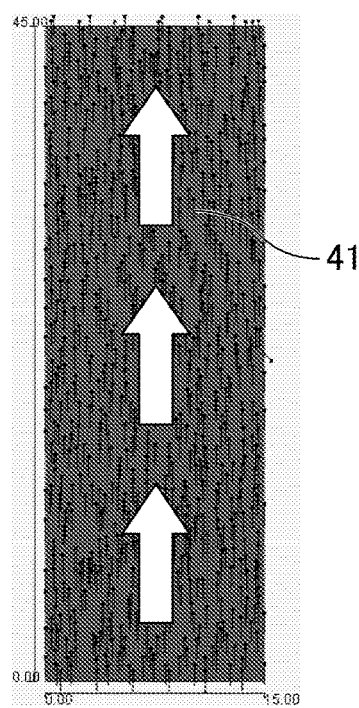
FIG. 9 is a simulation image illustrating behavior of the liquid crystal molecules in Working Example 1, showing a plan image from when no voltage (0V) is applied.
Figure 10:
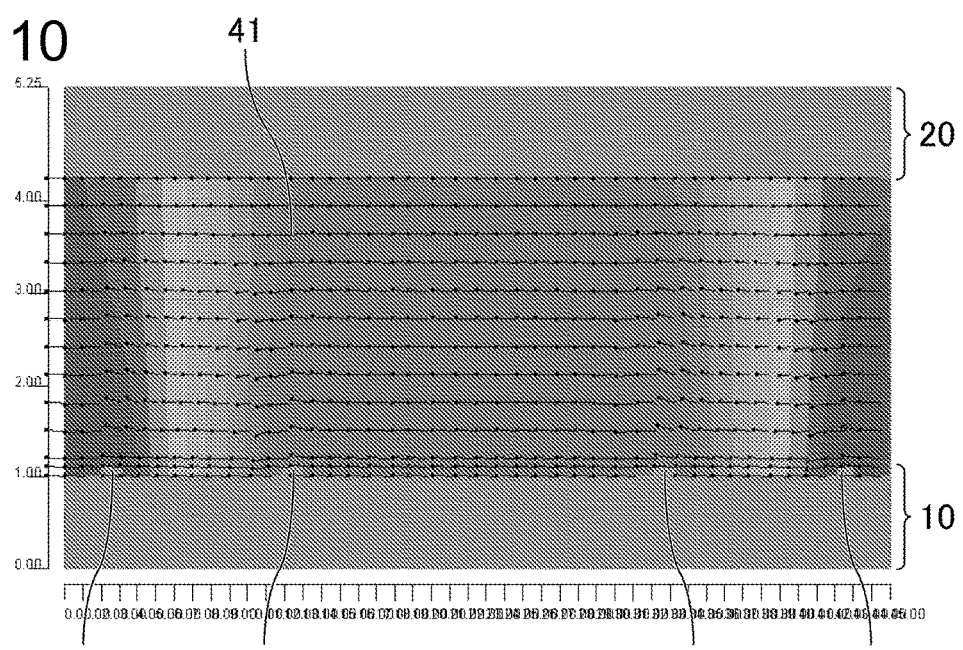
FIG. 10 is a simulation image illustrating behavior of the liquid crystal molecules in Working Example 1, showing a cross-sectional image from when a white voltage (8.1 V) is applied.
Figure 11:
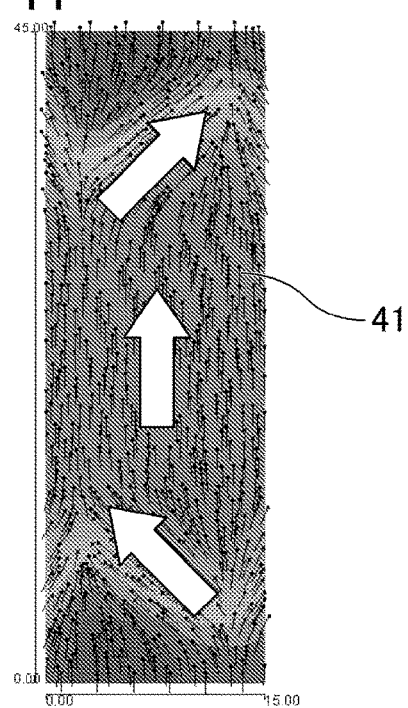
FIG. 11 is a simulation image illustrating behavior of the liquid crystal molecules in Working Example 1, showing a plan image from when a white voltage (8.1 V) is applied.
Figure 12:
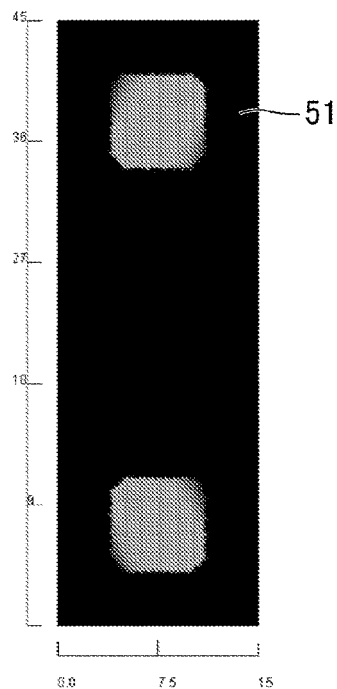
FIG. 12 is a plan image showing light transmittance using monochrome gradation for Working Example 1.
Figure 13:
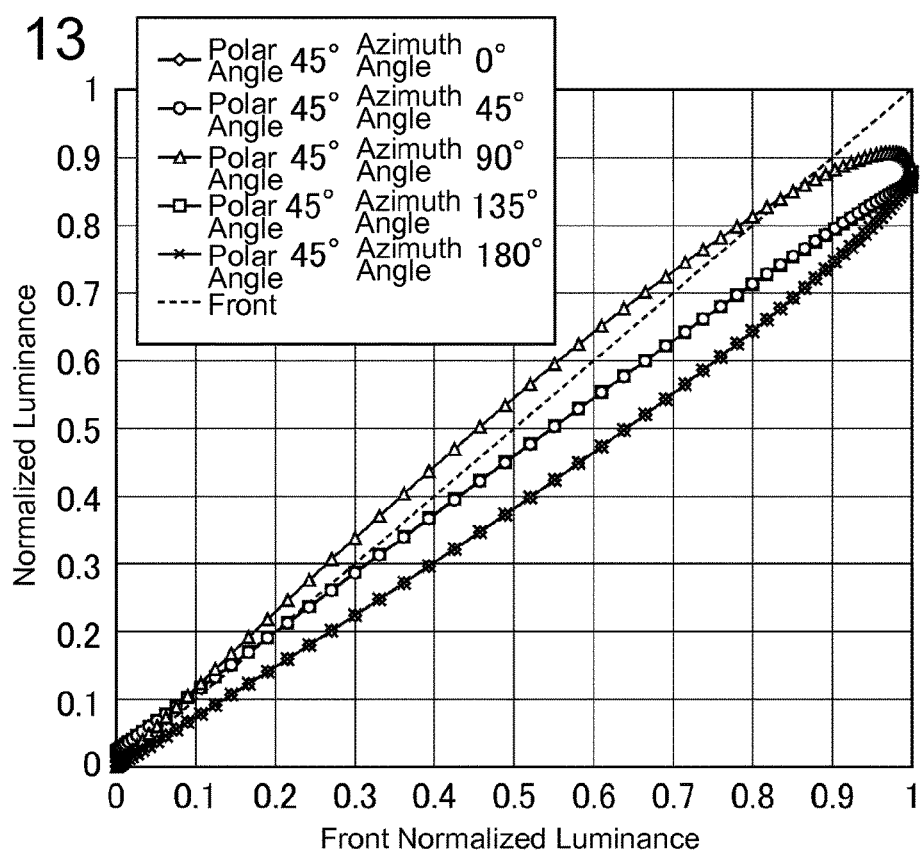
FIG. 13 is a graph showing viewing angle characteristics of Working Example 1.

FIGS. 8 to 11 are simulation images illustrating behavior of the liquid crystal molecules in Working Example 1. For the liquid crystal material, a material with negative dielectric anisotropy was used. FIGS. 8 and 9 show a state in which no voltage (0V) is applied, and FIGS. 10 and 11 show a state in which the white voltage (8.1V) is applied. FIGS. 8 and 10 are cross-sectional images, and FIGS. 9 and 11 are plan images. FIG. 12 is a plan image showing light transmittance with monochrome gradation for Working Example 1. FIG. 13 is a graph showing viewing angle characteristics of Working Example 1. Specifically, the graph shows brightness for differing azimuth values when the display screen is fixed to a polar angle of 45° as a reference plane.

As illustrated in FIGS. 8 and 9, when no voltage is applied, the liquid crystal molecules 41 are evenly aligned in a vertical direction (long-side direction of the pixel). On the other hand, as illustrated in FIGS. 10 and 11, when a voltage of the threshold value or higher is applied, the liquid crystal molecules 41 located in the area between the first pixel electrode 11a and the second pixel electrode 11b are affected, those in proximity to the TFT substrate 10, where the first pixel electrode 11a and the second pixel electrode 11b are disposed, maintaining the initial orientation but those in proximity to the opposite substrate 20 being altered in orientation. Further, the liquid crystal molecules 41 located between the pixel electrodes 11a and 11b and the opposing common electrodes 15a and 15b are inclined at different angles depending on distance from the respective electrodes, but are nevertheless aligned in a diagonal direction with respect to the electrodes. Note also that in FIG. 10 the various areas are shaded in accordance with electric field strength.

As shown in FIGS. 9 and 11, the liquid crystal molecules 41 contained in the first segmented area D1 bounded by the outer profile line of the first pixel electrode 11a, the extension lines from both ends of the first pixel electrode 11a, the outer profile line of the first common electrode 15a, and the extension lines from both ends of the first common electrode 15a, although varying by area, are mostly aligned with the inner profile lines of the electrodes. In other words, these liquid crystal molecules 41 are aligned in a direction at approximately 45° to the initial orientation. Further, the change in angle is smooth and uniform. Similarly, the liquid crystal molecules 41 contained in the second segmented area D2 bounded by the outer profile line of the second pixel electrode 11b, the extension lines from both ends of the second pixel electrode 11b, the outer profile line of the second common electrode 15b, and the extension lines from both ends of the second common electrode 15b, although varying by area, are mostly aligned with the inner profile lines of the electrodes. In other words, these liquid crystal molecules 41 are aligned in a direction at approximately 45° to the initial orientation. Further, the change in angle is smooth and uniform. Note also that the liquid crystal molecules 41 contained in the middle area D3 between the first segmented area D1 and the second segmented area D2 have mostly maintained the initial orientation. However, a portion of the liquid crystal molecules 41 are aligned diagonally with respect to the initial orientation.

What is characteristic here is that the orientation distribution (director distribution) of these liquid crystal molecules 41 is symmetrical about a straight line that passes between the first pixel electrode 11a and the second pixel electrode 11b, which, to be more specific, is the straight line that bisects the single pixel. Accordingly, within an area corresponding to a single pixel in the liquid crystal layer, it is possible to form two areas (a multi-domain) containing a plurality of liquid crystal molecules aligned in differing directions but having a orientation pattern that is symmetrical about a fixed reference axis.

Thus, according to Embodiment 1, it is possible to achieve a uniform orientation of liquid crystal molecules in portions used as the display region, and further to form two areas having differing orientation directions. Consequently, light can be used efficiently and excellent viewing angle characteristics can be achieved. Moreover, according to the configuration of Embodiment 1, excellent effects without degradation in characteristics can be realized even when pixels are designed to be smaller.

With regard to transmittance, it can be seen from FIG. 12 that light is passed uniformly over the entire area corresponding to the openings in the black matrix 51 and a high transmittance is therefore secured. With regard to viewing angle characteristics, as illustrated in FIG. 13, the brightness does not vary greatly with angle and each curve converges to the same location at the end portion. Thus, it is clear that whichever way the viewing angle is inclined, the way the screen is seen does not change, and excellent viewing angle characteristics can therefore be obtained.

In Embodiment 1, the aspect ratio of the first segmented area D1 and the second segmented area D2 matched the aspect ratio of the openings in the black matrix 51. However, these aspect ratios do not necessarily have to match in the manner of Working Example 1. Provided that the form of the openings in the black matrix 51 is determined to suit the area suitable for display, the openings are not limited to being rectangular or square. Further, there is no particular limit on the relationship between the sizes of the first segmented area D1 and second segmented area D2 and the sizes of the openings in the black matrix 51.

The following describes the materials of other members and the method of manufacturing.

For the material of the supporting substrates 61 and 62, a transparent material such as glass or plastic is preferably used. For the material of the insulating film, a transparent material such as silicon nitride, silicon oxide or photosensitive acrylic resin is preferably used. The insulating film may be formed by plasma enhanced chemical vapor deposition (PECVD), or formed by die coating a photosensitive acrylic resin film on a silicon nitride film. To form the contacts 31 and 32, holes in the insulating film can be formed by performing dry etching (channel etching).

The scan signal line 12, the data signal line 13 and the electrodes that configure the TFT 53 can be formed by sputtering or the like to form a metal such as titanium, chromium, aluminum, molybdenum, or the like, or an alloy of these metals in a single layer or plurality of layers and then performing patterning by photolithography or the like. If the wiring and electrodes are to be formed in the same layer, manufacturing can be made more efficient by using the same material for each.

For the semiconductor layer 54 of the TFT 53, a multi-layer arrangement including a high-resistance semiconductor layer (i layer) formed from amorphous silicon, polysilicon or the like, and a low-resistance semiconductor layer (n+ layer) formed from an n+ amorphous silicon or the like doped with an impurity of amorphous silicon or like may be used. Alternatively, an oxide semiconductor such as indium-gallium-zinc-oxygen (IGZO) may be used.

Using an oxide semiconductor such as IGZO for the material of the semiconductor layer 54 makes it possible to increase the movement of electrons and reduces the size of the TFT 53, allowing a high aperture ratio to be secured. Hence, oxide semiconductors using IGZO are advantageous when the pixel size is to be reduced. A further advantage is that, since the off-leakage is low, electric charge can be maintained for a long period and a low driving frequency can be used.

The pixel electrode 11 and the common electrode 15 can be formed by forming a single layer or a plurality of layers of a transparent material such as indium tin oxide (ITO), indium zinc oxide (IZO), zinc oxide (ZnO) or tin oxide (SnO), or an alloy of these by sputtering and subsequently patterning using photolithography or the like.

For the material of the color filter, a photosensitive resin (color resist) that allows certain colors of light to pass is preferably used. No particular limits apply to the material for the black matrix 51, providing the material has light-shielding properties. A resin material containing a black pigment or a light-shielding metal may be preferably used. The color filter and the black matrix 51 may be arranged on the side of the TFT substrate 10 and not on the side of the opposite substrate 20.

After providing a plurality of columnar spacers made of an insulating material on one of the TFT substrate 10 and the opposite substrate 20 manufactured as above, the two substrates are adhered together using a sealing material. The liquid crystal layer 40 is formed between the TFT substrate 10 and the opposite substrate 20. However, if a dripping method is used, the dripping of the liquid crystal is performed before the substrates are adhered. If a vacuum injection method is used, the liquid crystal material is injected after the substrates are adhered.

The liquid crystal display device is completed by adhering a polarizing plate, a phase difference film, and the like on liquid crystal layer 40 side and the opposite side of each substrate. A liquid crystal display device suitable for application is completed by mounting a gate driver, a source driver, display control circuits and the like on the liquid crystal display device and combining this assembly with a backlight and the like.

Embodiment 2

Figure 14:
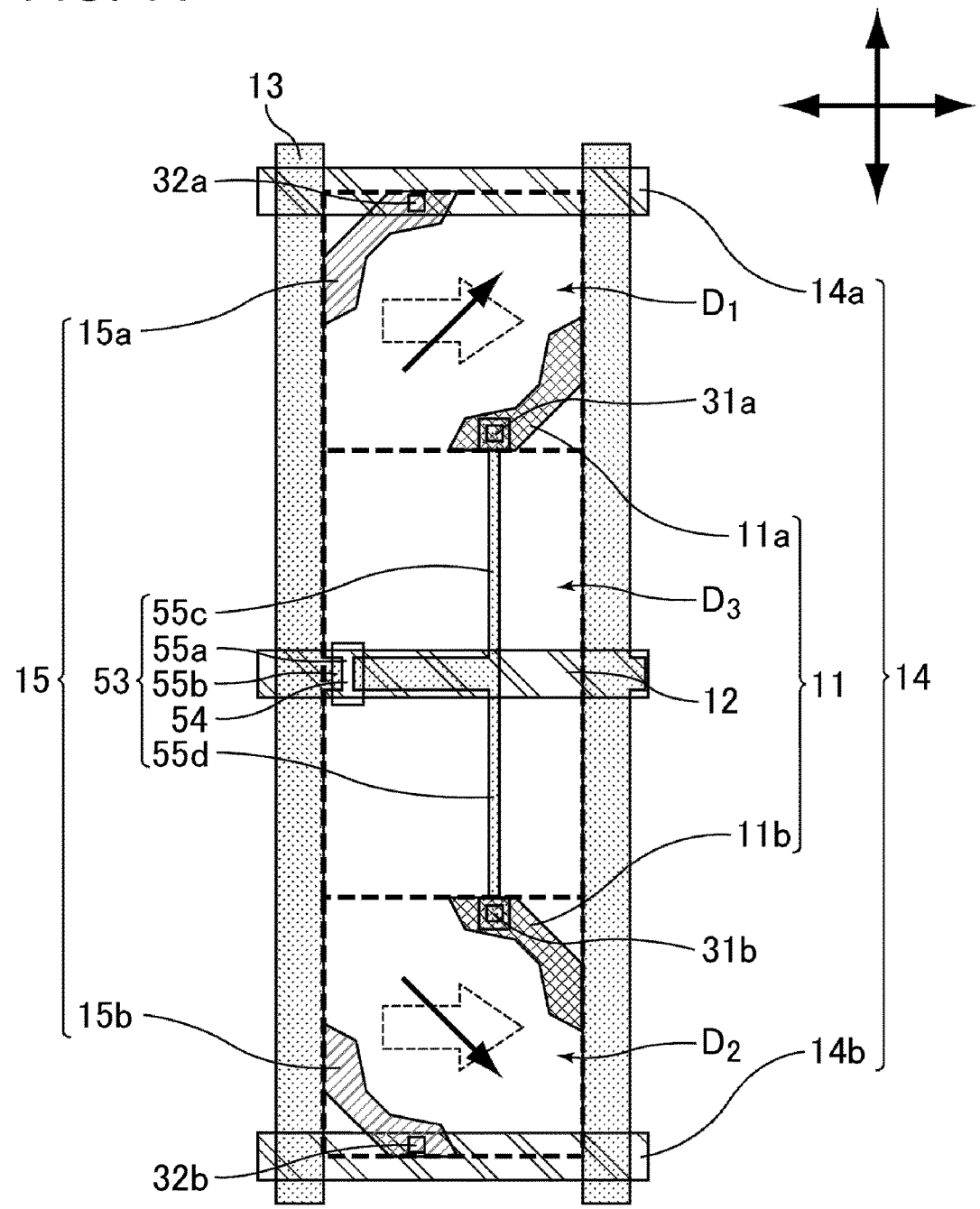
FIG. 14 is a schematic plan view showing a TFT substrate of the liquid crystal display device of Embodiment 2.
Figure 15:
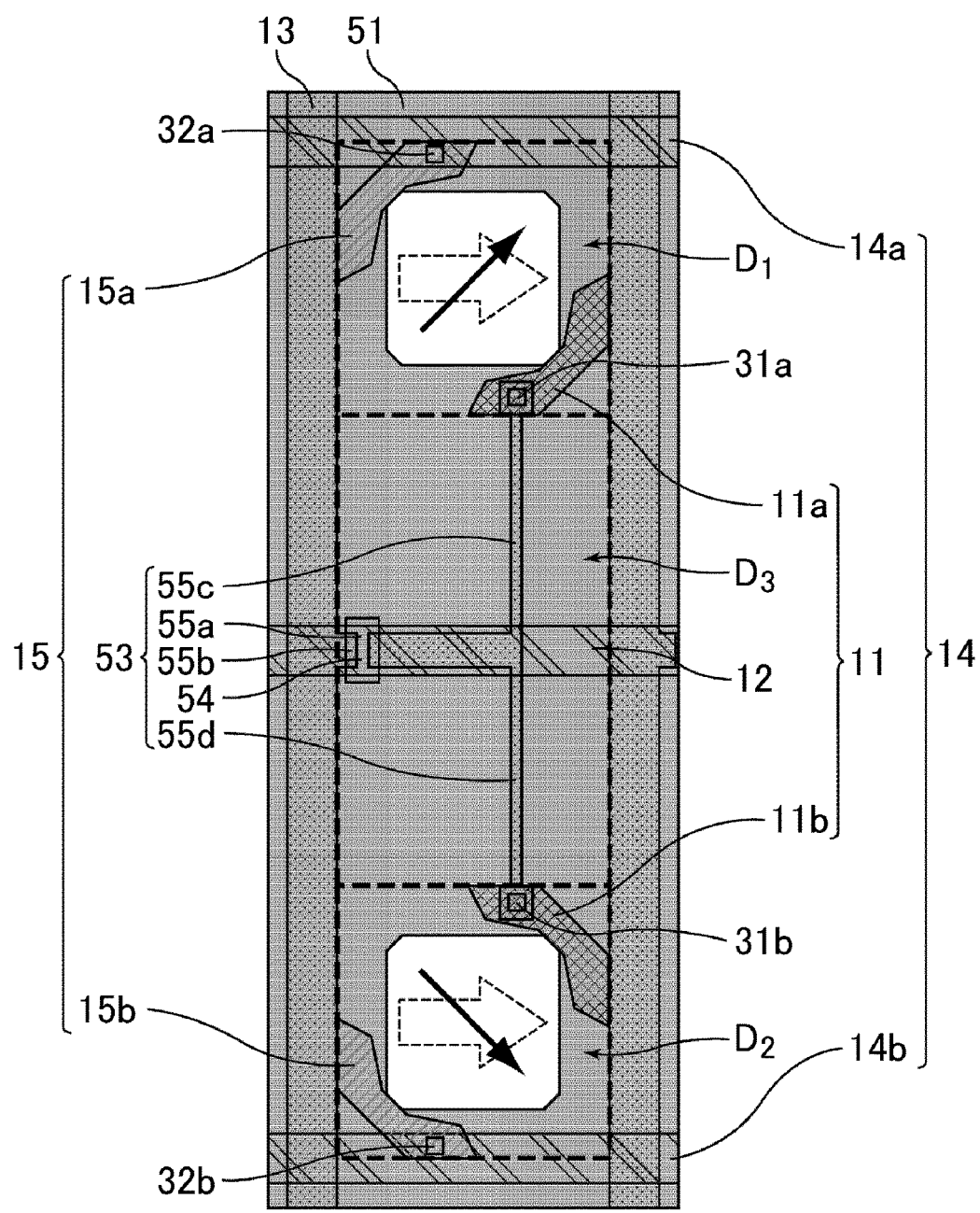
FIG. 15 is a schematic plan view showing the TFT substrate of Embodiment 2 with the location of a black matrix added.

Embodiment 2 is the same as Embodiment 1 except in that the initial orientation direction of the liquid crystal molecules differs. Specifically, the direction of the initial orientation of the liquid crystal molecules of Embodiment 2 forms an angle of 90° with the direction of the initial orientation of the liquid crystal molecules of Embodiment 1. FIG. 14 is a schematic plan view of the TFT substrate of the liquid crystal display device of Embodiment 2, and FIG. 15 is a schematic plan view with the location of the black matrix added.

As in Embodiment 1, the first polarizing plate adhered on the surface of the TFT substrate and the second polarizing plate adhered on the surface of the opposite substrate are arranged so that the respective polarizing axes are perpendicular to each other. The first polarizing plate and the second polarizing plate are arranged so that the respective polarizing axes are at an angle to the inner profile lines of each of the first pixel electrode 11a, the second pixel electrode 11b, the first common electrode 15a, and the second common electrode 15b. Further, the alignment films formed on both substrates undergo alignment treatment in directions parallel or perpendicular to the respective polarizing axes of the first polarizing plate and the second polarizing plate. Accordingly, when no voltage is applied, light passing through the liquid crystal molecules is blocked by the polarizing plates, resulting in a black display. However, when a voltage of a threshold value or higher is applied, it is possible to adjust the amount of light passed by changing the orientation direction of the liquid crystal molecules through further adjustment to the size of the voltage, and thus realize a display with gradation and a white display.

Figure 16:
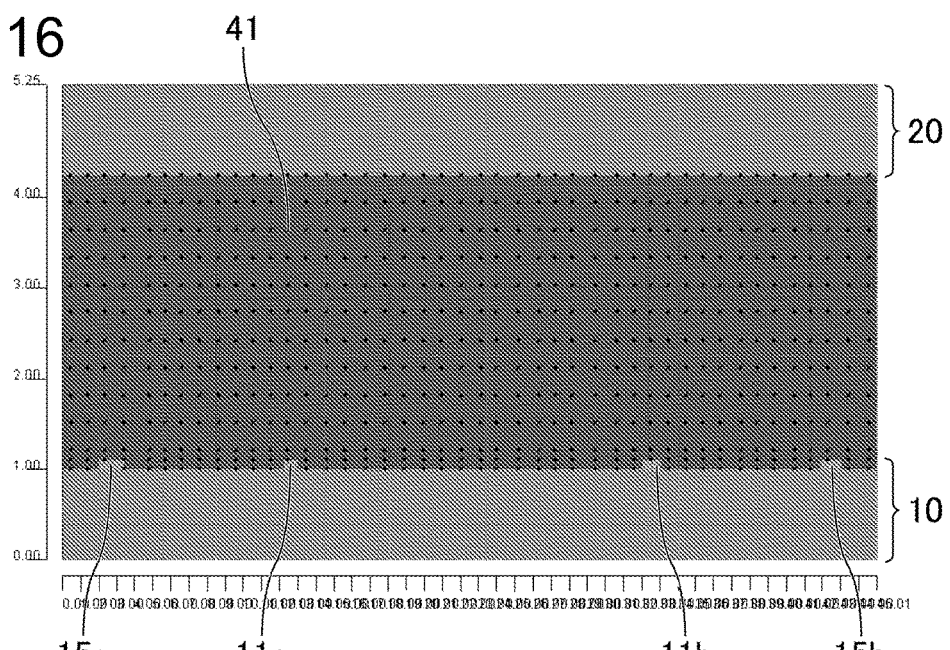
FIG. 16 is a simulation image illustrating behavior of the liquid crystal molecules in Working Example 2, showing a cross-sectional image from when no voltage (0V) is applied.
Figure 17:
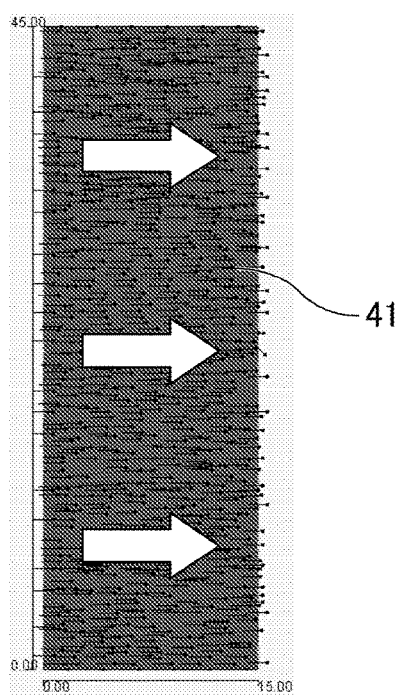
FIG. 17 is a simulation image illustrating behavior of the liquid crystal molecules in Working Example 2, showing a plan image from when no voltage (0V) is applied.
Figure 18:
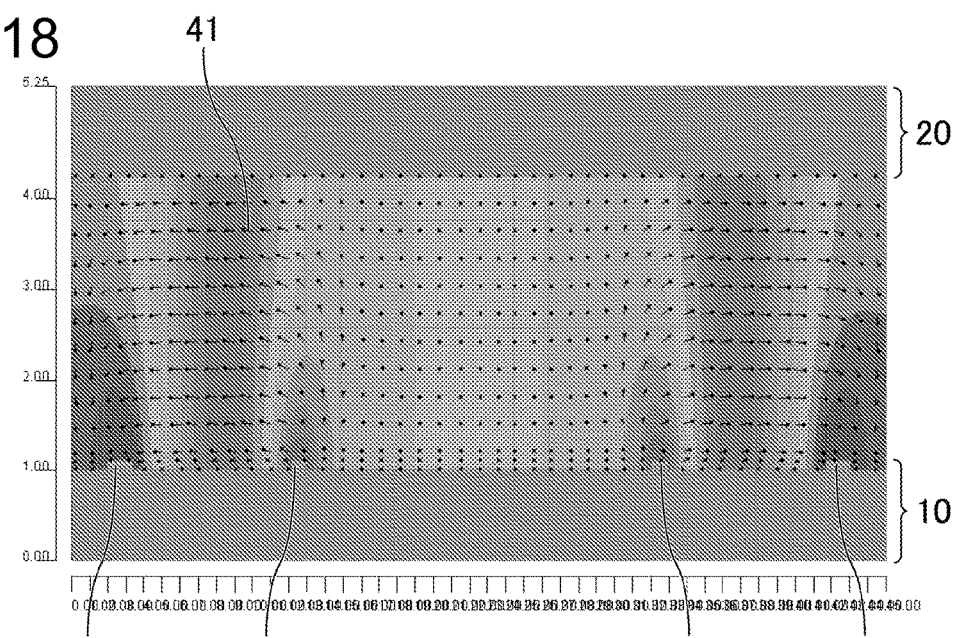
FIG. 18 is a simulation image illustrating behavior of the liquid crystal molecules in Working Example 2, showing a cross-sectional image from when a white voltage (15.0 V) is applied.
Figure 19:
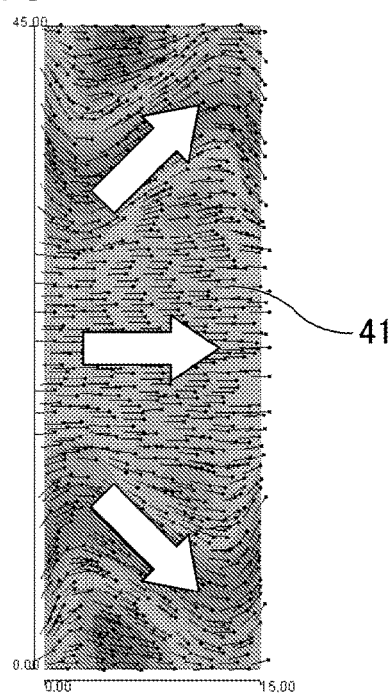
FIG. 19 is a simulation image illustrating behavior of the liquid crystal molecules in Working Example 2, showing a plan image from when a white voltage (15.0 V) is applied.
Figure 20:
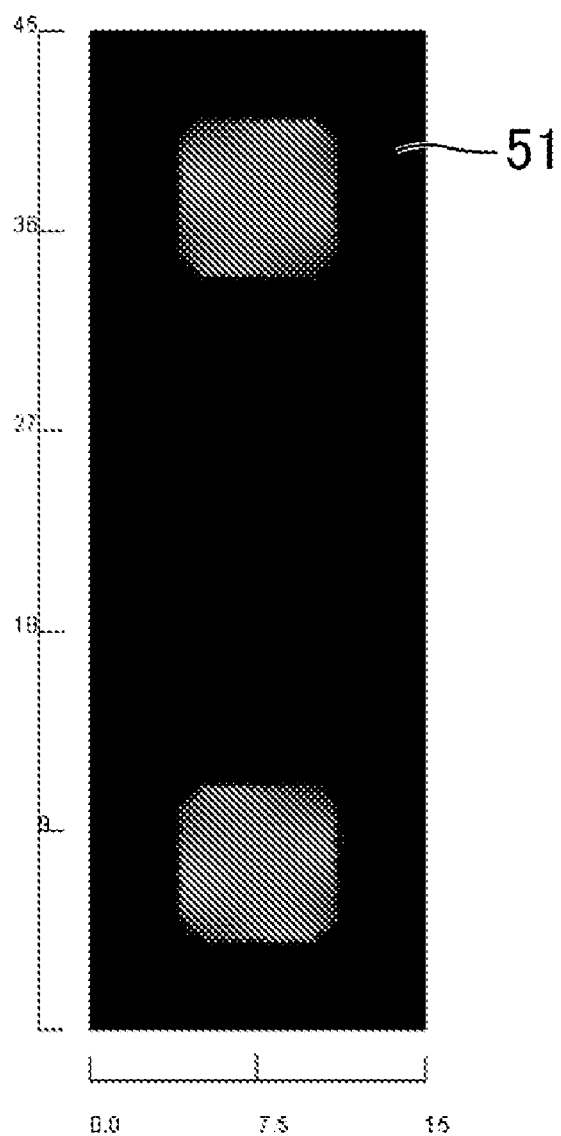
FIG. 20 is a plan image showing light transmittance using monochrome gradation for Working Example 2.

FIGS. 16 to 19 are simulation images illustrating behavior of liquid crystal molecules in Working Example 2. For the liquid crystal material, a material with negative dielectric anisotropy was used. FIGS. 16 and 17 show a state in which no voltage (0V) is applied, and FIGS. 18 and 19 show a state in which a white voltage (15.0V) is applied. FIGS. 16 and 18 are cross-sectional images, and FIGS. 17 and 19 are plan images. FIG. 20 is a plan image showing light transmittance using monochrome gradation for Working Example 2.

As illustrated in FIGS. 16 and 17, when no voltage is applied, the liquid crystal molecules 41 are evenly aligned in a horizontal direction (short-side direction of the pixel). On the other hand, as illustrated in FIGS. 18 and 19, when a voltage of the threshold value or higher is applied, the liquid crystal molecules 41 located in the area between the first pixel electrode 11a and the second pixel electrode 11b are affected, those in proximity to the TFT substrate 10, where the first pixel electrode 11a and the second pixel electrode 11b are disposed, maintaining the initial orientation but those in proximity to the opposite substrate 20 being altered in orientation. Further, the liquid crystal molecules 41 located between the pixel electrodes 11a and 11b and the opposing common electrodes 15a and 15b are inclined at different angles depending on distance from the respective electrodes, but are nevertheless aligned in a diagonal direction with respect to the electrodes. Note also that in FIG. 18 the various areas are shaded in accordance with electric field strength.

As shown in FIGS. 17 and 19, the liquid crystal molecules 41 contained in the first segmented area D1 bounded by the outer profile line of the first pixel electrode 11a, the extension lines from both ends of the first pixel electrode 11a, the outer profile line of the first common electrode 15a, and the extension lines from both ends of the first common electrode 15a, although varying by area, are mostly aligned with the inner profile lines of the electrodes. In other words, these liquid crystal molecules 41 are aligned in a direction at approximately 45° to the initial orientation. Further, the change in angle is smooth and uniform. Similarly, the liquid crystal molecules 41 contained in the second segmented area D2 bounded by the outer profile line of the second pixel electrode 11b, the extension lines from both ends of the second pixel electrode 11b, the outer profile line of the second common electrode 15b, and the extension lines from both ends of the second common electrode 15b, although varying by area, are mostly aligned with the inner profile lines of the electrodes. In other words, these liquid crystal molecules 41 are aligned in a direction at approximately 45° to the initial orientation. Further, the change in angle is smooth and uniform. Note also that the liquid crystal molecules 41 contained in the middle area D3 between the first segmented area D1 and the second segmented area D2 have mostly maintained the initial orientation. However, a portion of the liquid crystal molecules 41 are aligned diagonally with respect to the initial orientation.

With regard to transmittance, it can be seen from FIG. 20 that although areas that are slightly darker are present in proximity to the corners of the openings of black matrix 51, light is passed uniformly over the entire area corresponding to the openings and a high transmittance can therefore be secured.

As described above, although the voltage required to perform white display is slightly higher than with Embodiment 1, it was confirmed to be possible to obtain satisfactory transmittance and viewing angle characteristics with Embodiment 2.

Embodiment 3

Figure 21:
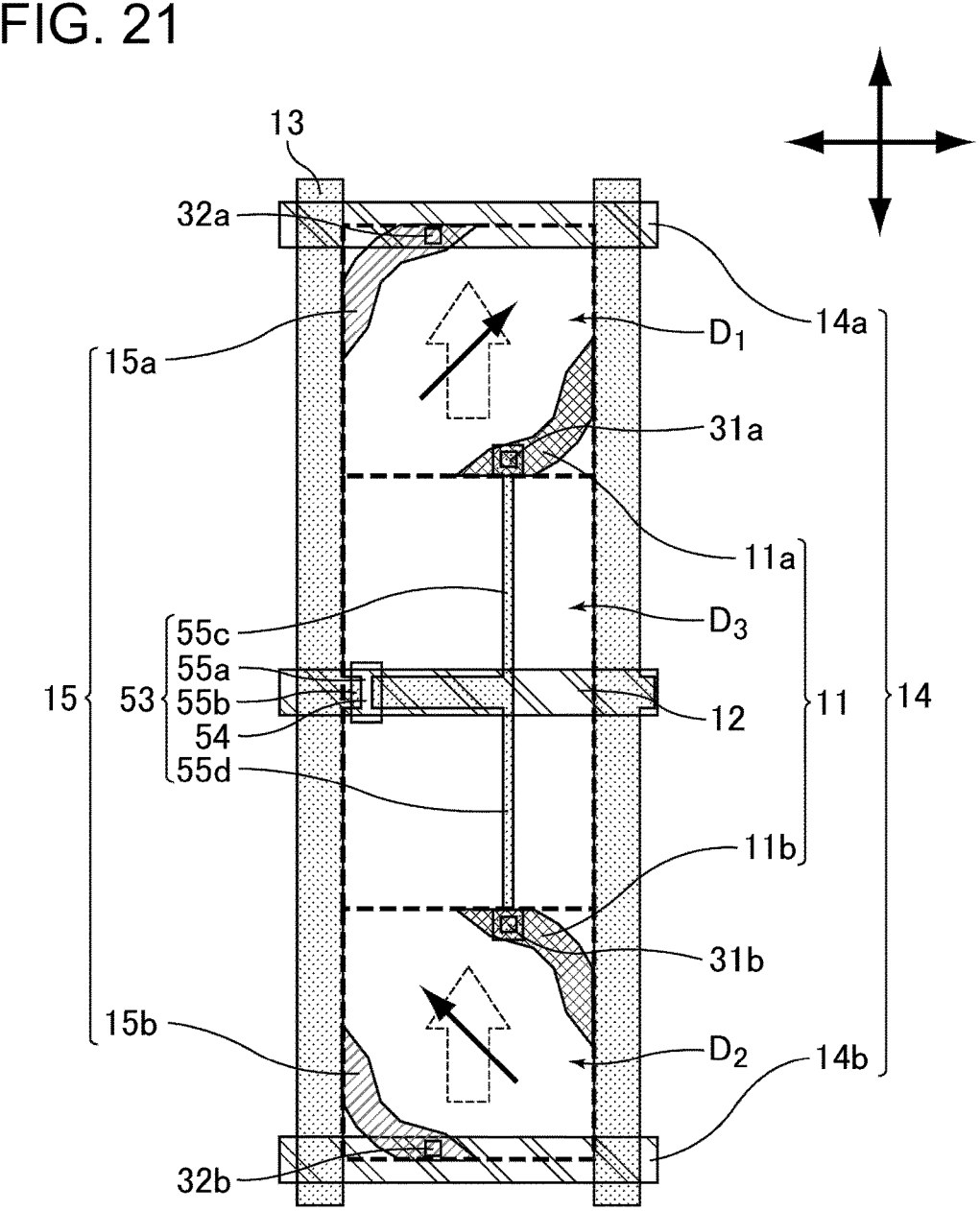
FIG. 21 is a schematic plan view showing a TFT substrate of the liquid crystal display device of Embodiment 3.
Figure 22:
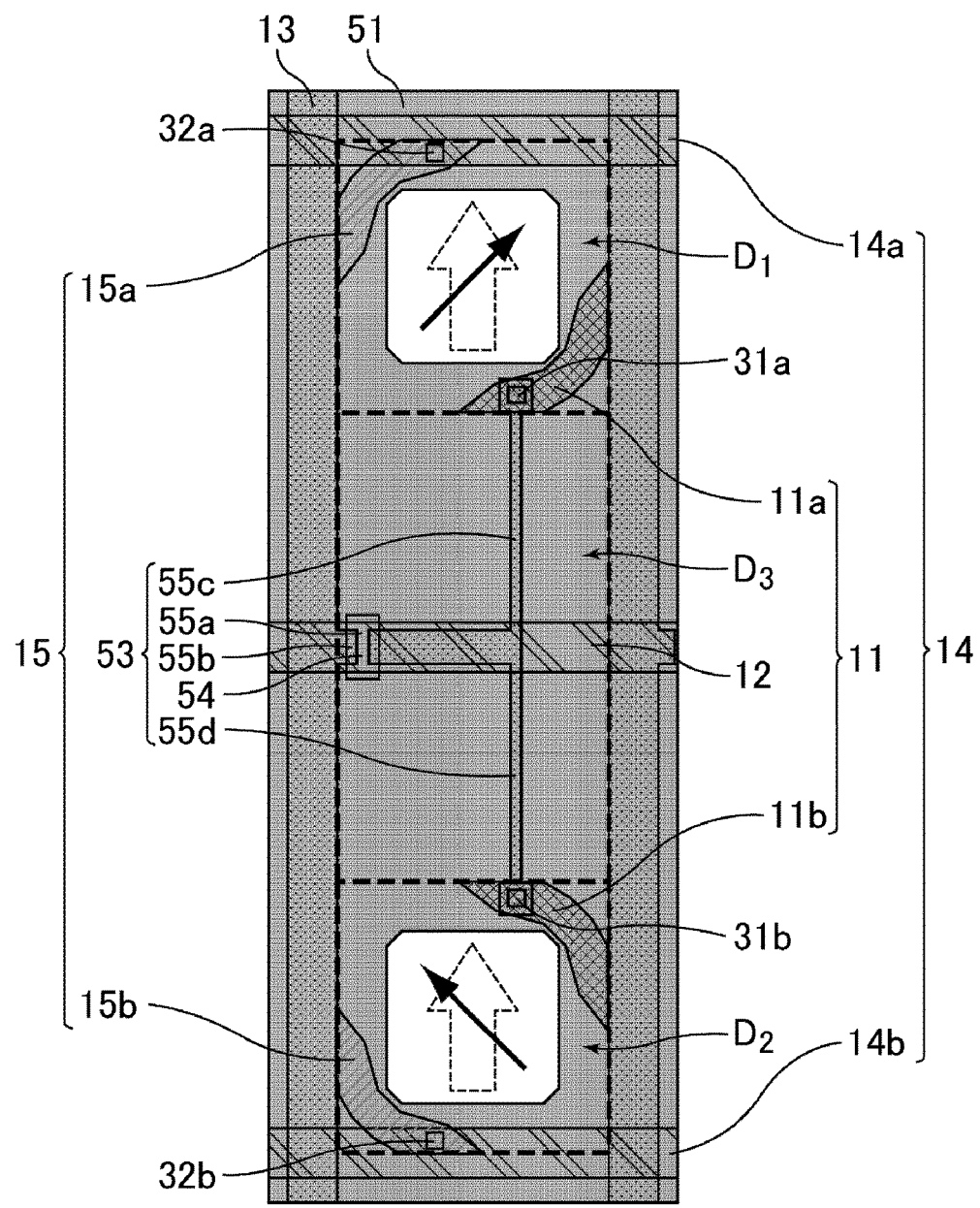
FIG. 22 is a schematic plan view showing the TFT substrate of Embodiment 3 with the location of a black matrix added.

Embodiment 3 is the same as Embodiment 1 except in that the form of the pixel electrode and common electrodes differs. In Embodiment 3, the proportion of the electrodes formed by the end portions is larger than in Embodiment 1. FIG. 21 is a schematic plan view of the TFT substrate of the liquid crystal display device of Embodiment 3, and FIG. 22 is a schematic plan view with the location of the black matrix added.

Figure 23:
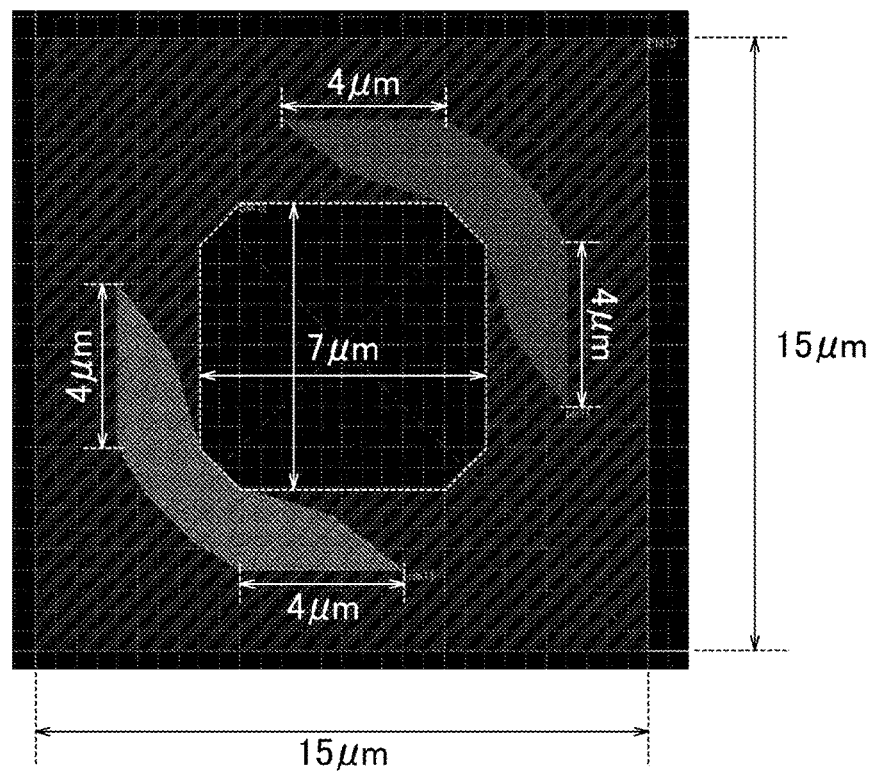
FIG. 23 is a plan view showing in extracted form the pixel electrode and the common electrode of Working Example 3.

When a specific simulation for the liquid crystal display device of Embodiment 3 was performed, the following results were obtained (Working Example 3). FIG. 23 is a plan view showing in extracted form the pixel electrode and the common electrode of Working Example 3. The simulation conditions for Working Example 3 are the same as for Working Example 1 except for the form of the pixel electrodes and common electrodes. The lengths of the outer profile lines at both end portions of the pixel electrode and the common electrode were set to 4 µm. The inner profile lines of the pixel electrode and the common electrode were formed using five lines inclined at different angles, and the angles formed between the lines were all obtuse. More specifically, angles between, among the five lines, the centrally-positioned line (inner profile line of the corner portion) and the lines on either side thereof were set to 152°. Further, angles between the outer profile line of the corner portion that links the outer profile lines of the end portions, and the outer profile lines of the end portions were set to 30°. A distance between the pixel electrode and the common electrode (specifically, the length of a straight line linking a deepest part of the corner portion of the pixel electrode to a deepest part of a corner portion of the common electrode) was set to 8.5 (=6√2) µm.

Figure 24:
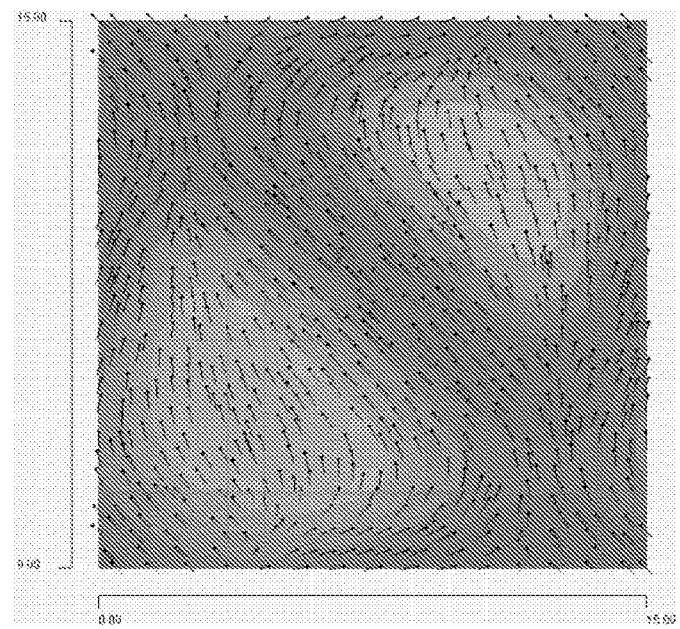
FIG. 24 is a simulation plan image illustrating behavior of the liquid crystal molecules in Working Example 3.

FIG. 24 is a simulation plan image illustrating behavior of the liquid crystal molecules in Working Example 3. As shown in FIG. 24, the liquid crystal molecules contained in the first segmented area D1, although varying by area, are mostly aligned with the inner profile lines of the electrodes. In other words, the liquid crystal molecules are aligned in a direction that is at approximately 45° to the initial alignment direction. Further, the change in angle is smooth and uniform. Similarly, the liquid crystal molecules contained in the second segmented area D2, although varying by area, are mostly aligned with the inner profile lines of the electrodes. In other words, the liquid crystal molecules are aligned in a direction that is at approximately 45° to the initial alignment direction. Further, the change in angle is smooth and uniform. Note also that, as illustrated in FIG. 24, the electric field in the area between the electrodes follows the inner profile lines of the electrode, resulting in the formation of triangular equipotential area boundaries.

Figure 25:
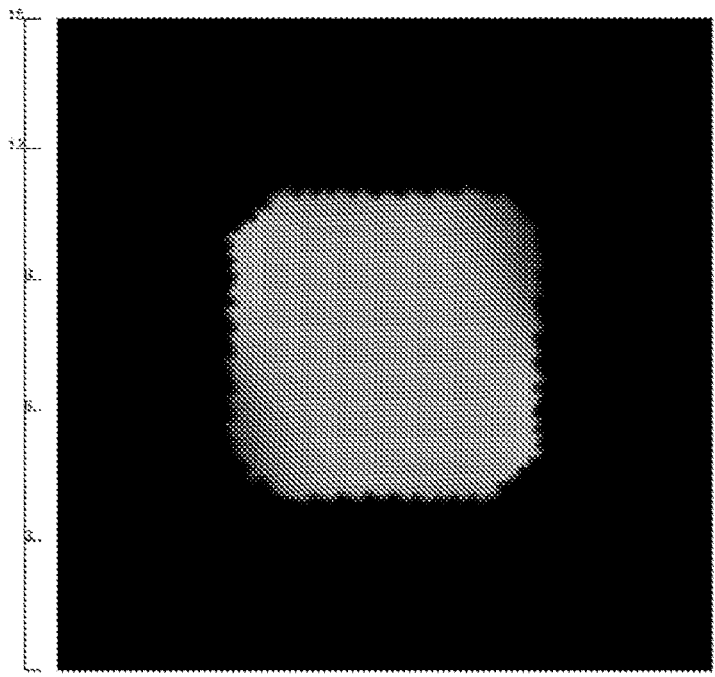
FIG. 25 is a plan image showing light transmittance using monochrome gradation for Working Example 3.
Figure 26:
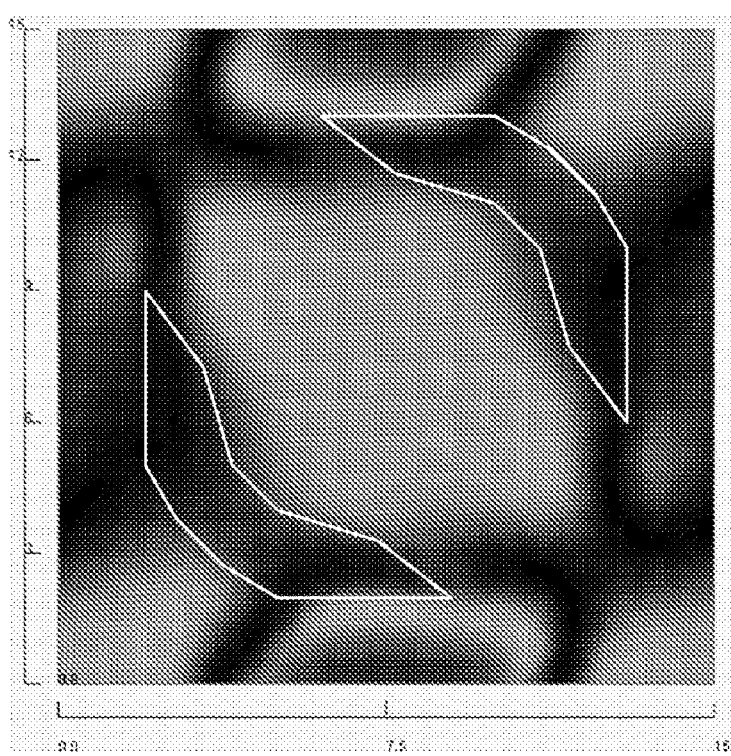
FIG. 26 is a plan image showing FIG. 25 in enlarged form with positions of electrodes added.
Figure 27:
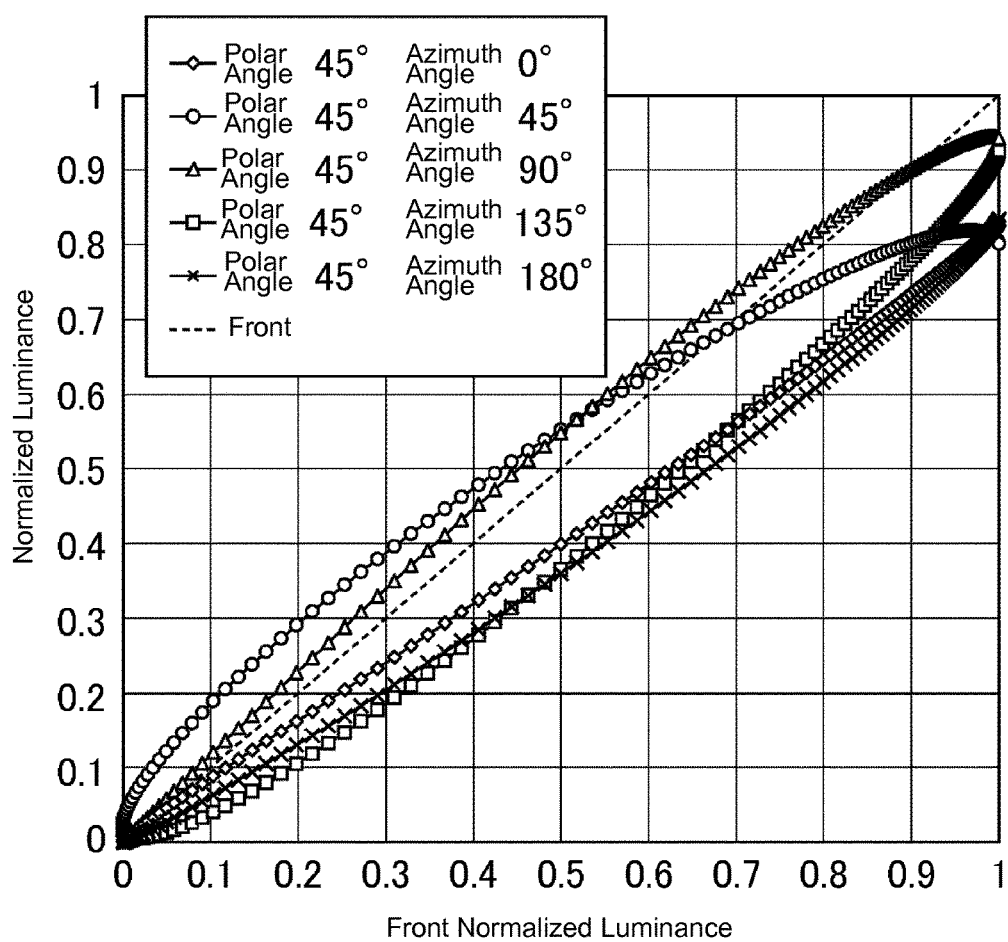
FIG. 27 is a graph showing viewing angle characteristics of Working Example 3.

FIG. 25 is a plan image showing light transmittance using monochrome gradation for Working Example 3, and FIG. 26 is an enlarged view of FIG. 25 with the electrode positions added. FIG. 27 is a graph showing viewing angle characteristics of Working Example 3. As illustrated in FIGS. 25 and 26, it can be seen from Working Example 3 that light is passed uniformly over the entire area corresponding to the openings in the black matrix, and a high transmittance can therefore be secured. With regard to viewing angle characteristics, although there is some variation in the positions of the end portions of the curves as illustrated in FIG. 27, brightness does not vary greatly with angle. Thus, it is clear that a substantially uniform display can be obtained irrespective of viewing angle inclination. Note also that the graph shown in FIG. 27 presents the result from the simulation using only a single combination of the pixel electrode and the common electrode. In the case that the combination of the pixel electrode and the common electrode represents a single electrode pair and the simulation is performed on two electrode pairs, Working Example 3 provides simulation results similar to those shown in FIG. 13 for Working Example 1.

Thus, with Embodiment 3 too, it was confirmed to be possible to obtain excellent transmittance and viewing angle characteristics.

Embodiment 4

Figure 28:
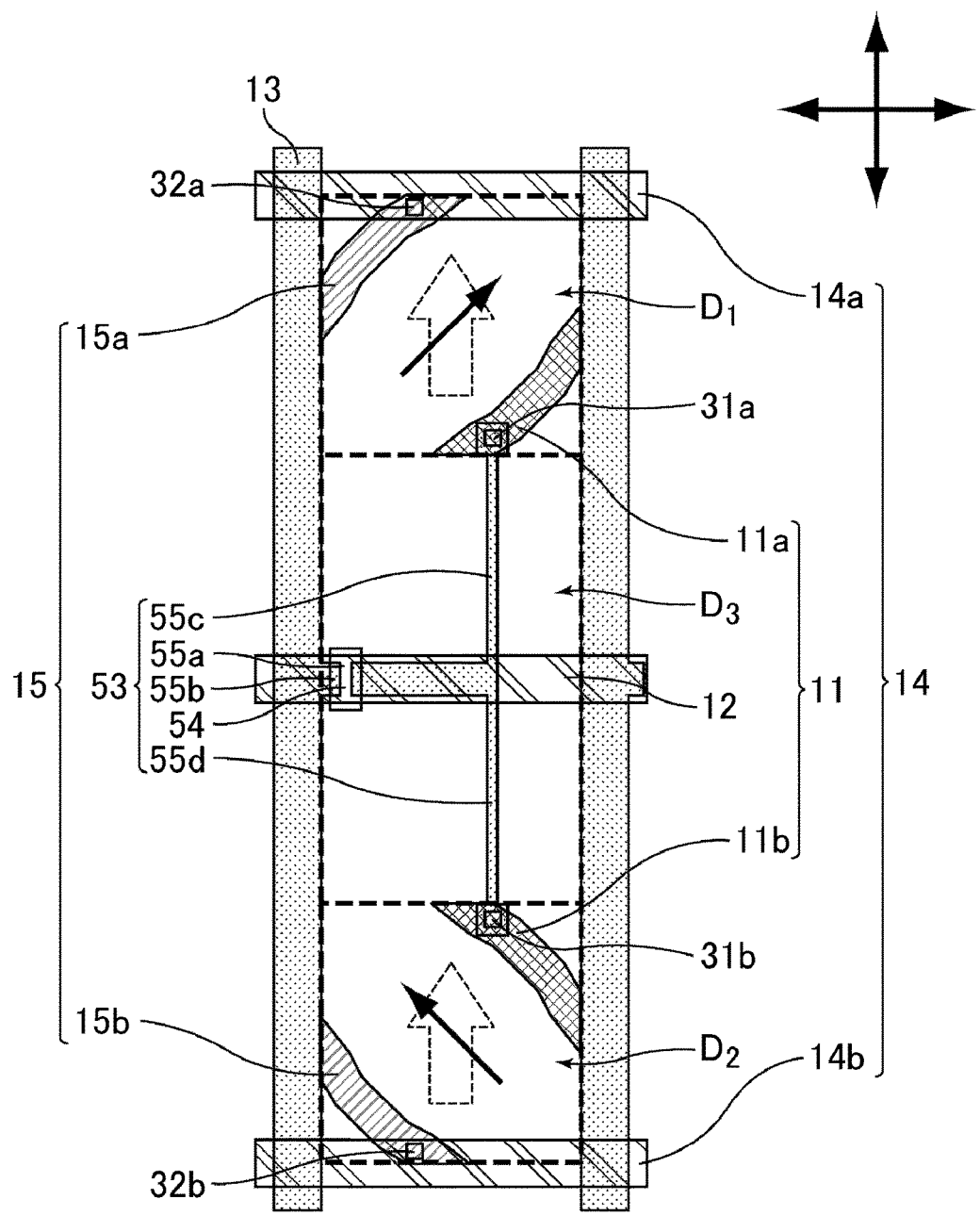
FIG. 28 is a schematic plan view showing a TFT substrate of the liquid crystal display device of Embodiment 4.
Figure 29:
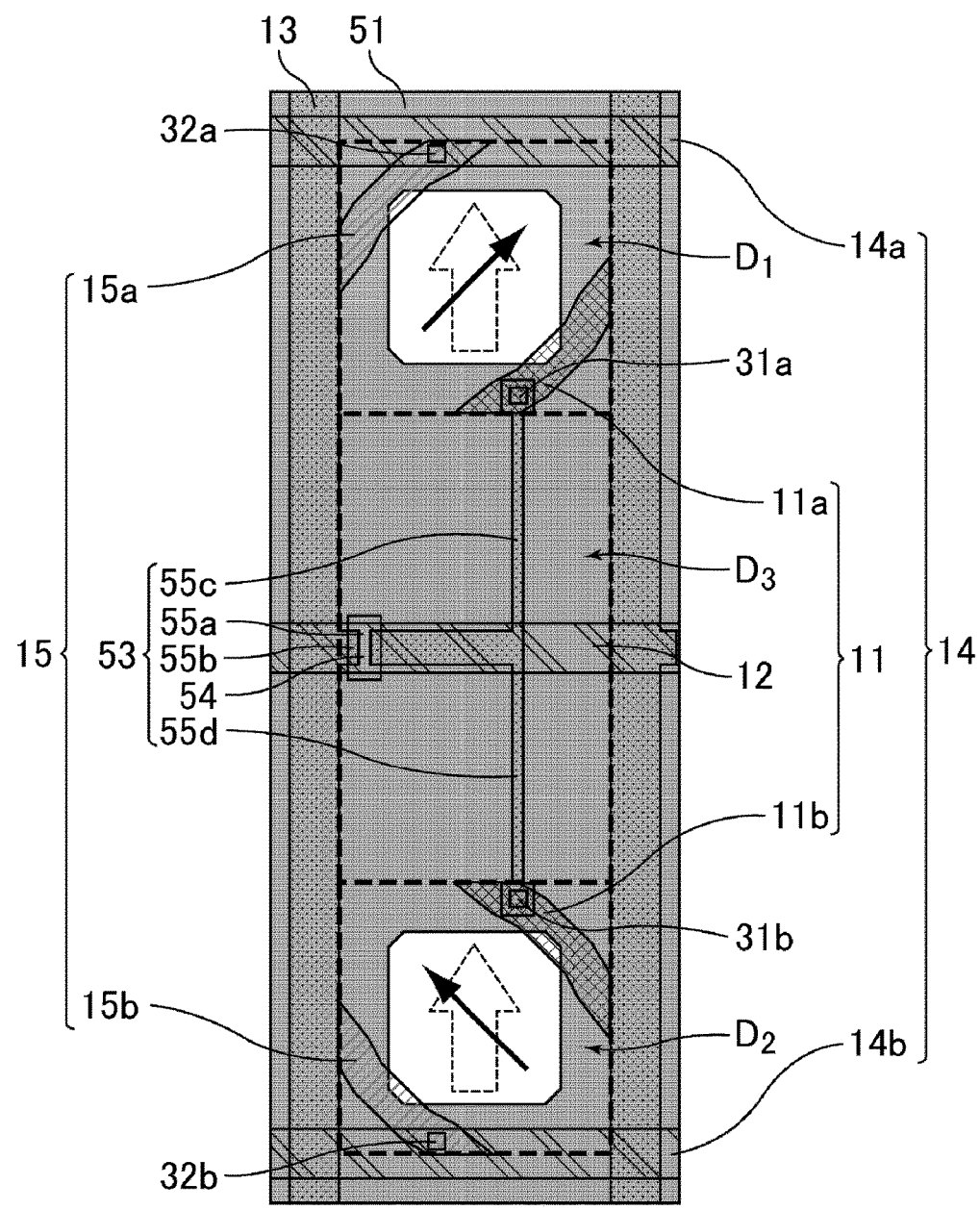
FIG. 29 is a schematic plan view showing the TFT substrate of Embodiment 4 with the location of a black matrix added.

Embodiment 4 is the same as Embodiment 1 except in that the form of the pixel electrode and common electrode differs and in that a distance between the pixel electrode and the common electrode is shorter. FIG. 28 is a schematic plan view of the TFT substrate of the liquid crystal display device of Embodiment 4, and FIG. 29 is a schematic plan view with the location of the black matrix added.

Figure 30:
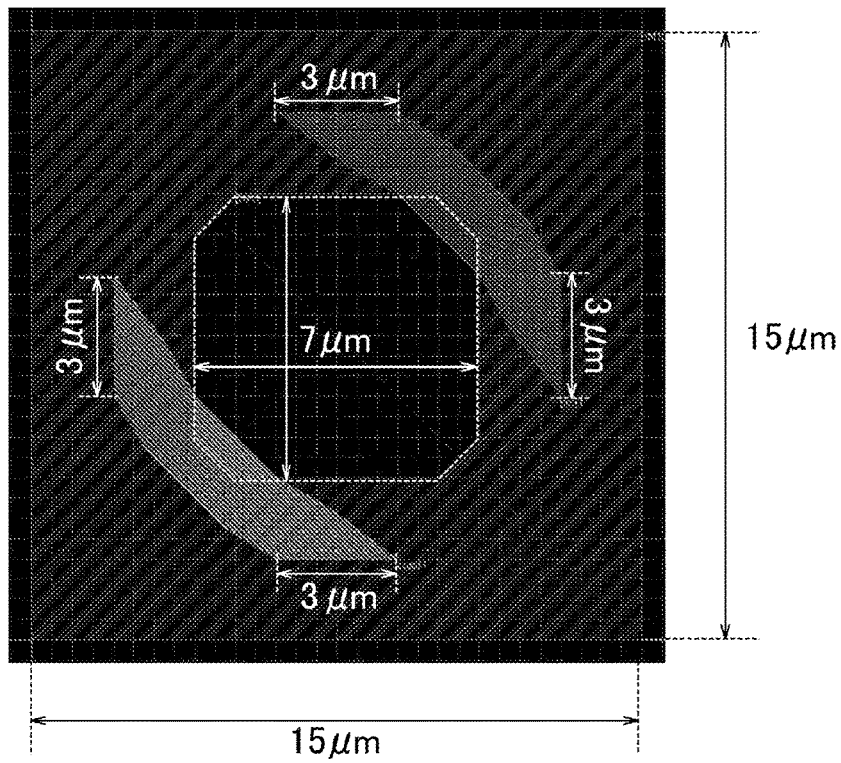
FIG. 30 is a plan view showing in extracted form the pixel electrode and the common electrode of Working Example 4.

When a specific simulation for the liquid crystal display device of Embodiment 4 was performed, the following results were obtained (Working Example 4). FIG. 30 is a plan view showing in extracted form the pixel electrode and the common electrode of Working Example 4. The simulation conditions for Working Example 4 are the same as for Working Example 1 except in the distance between the pixel electrode and the common electrode. The lengths of the outer profile lines at both end portions of the pixel electrode and the common electrode were set to 3 µm. The inner profile lines of the pixel electrode and the common electrode were formed using five lines inclined at different angles, and the angles formed between the lines were all obtuse. More specifically, angles between, among the five lines, the centrally-positioned line (inner profile line of the corner portion) and the lines on either side thereof were set to 157°. Further, angles between the outer profile line of the corner portion that links the outer profile lines of the end portions, and the outer profile lines of the end portions were set to 30°. A distance between the pixel electrode and the common electrode (specifically, the length of a line linking a deepest part of the corner portion of the pixel electrode to a deepest part of a corner portion of the common electrode) was set to 7.1 (=5√2) µm.

Figure 31:
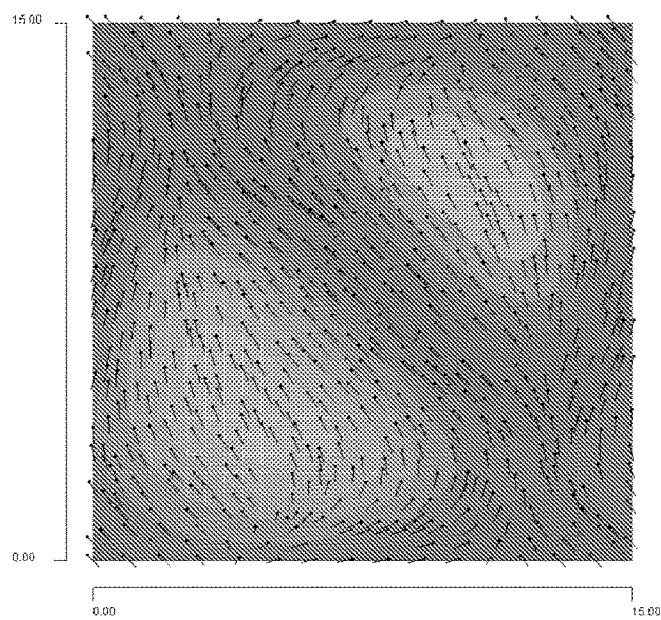
FIG. 31 is a simulation plan image illustrating behavior of the liquid crystal molecules in Working Example 4.

FIG. 31 is a simulation plan image illustrating behavior of the liquid crystal molecules in Working Example 4. As shown in FIG. 31, the liquid crystal molecules contained in the first segmented area D1, although varying by area, are mostly aligned with the inner profile lines of the electrodes.

In other words, the liquid crystal molecules are aligned in a direction that is at approximately 45° to the initial alignment direction. Further, the change in angle is smooth and uniform. Similarly, the liquid crystal molecules contained in the second segmented area D2, although varying by area, are mostly aligned with the inner profile lines of the electrodes. In other words, the liquid crystal molecules are aligned in a direction that is at approximately 45° to the initial alignment direction. Further, the change in angle is smooth and uniform. Note also that, as illustrated in FIG. 31, the electric field in the area between the electrodes follows the inner profile lines of the electrodes, resulting in the formation of triangular equipotential area boundaries.

Figure 32:
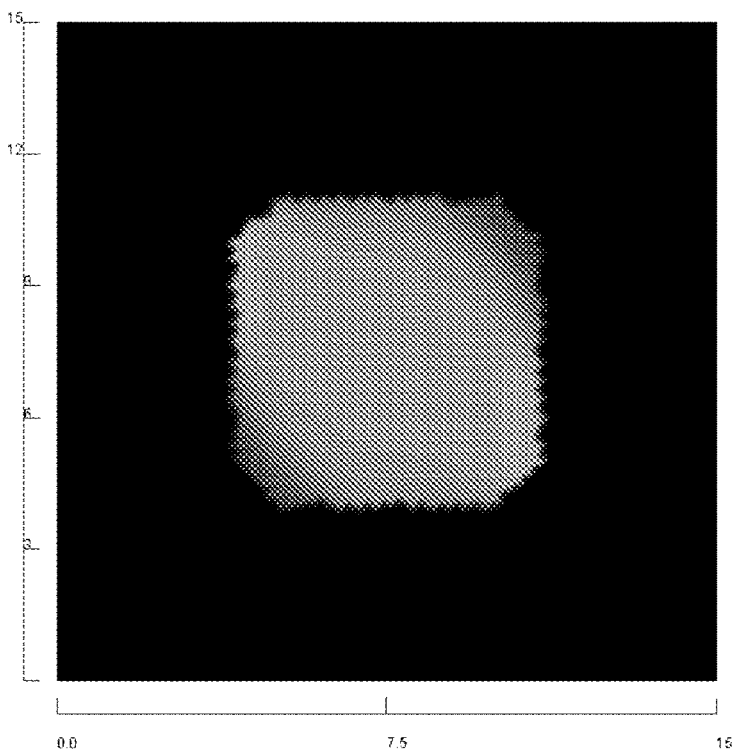
FIG. 32 is a plan image showing light transmittance using monochrome gradation for Working Example 4.
Figure 33:
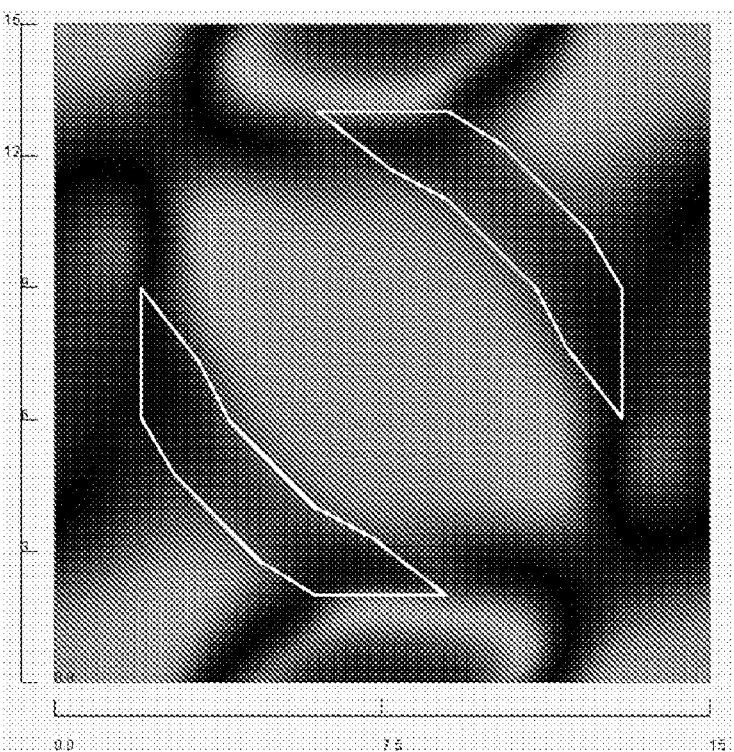
FIG. 33 is a plan image showing FIG. 32 in enlarged form with positions of electrodes added.
Figure 34:
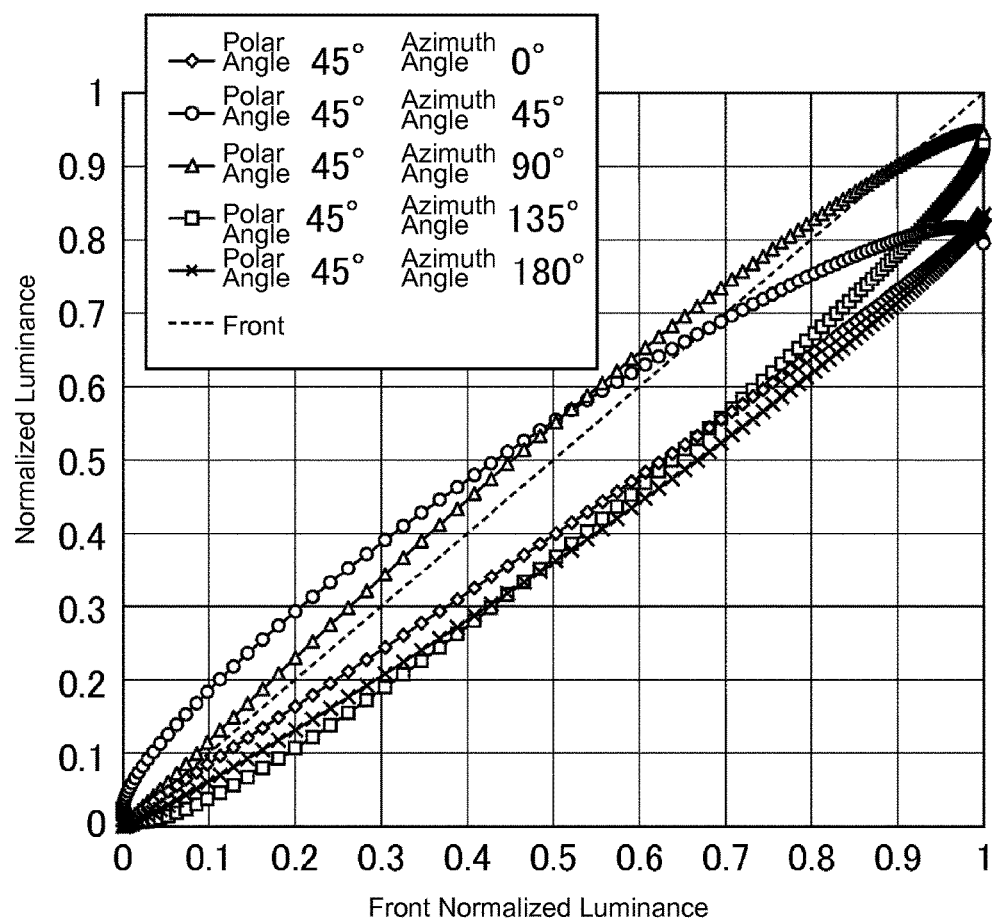
FIG. 34 is a graph showing viewing angle characteristics of Working Example 4.

FIG. 32 is a plan image showing light transmittance using monochrome gradation for Working Example 4, and FIG. 33 is an enlarged view of FIG. 32 with the electrode positions added. FIG. 34 is a graph showing viewing angle characteristics of Working Example 4. As illustrated in FIGS. 32 and 33, it can be seen from Working Example 4 that light is passed uniformly over the entire area corresponding to the openings in the black matrix, and a high transmittance can therefore be therefore secured. With regard to viewing angle characteristics, although there is some variation in the positions of the end portions of the curves as illustrated in FIG. 34, brightness does not vary greatly with angle. Thus, it is clear that a substantially uniform display can be obtained irrespective of viewing angle inclination. For Working Example 4 too, in the case that the combination of the pixel electrode and the common electrode represents a single electrode pair and the simulation is performed for two electrode pairs, simulation results similar to those shown in FIG. 13 for Working Example 1 can be obtained.

Thus, with Embodiment 4 too, it was confirmed to be possible to obtain excellent transmittance and viewing angle characteristics.

Embodiment 5

Figure 35:
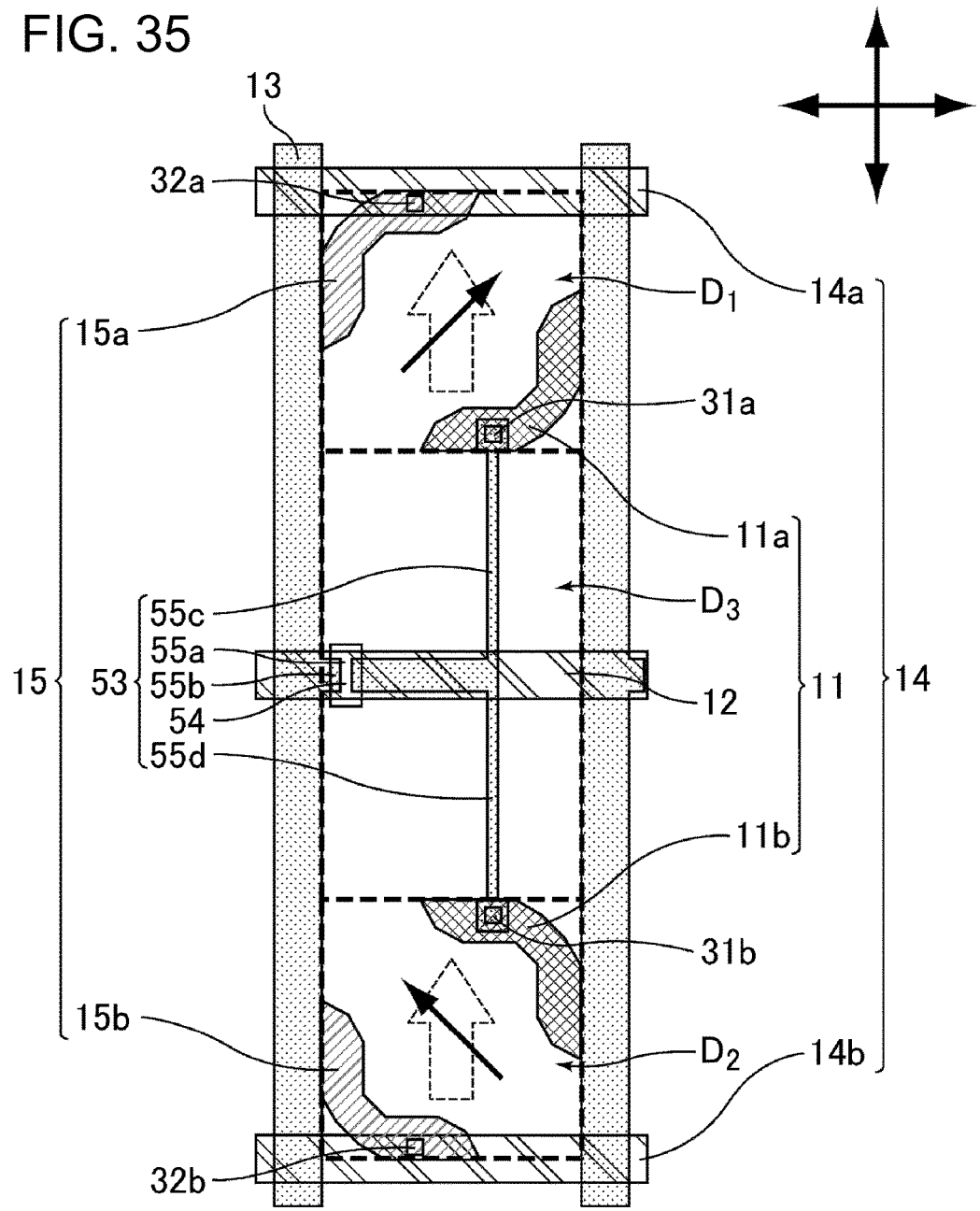
FIG. 35 is a schematic plan view showing a TFT substrate of the liquid crystal display device of Embodiment 5.
Figure 36:
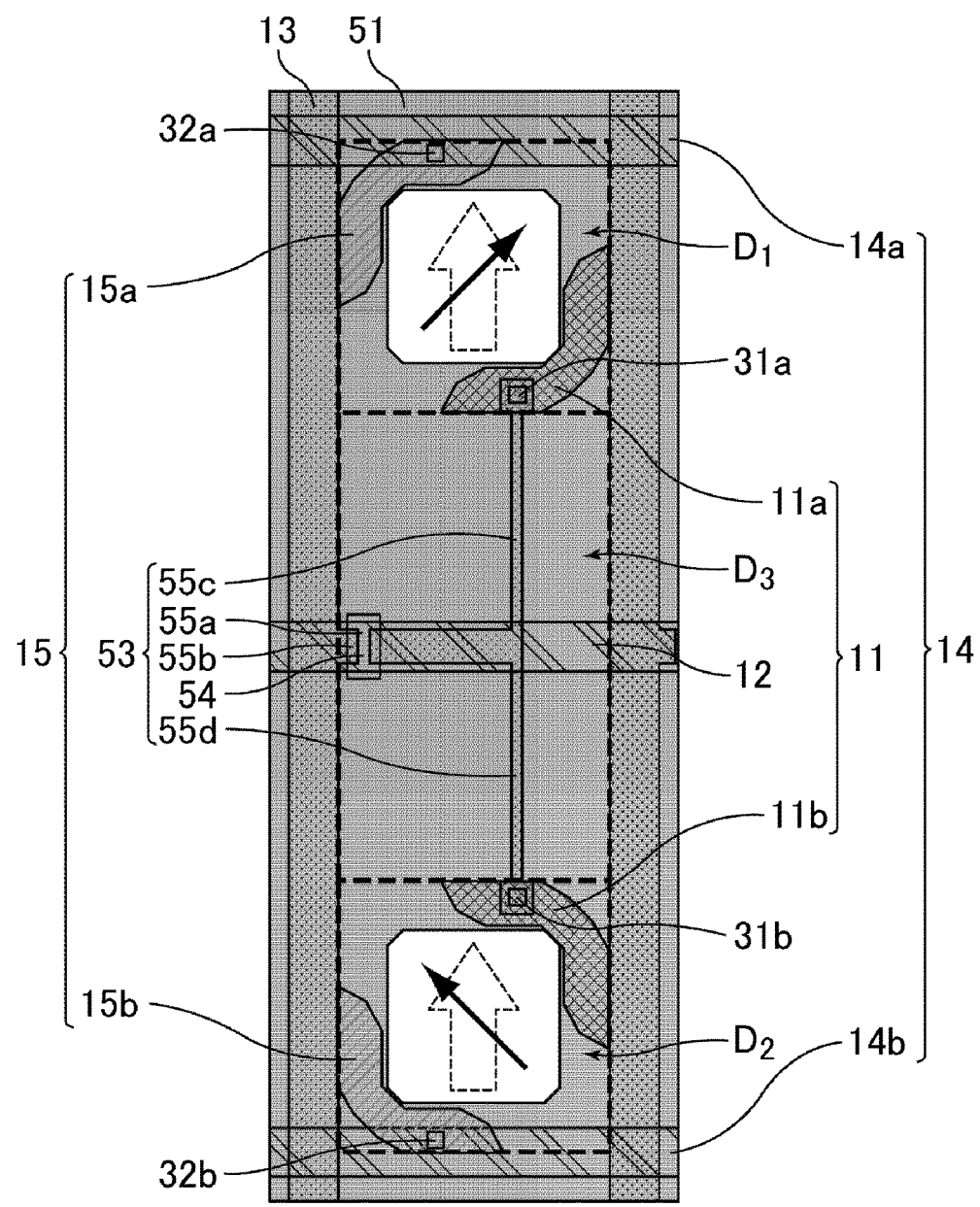
FIG. 36 is a schematic plan view showing the TFT substrate of Embodiment 5 with the location of a black matrix added.

Embodiment 5 is the same as Embodiment 1 except in that the form of the pixel electrode and common electrode differs. In Embodiment 5, the inner profile lines of the electrodes are designed to be perpendicular to each other and to follow the opening in the black matrix. FIG. 35 is a schematic plan view of the TFT substrate of the liquid crystal display device of Embodiment 5, and FIG. 36 is a schematic plan view with the location of the black matrix added.

Figure 37:
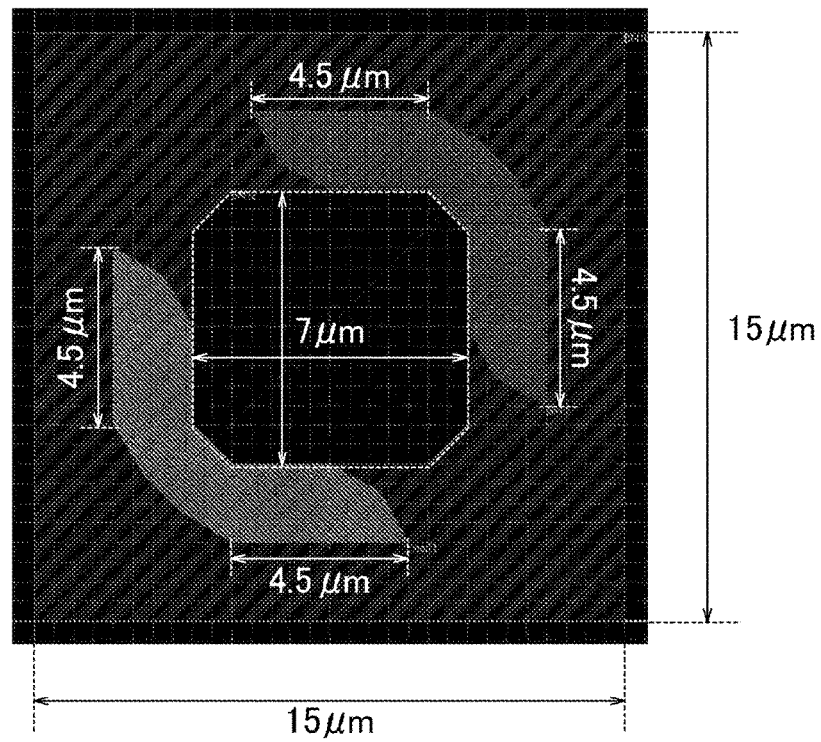
FIG. 37 is a plan view showing in extracted form the pixel electrode and the common electrode of Working Example 5.

When a specific simulation for the liquid crystal display device of Embodiment 5 was performed, the following results were obtained (Working Example 5). FIG. 37 is a plan view showing in extracted form the pixel electrode and the common electrode of Working Example 5. The simulation conditions for Working Example 5 are the same as for Working Example 1 except for the form of the pixel electrode and common electrode. The lengths of the outer profile lines at both end portions of the pixel electrode and the common electrode were set to 4.5 μm. The inner profile lines of the pixel electrode and the common electrode were formed using five lines inclined at different angles, and the angles formed between the lines were all obtuse. More specifically, angles between, among the five lines, the centrally-positioned line (inner profile line of the corner portion) and the lines on either side thereof were set to 135°. Further, angles between the outer profile line of the corner portion that links the outer profile lines of the end portions, and the outer profile lines of the end portions were set to 45°. A distance between the pixel electrode and the common electrode (specifically, the length of a straight line linking a deepest part of the corner portion of the pixel electrode to a deepest part of a corner portion of the common electrode) was set to 8.5 (=6√2) μm.

Figure 38:
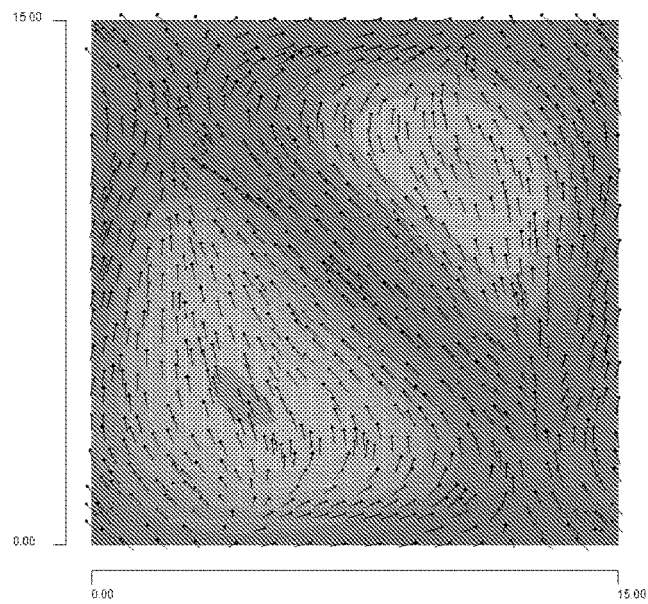
FIG. 38 is a simulation plan image illustrating behavior of the liquid crystal molecules in Working Example 5.

FIG. 38 is a simulation plan image illustrating behavior of the liquid crystal molecules in Working Example 5. As shown in FIG. 38, compared with the Working Examples 1 to 4, the liquid crystal molecules contained in the first segmented area D1 have a smaller range over which the desired orientation can be obtained due to the inclusion of the two lines forming a substantial right angle among the inner profile lines of the electrodes. Even so, the liquid crystal molecules are mostly aligned along the inner profile lines of the electrodes in a direction that is at approximately 45° to the initial alignment direction. Further, the change in angle is smooth and uniform. Similarly, compared with the Working Examples 1 to 4, the liquid crystal molecules contained in the second segmented area D2 have a smaller range over which the desired orientation can be obtained due to the formation of the substantial right angle in the inner profile lines of the electrodes. Even so, the liquid crystal molecules are mostly aligned along the inner profile lines of the electrodes in a direction that is at approximately 45° to the initial alignment direction. Further, the change in angle is smooth and uniform. Note also that, as illustrated in FIG. 38, the electric field in the area between the electrodes follows the inner profile lines of the electrodes, resulting in the formation of equipotential area boundaries with a right-angled triangular form.

Figure 39:
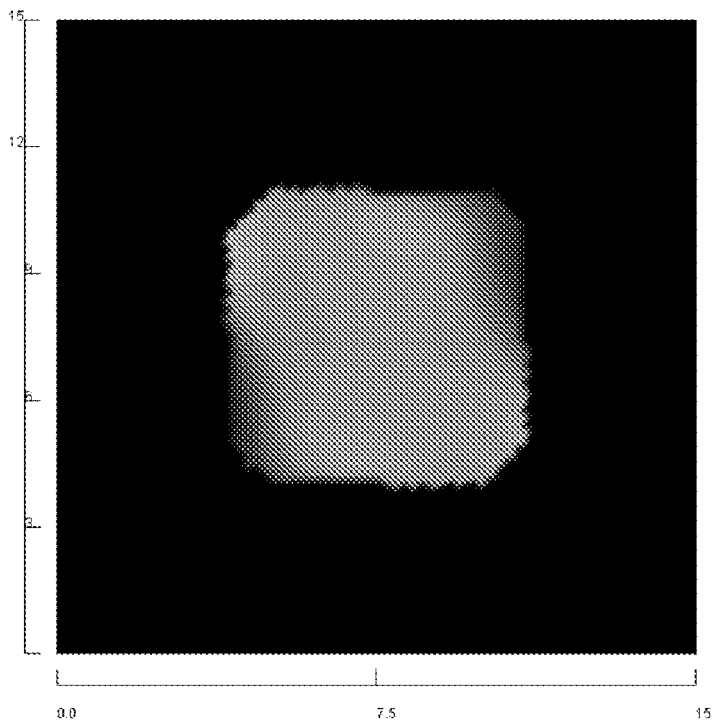
FIG. 39 is a plan image showing light transmittance using monochrome gradation for Working Example 5.
Figure 40:
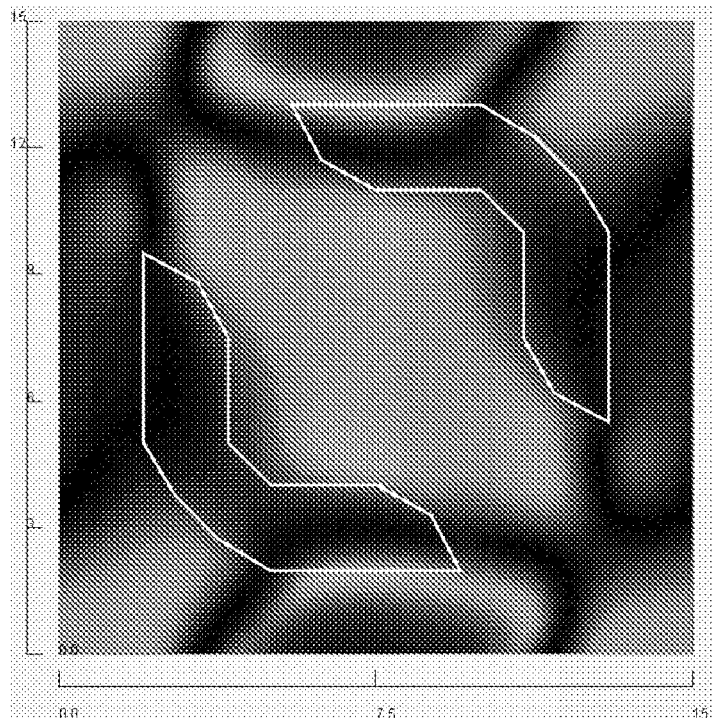
FIG. 40 is a plan image showing FIG. 39 in enlarged form with positions of electrodes added.
Figure 41:
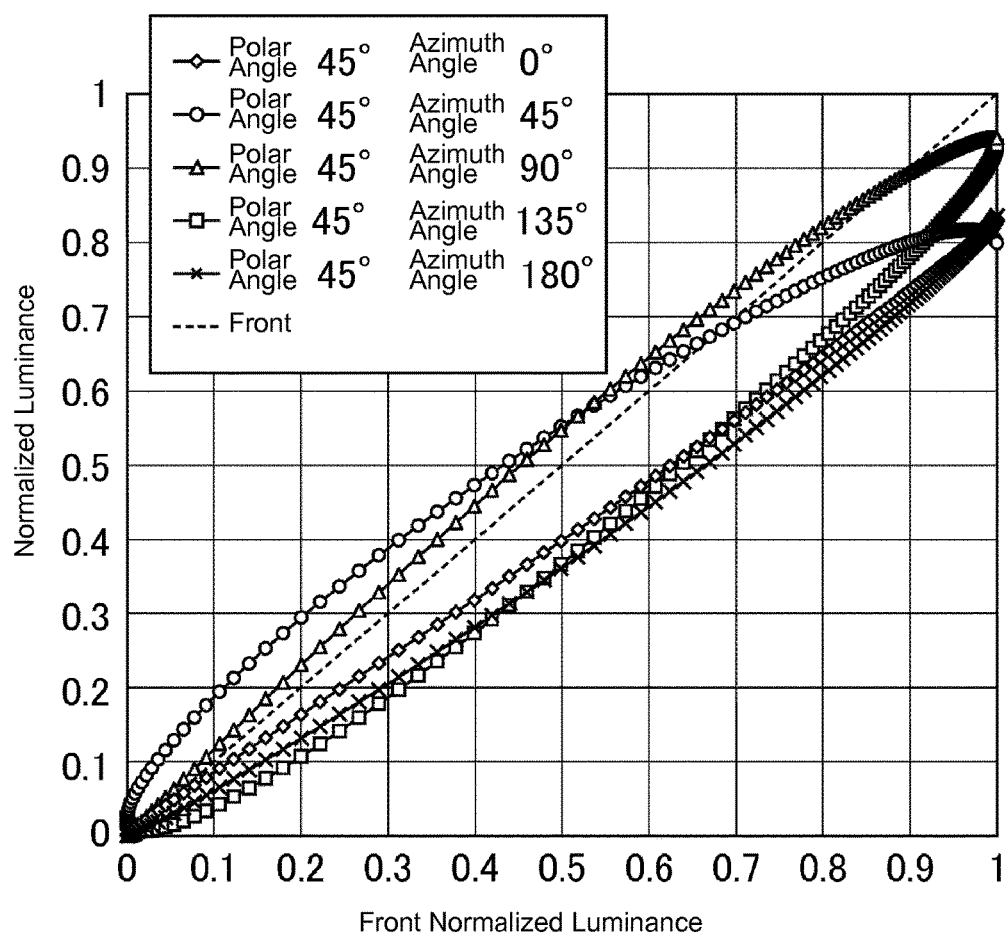
FIG. 41 is a graph showing viewing angle characteristics of Working Example 5.

FIG. 39 is a plan image showing light transmittance using monochrome gradation for Working Example 5, and FIG. 40 is an enlarged view of FIG. 39 with the electrode positions added. FIG. 41 is a graph showing viewing angle characteristics of Working Example 5. As illustrated in FIGS. 39 and 40, it can be seen from Working Example 5 that although transmittance drops slightly in the corners of the region that forms the opening in the black matrix, sufficient transmittance can be secured when the region is viewed as whole. With regard to viewing angle characteristics, although there is some variation in the positions of the end portions of the curves as illustrated in FIG. 41, brightness does not vary greatly with angle. Thus, it is clear that a substantially uniform display can be obtained irrespective of viewing angle inclination. For Working Example 5 too, in the case that the combination of the pixel electrode and the common electrode represents a single electrode pair and the simulation is performed for two electrode pairs, simulation results similar to those shown in FIG. 13 for Working Example 1 can be obtained.

Thus, with Embodiment 5 too, it was confirmed to be possible to obtain satisfactory transmittance and viewing angle characteristics. In Embodiment 5, the inner profile lines of the electrodes include two mutually perpendicular lines. Hence, substantially the same display characteristics can be obtained whether the initial orientation of the liquid crystal molecules is vertical or horizontal. This arrangement has the advantage of increasing the degree of freedom available in the design. Further details are given in the below-described Embodiment 6.

Embodiment 6

Figure 42:
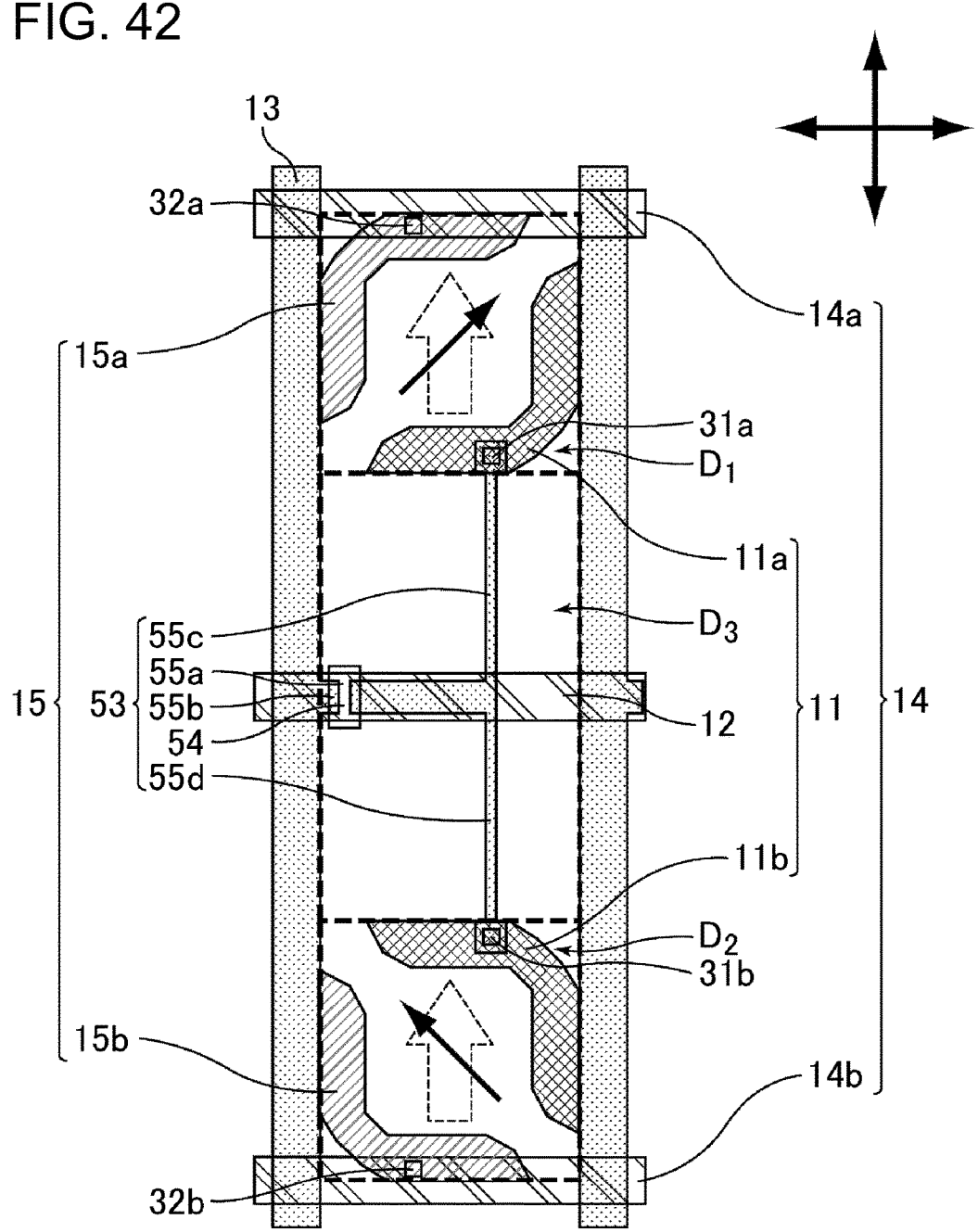
FIG. 42 is a schematic plan view showing a TFT substrate of the liquid crystal display device of Embodiment 6.
Figure 43:
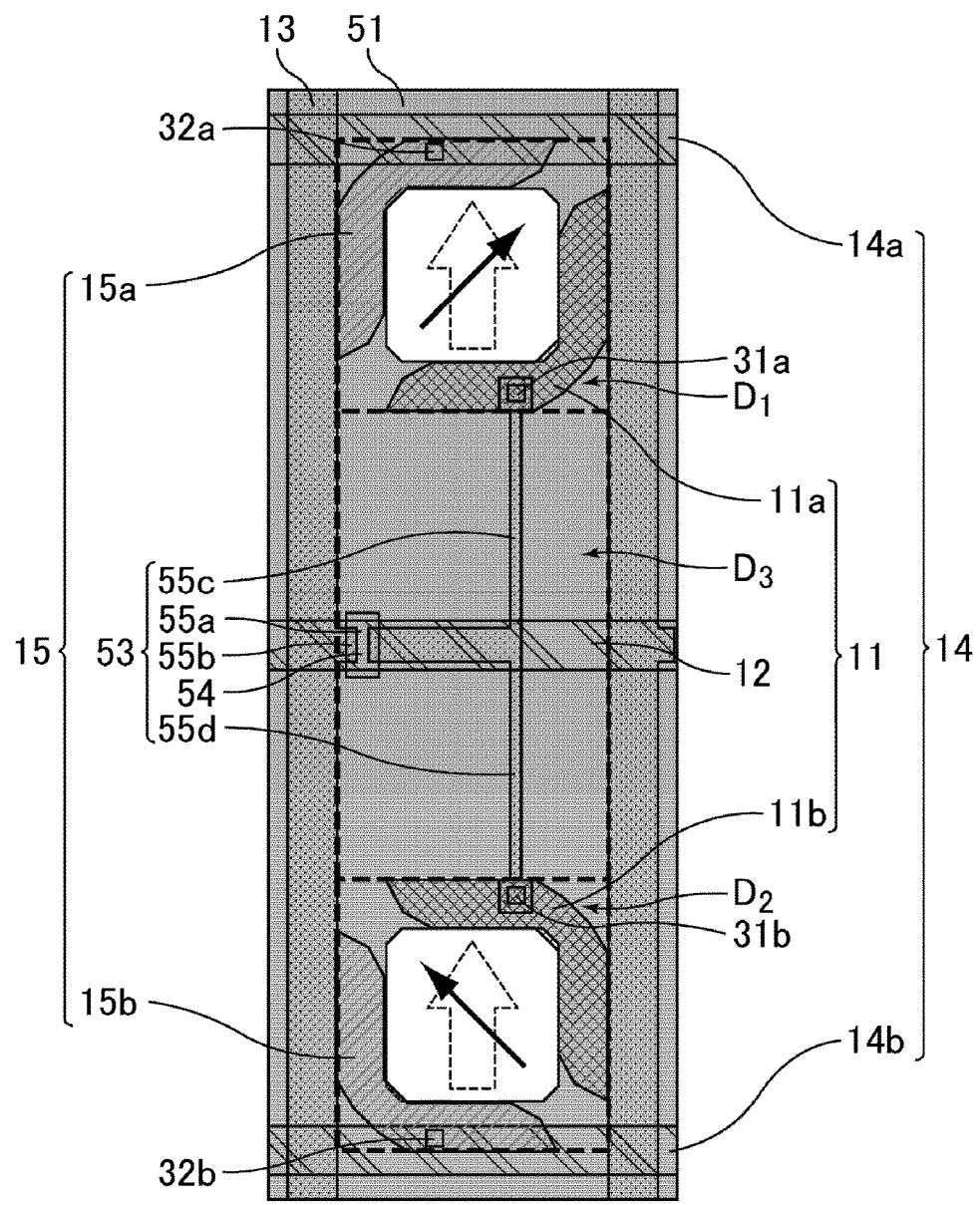
FIG. 43 is a schematic plan view showing the TFT substrate of Embodiment 6 with the location of a black matrix added.

Embodiment 6 is the same as Embodiment 1 except in that the form of the pixel electrode and common electrode differs. In Embodiment 6, the inner profile lines of the electrodes are designed to be perpendicular to each other and to follow the opening in the black matrix. In addition, a length of end portions of the electrodes is longer than that of Embodiment 1. FIG. 42 is a schematic plan view of the TFT substrate of the liquid crystal display device of Embodiment 6, and FIG. 43 is a schematic plan view with the location of the black matrix added.

Figure 44:
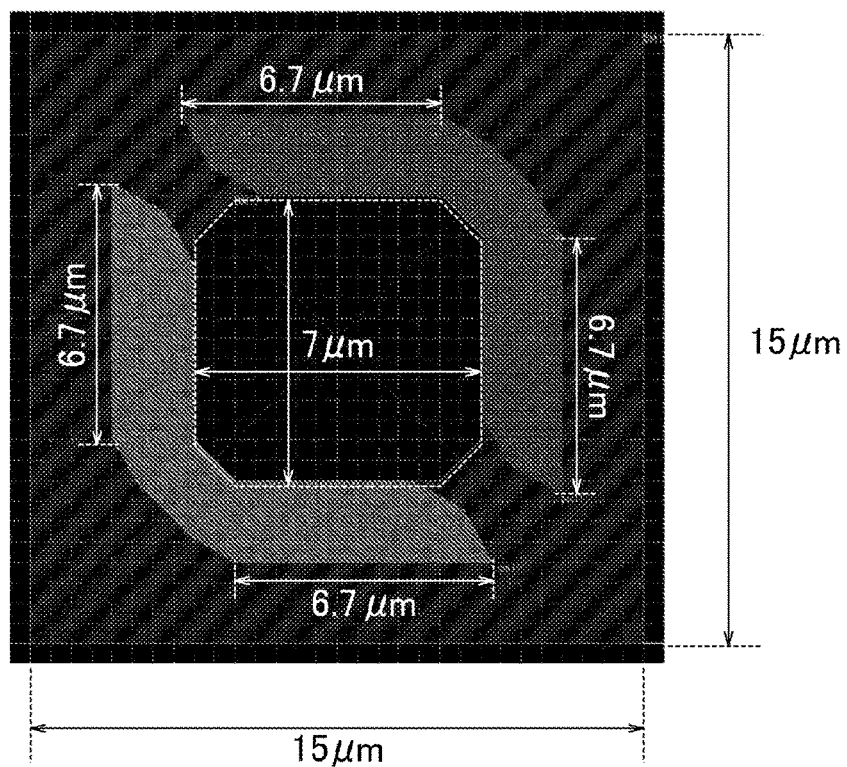
FIG. 44 is a plan view showing in extracted form the pixel electrode and the common electrode of Working Example 6-1.

When a specific simulation for the liquid crystal display device of Embodiment 6 was performed, the following results were obtained (Working Example 6-1). FIG. 44 is a plan view showing in extracted form the pixel electrode and the common electrode of Working Example 6-1. The simulation conditions for Working Example 6-1 are the same as for Working Example 1 except for the form of the pixel electrode and common electrode. The lengths of the outer profile lines at both end portions of the pixel electrode and the common electrode were set to 6.7 µm. The inner profile lines of the pixel electrode and the common electrode were formed using five lines inclined at different angles, and the angles formed between the lines were all obtuse. More specifically, angles between, among the five lines, the centrally-positioned line (inner profile line of the corner portion) and the lines on either side thereof were set to 135°. Further, angles between the outer profile line of the corner portion that links the outer profile lines of the end portions, and the outer profile lines of the end portions were set to 45°. A distance between the pixel electrode and the common electrode (specifically, the length of a straight line linking a deepest part of the corner portion of the pixel electrode to a deepest part of a corner portion of the common electrode) was set to 8.5 ($=6\sqrt{2}$) µm.

Figure 45:
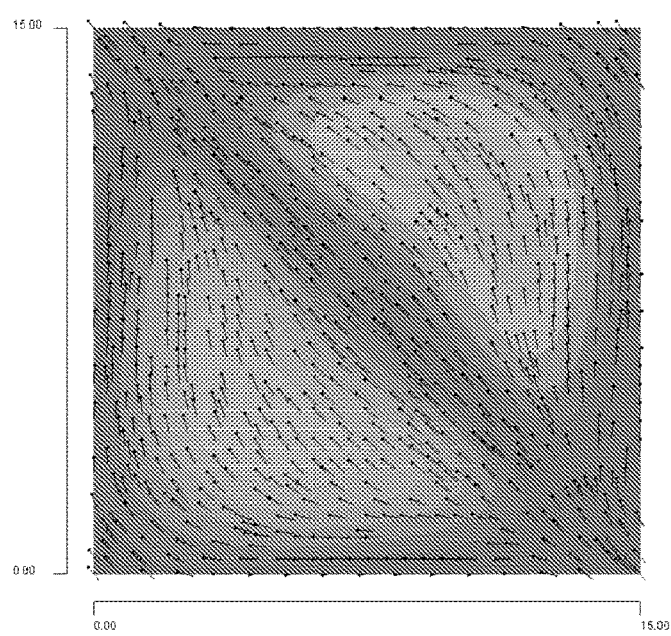
FIG. 45 is a simulation plan image illustrating behavior of the liquid crystal molecules in Working Example 6-1.

FIG. 45 is a simulation plan image illustrating behavior of the liquid crystal molecules in Working Example 6-1. As shown in FIG. 45, compared with the Working Examples 1 to 4, the liquid crystal molecules contained in the first segmented area D1 have a smaller range over which the desired orientation can be obtained due to the inclusion of the two lines forming a substantial right angle among the inner profile lines of the electrodes. Even so, the liquid crystal molecules are mostly aligned along the inner profile lines of the electrodes in a direction that is at approximately 45° to the initial orientation direction. Further, the change in angle is smooth and uniform. Similarly, compared with the Working Examples 1 to 4, the liquid crystal molecules contained in the second segmented area D2 have a smaller range over which the desired orientation can be obtained due to the inclusion of the two lines forming a right angle among the inner profile lines of the electrodes. Even so, the liquid crystal molecules are mostly aligned along the inner profile lines of the electrodes in a direction that is at approximately 45° to the initial orientation direction. Further, the change in angle is smooth and uniform. Note also that, as illustrated in FIG. 45, the electric field in the area between the electrodes follows the inner profile lines of the electrodes, resulting in the formation of equipotential area boundaries with a right-angled triangular form.

Figure 46:
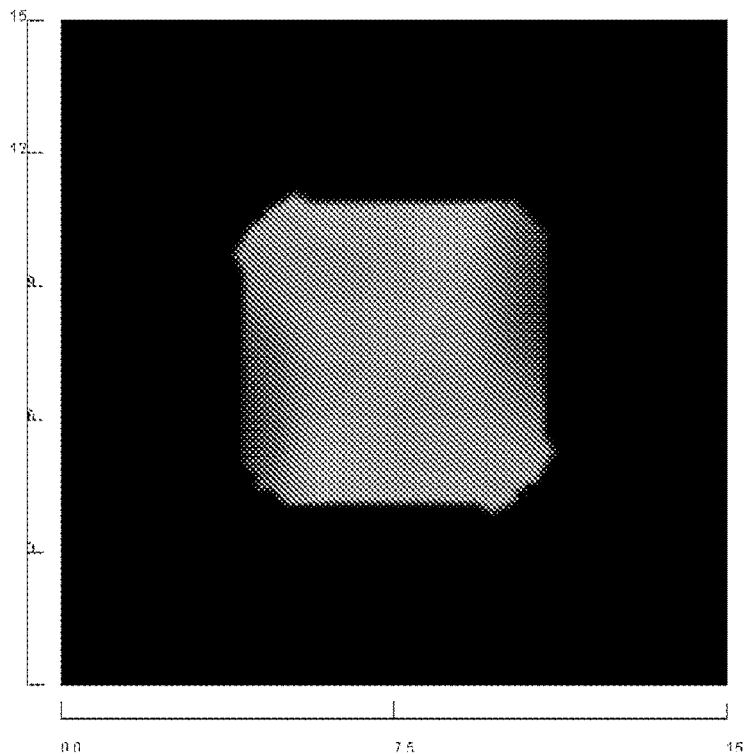
FIG. 46 is a plan image showing light transmittance using monochrome gradation for Working Example 6-1.
Figure 47:
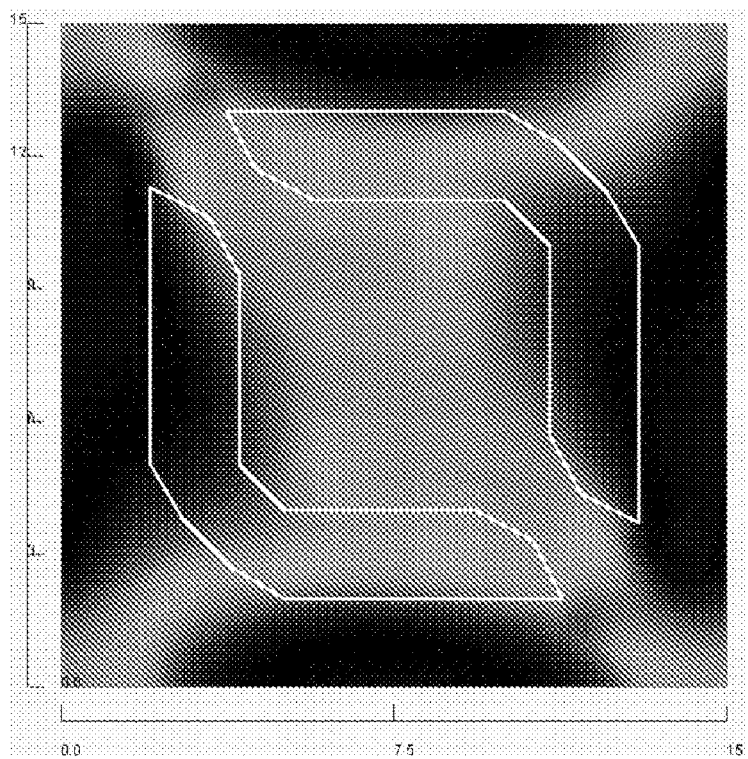
FIG. 47 is a plan image showing FIG. 46 in enlarged form with positions of electrodes added.
Figure 48:
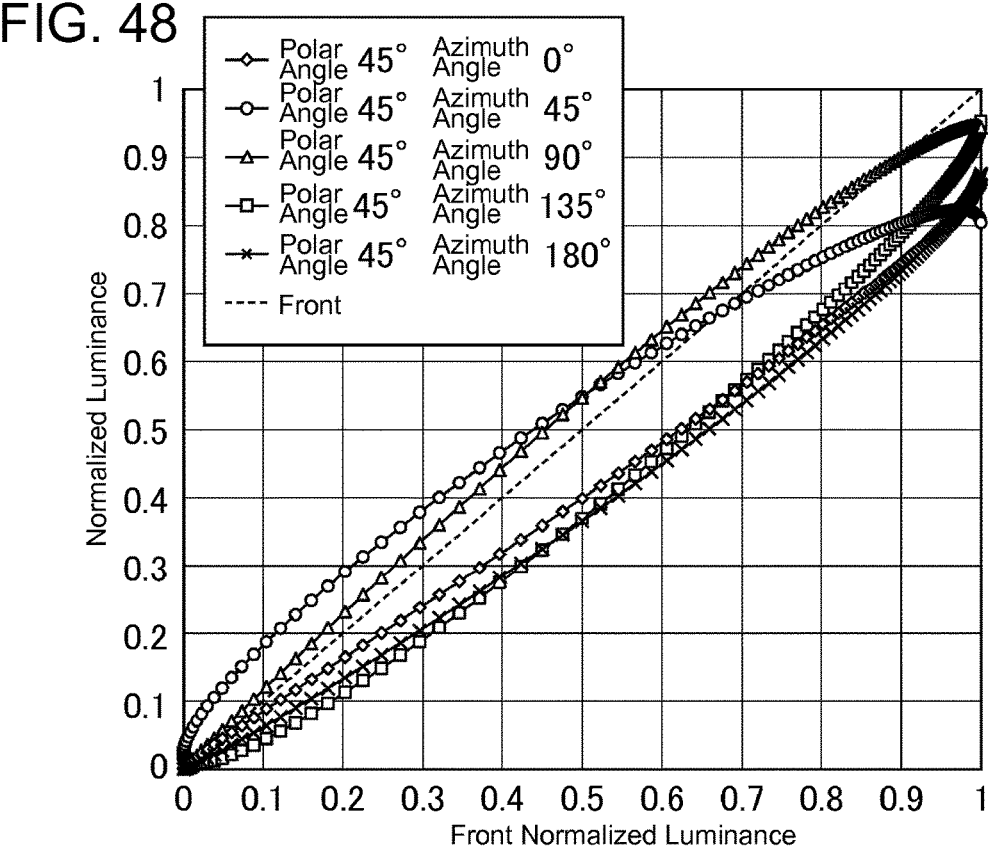
FIG. 48 is a graph showing viewing angle characteristics of Working Example 6-1.

FIG. 46 is a plan image showing light transmittance using monochrome gradation for Working Example 6-1, and FIG. 47 is an enlarged view of FIG. 46 with the electrode positions added. FIG. 48 is a graph showing viewing angle characteristics of Working Example 6-1. As illustrated in FIGS. 46 and 47, it can be seen from Working Example 6-1 that although transmittance drops slightly in the corners of the region that forms the opening in the black matrix, sufficient transmittance can be secured when the region is viewed as whole. With regard to viewing angle characteristics, although there is some variation in the positions of the end portions of the curves as illustrated in FIG. 48, brightness does not vary greatly with angle. Thus, it is clear that a substantially uniform display can be obtained irrespective of viewing angle inclination. For Working Example 6-1 too, in the case that the combination of the pixel electrode and the common electrode represents a single electrode pair and the simulation is performed for two electrode pairs, simulation results similar to those shown in FIG. 13 for Working Example 1 can be obtained.

Thus, with Embodiment 6 too, it was confirmed to be possible to obtain satisfactory transmittance and viewing angle characteristics.

For Embodiment 6, an additional test (Working Example 6-2) was performed to verify the case in which the initial orientation direction was changed. Specifically, whereas in Working Example 6-1 the initial orientation direction was set to be vertical (long-side direction of pixel) as in Working Example 1, in Working Example 6-2 the initial orientation direction was set to be horizontal (short-side direction of pixel) as in Working Example 2.

The simulation conditions for Working Example 6-2 are the same as for Working Example 2 except for the form of the pixel electrode and common electrode. The lengths of the outer profile lines at both end portions of the pixel electrode and the common electrode were set to 6.7 µm. The inner profile lines of the pixel electrode and the common electrode were formed using five lines inclined at different angles, and the angles formed between the lines were all obtuse. More specifically, angles between, among the five lines, the centrally-positioned line (inner profile line of the corner portion) and the lines on either side thereof were set to 135°. Further, angles between the outer profile line of the corner portion that links the outer profile lines of the end portions, and the outer profile lines of the end portions were set to 45°. A distance between the pixel electrode and the common electrode (specifically, the length of a straight line linking a deepest part of the corner portion of the pixel electrode to a deepest part of a corner portion of the common electrode) was set to 8.5 ($=6\sqrt{2}$) µm.

Figure 49:
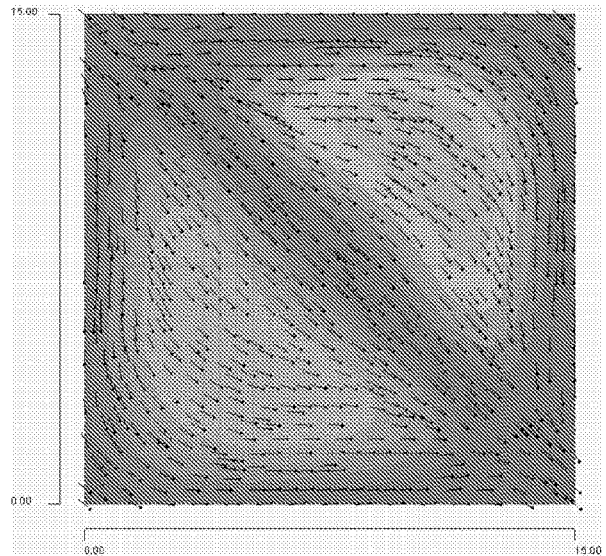
FIG. 49 is a simulation plan image illustrating behavior of the liquid crystal molecules in Working Example 6-2.

FIG. 49 is a simulation plan image illustrating behavior of the liquid crystal molecules in Working Example 6-2. As shown in FIG. 49, compared with the Working Examples 1 to 4, the liquid crystal molecules contained in the first segmented area D1 have a smaller range over which the desired orientation can be obtained due to the inclusion of the two lines forming a substantial right angle among the inner profile lines of the electrodes. Even so, the liquid crystal molecules are mostly aligned along the inner profile lines of the electrodes in a direction that is at approximately 45° to the initial orientation direction. Further, the change in angle is smooth and uniform. Similarly, compared with the Working Examples 1 to 4, the liquid crystal molecules contained in the second segmented area D2 have a smaller range over which the desired orientation can be obtained due to the inclusion of the two lines forming a right angle among the inner profile lines of the electrodes. Even so, the liquid crystal molecules are mostly aligned along the inner profile lines of the electrodes in a direction that is at approximately 45° to the initial orientation direction. Further, the change in angle is smooth and uniform. Note also that, as illustrated in FIG. 49, the electric field in the area between the electrodes follows the inner profile lines of the electrodes, resulting in the formation of equipotential area boundaries with a right-angled triangular form.

Figure 50:
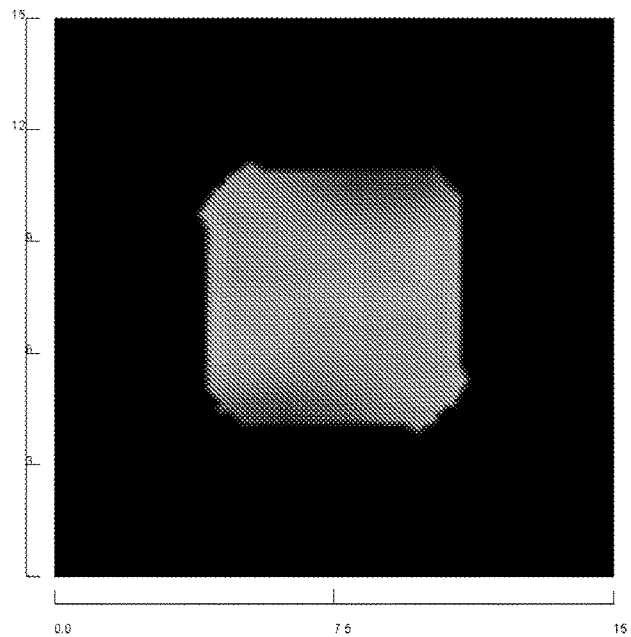
FIG. 50 is a plan image showing light transmittance using monochrome gradation for Working Example 6-2.
Figure 51:
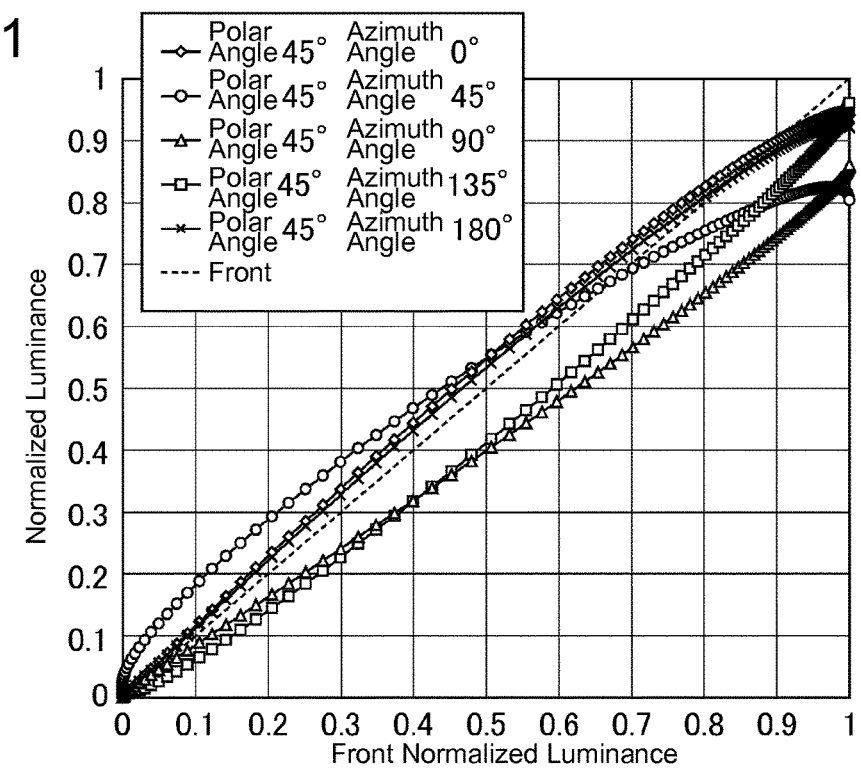
FIG. 51 is a graph showing viewing angle characteristics of Working Example 6-2.

FIG. 50 is a plan image showing light transmittance using monochrome gradation for Working Example 6-2. FIG. 51 is a graph showing viewing angle characteristics of Working Example 6-2. As illustrated in FIG. 50, it can be seen from Working Example 6-2 that although transmittance drops slightly in the corners of the region that forms the opening in the black matrix, sufficient transmittance can be secured when the region is viewed as whole. With regard to viewing angle characteristics, although there is some variation in the positions of the end portions of the curves as illustrated in FIG. 51, brightness does not vary greatly with angle. Thus, it is clear that a substantially uniform display can be obtained irrespective of viewing angle inclination. For Working Example 6-2 too, in the case that the combination of the pixel electrode and the common electrode represents a single electrode pair and the simulation is performed for two electrode pairs, simulation results similar to those shown in FIG. 13 for Working Example 1 can be obtained.

As can be seen by comparing FIG. 46 and FIG. 50, although the locations where transmittance drops are different, the ranges over which the drops occur are substantially equal, and the two arrangements therefore have substantially the equal transmittance overall. Further, with regard to viewing angle characteristics, as can be seen by comparing FIG. 48 and FIG. 51, substantially similar curves are obtained for varying inclines. Hence, the viewing angle characteristics of the two arrangements rare substantially equal.

As described above, according to Embodiment 6, when the initial orientation of the liquid crystal molecules was set to each of vertical and horizontal, it was possible to obtain substantially the same display characteristics. Hence, it is clearly possible to increase the degree of freedom available in the design.

Embodiment 7

Figure 52:
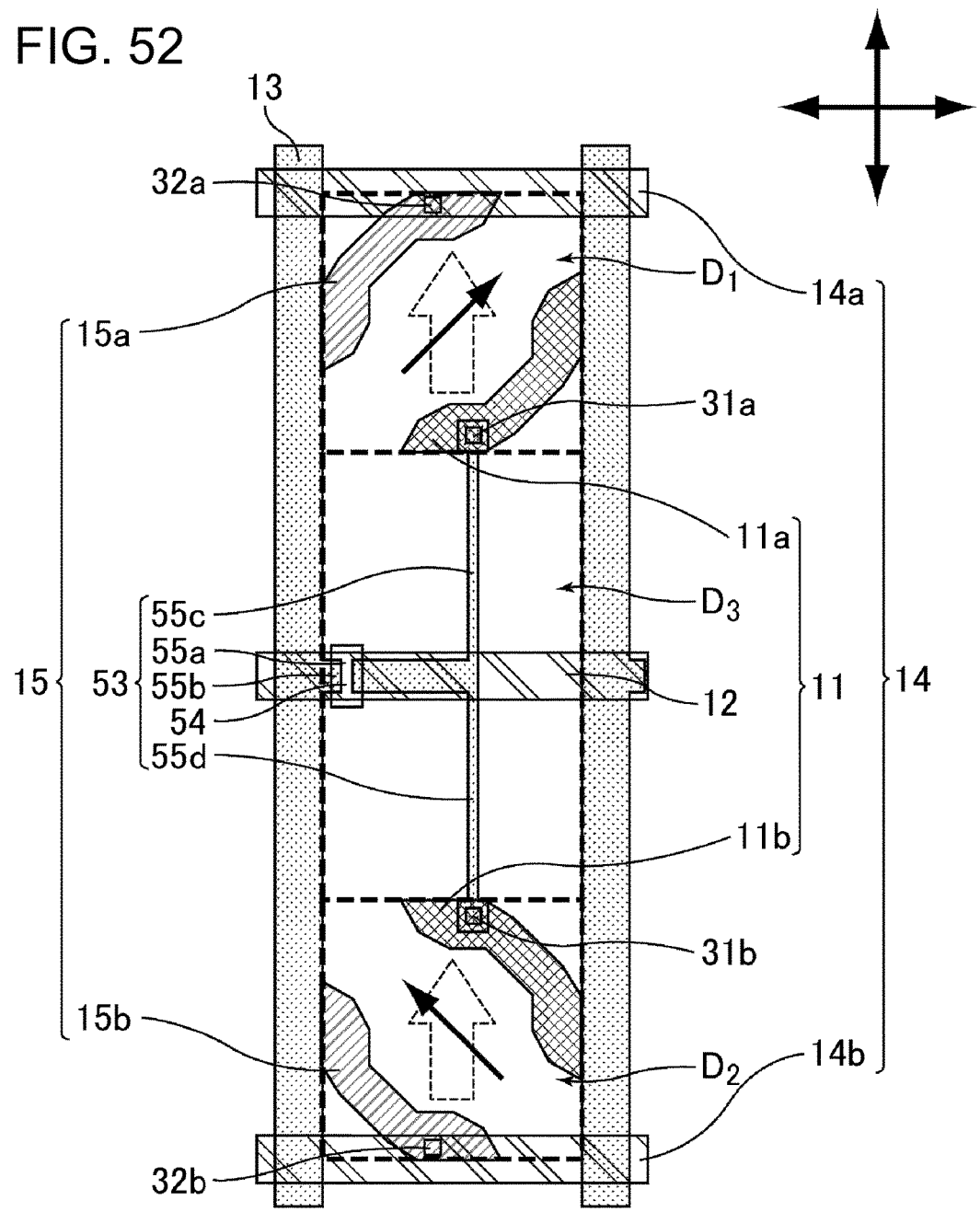
FIG. 52 is a schematic plan view showing a TFT substrate of the liquid crystal display device of Embodiment 7.
Figure 53:
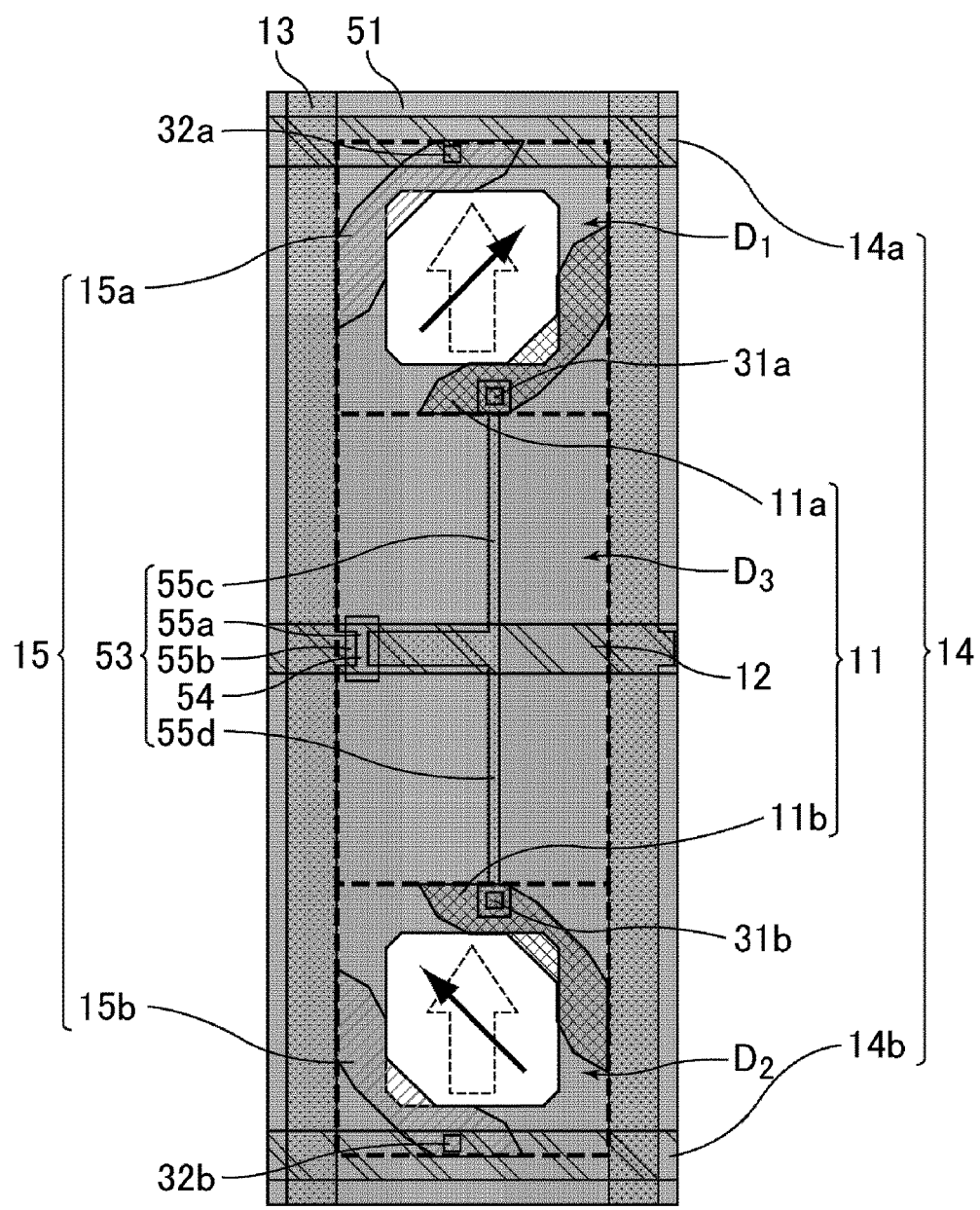
FIG. 53 is a schematic plan view showing the TFT substrate of Embodiment 7 with the location of a black matrix added.

Embodiment 7 is the same as Embodiment 1 except in that the form of the pixel electrode and common electrode differs and in that a distance between the pixel electrode and the common electrode is shorter. In Embodiment 7, the inner profile lines of the end portions of the electrodes are designed to be perpendicular to each other and to follow the opening in the black matrix. In addition, a length of the inner profile line of the corner portion of each electrode is greater than in Embodiment 1 while the distance between the pixel electrode and the common electrode is shorter than in Embodiment 1. FIG. 52 is a schematic plan view of the TFT substrate of the liquid crystal display device of Embodiment 7, and FIG. 53 is a schematic plan view with the location of the black matrix added.

Figure 54:
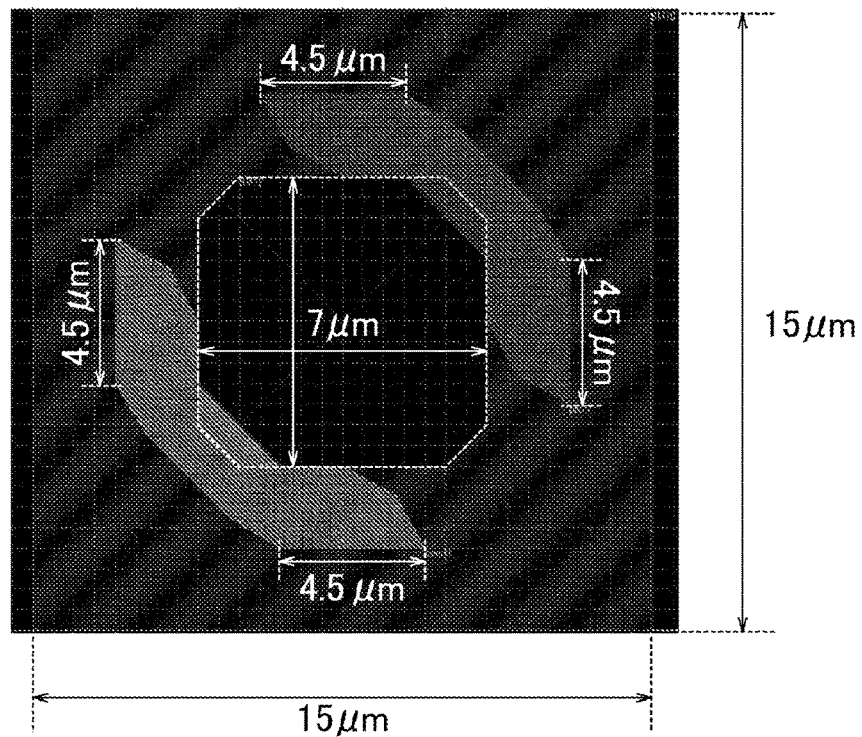
FIG. 54 is a plan view showing in extracted form the pixel electrode and the common electrode of Working Example 7.

When a specific simulation for the liquid crystal display device of Embodiment 7 was performed, the following results were obtained (Working Example 7). FIG. 54 is a plan view showing in extracted form the pixel electrode and the common electrode of Working Example 7. The simulation conditions for Working Example 7 are the same as those for Working Example 1 except for the form of the pixel electrode and common electrode. The lengths of the outer profile lines at both end portions of the pixel electrode and the common electrode were set to 4.5 µm. The inner profile lines of the pixel electrode and the common electrode were formed using five lines inclined at different angles, and the angles formed between the lines were all obtuse. More specifically, angles between, among the five lines, the centrally-positioned line (inner profile line of the corner portion) and the lines on either side thereof were set to 135°. Further, angles between the outer profile line of the corner portion that links the outer profile lines of the end portions, and the outer profile lines of the end portions were set to 45°. A distance between the pixel electrode and the common electrode (specifically, the length of a straight line linking a deepest part of the corner portion of the pixel electrode to a deepest part of a corner portion of the common electrode) was set to 7.1 (=5√2) µm.

Figure 55:
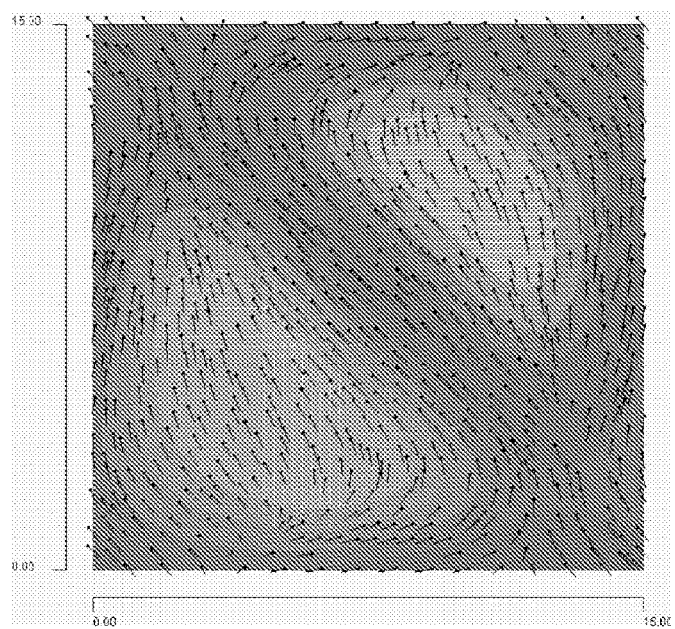
FIG. 55 is a simulation plan image illustrating behavior of the liquid crystal molecules in Working Example 7.

FIG. 55 is a simulation plan image illustrating behavior of the liquid crystal molecules in Working Example 7. As shown in FIG. 55, compared with the Working Examples 1 to 4, the liquid crystal molecules contained in the first segmented area D1 have a smaller range over which the desired orientation can be obtained due to the inclusion of the two lines forming a substantial right angle among the inner profile lines of the electrodes. Even so, the liquid crystal molecules are mostly aligned along the inner profile lines of the electrodes in a direction that is at approximately 45° to the initial orientation direction. Further, the change in angle is smooth and uniform. Similarly, compared with the Working Examples 1 to 4, the liquid crystal molecules contained in the second segmented area D2 have a smaller range over which the desired orientation can be obtained due to the inclusion of the two lines forming a right angle among the inner profile lines of the electrodes. Even so, the liquid crystal molecules are mostly aligned along the inner profile lines of the electrodes in a direction that is at approximately 45° to the initial orientation direction. Further, the change in angle is smooth and uniform. Note also that, as illustrated in FIG. 55, the electric field in the area between the electrodes follows the inner profile lines of the electrodes, resulting in the formation of equipotential area boundaries with a right-angled triangular form.

Figure 56:
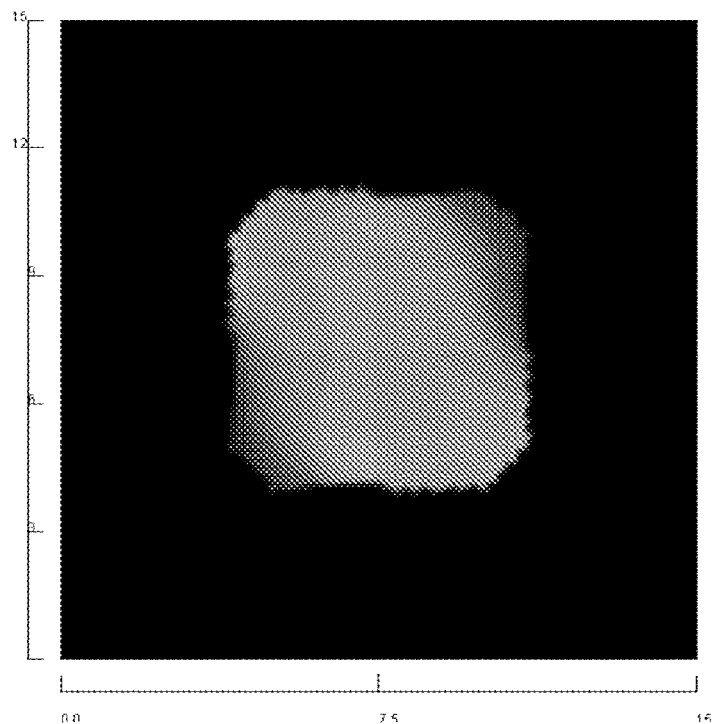
FIG. 56 is a plan image showing light transmittance using monochrome gradation for Working Example 7.
Figure 57:
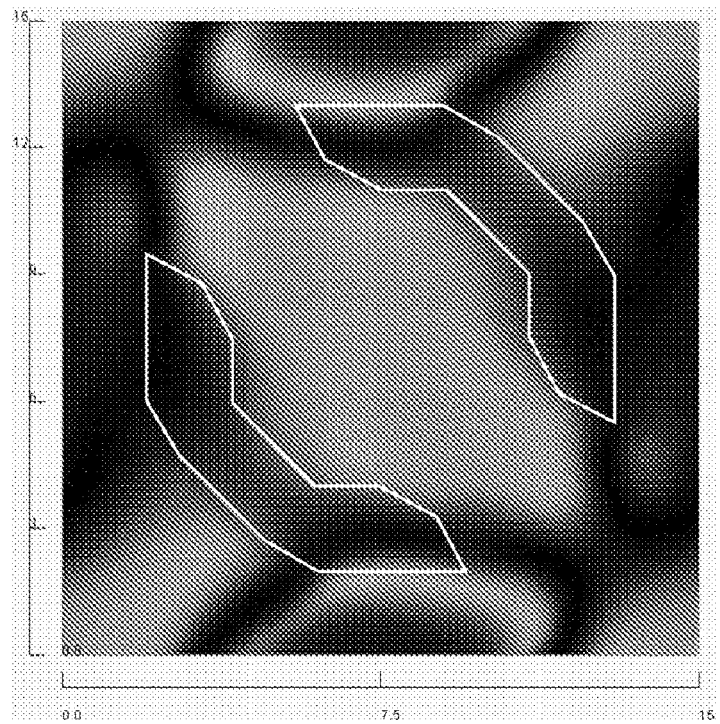
FIG. 57 is a plan image showing an enlargement of FIG. 56 with positions of electrodes added.
Figure 58:
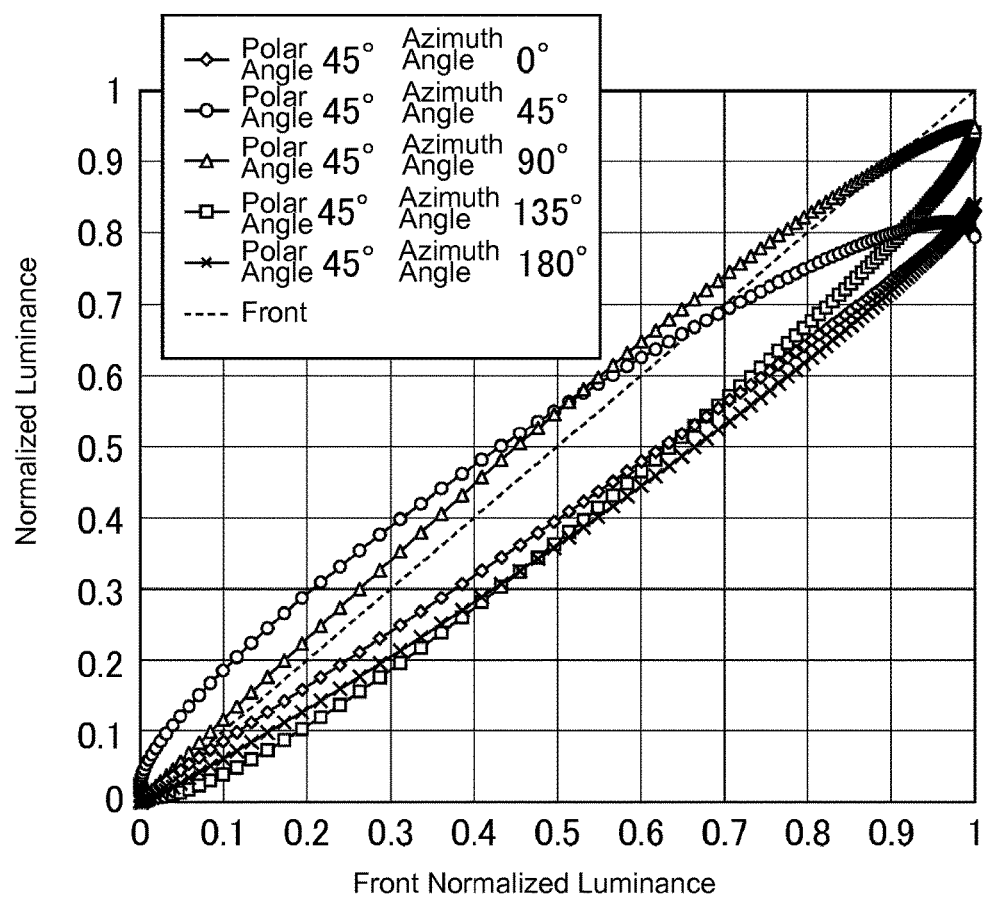
FIG. 58 is a graph showing viewing angle characteristics of Working Example 7.

FIG. 56 is a plan image showing light transmittance using monochrome gradation for Working Example 7, and FIG. 57 is an enlarged view of FIG. 56 with the electrode positions added. FIG. 58 is a graph showing viewing angle characteristics of Working Example 7. As illustrated in FIGS. 56 and 57, it can be seen from Working Example 7 that although transmittance drops slightly in the corners of the region that forms the opening in the black matrix, sufficient transmittance can be secured when the region is viewed as whole. With regard to viewing angle characteristics, although there is some variation in the positions of the end portions of the curves as illustrated in FIG. 58, brightness does not vary greatly with angle. Thus, it is clear that a substantially uniform display can be obtained irrespective of viewing angle inclination. For Working Example 7 too, in the case that the combination of the pixel electrode and the common electrode represents a single electrode pair and the simulation is performed for two electrode pairs, simulation results similar to those shown in FIG. 13 for Working Example 1 can be obtained.

Thus, with Embodiment 7 too, it was confirmed to be possible to obtain satisfactory transmittance and viewing angle characteristics. Further, in Embodiment 7, the inner profile lines of the electrodes include two mutually perpendicular lines. Hence, substantially the same display characteristics can be obtained whether the initial orientation of the liquid crystal molecules is vertical or horizontal. This arrangement has the advantage of increasing the degree of freedom available in the design.

Embodiment 8

Figure 59:
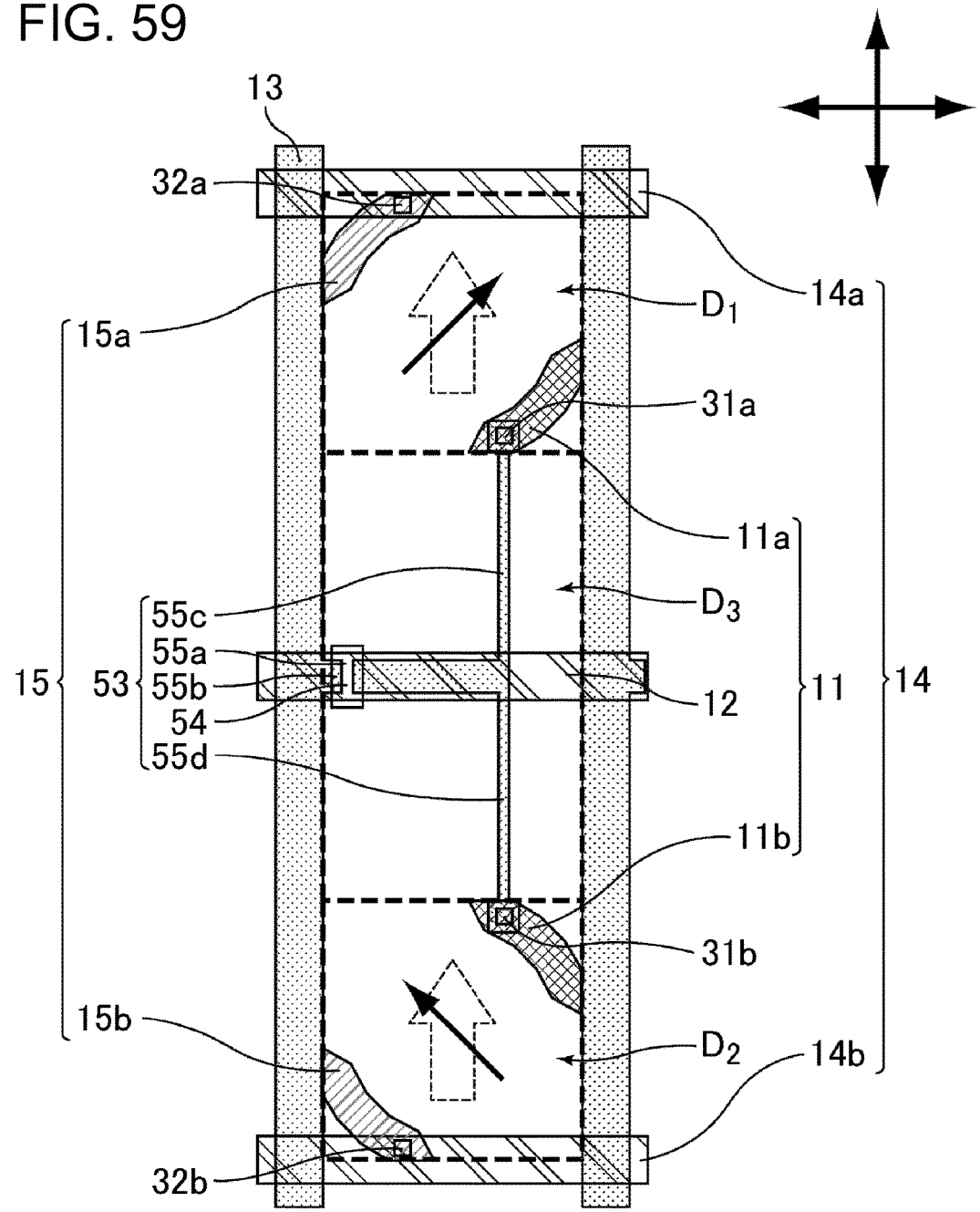
FIG. 59 is a schematic plan view showing a TFT substrate of the liquid crystal display device of Embodiment 8.
Figure 60:
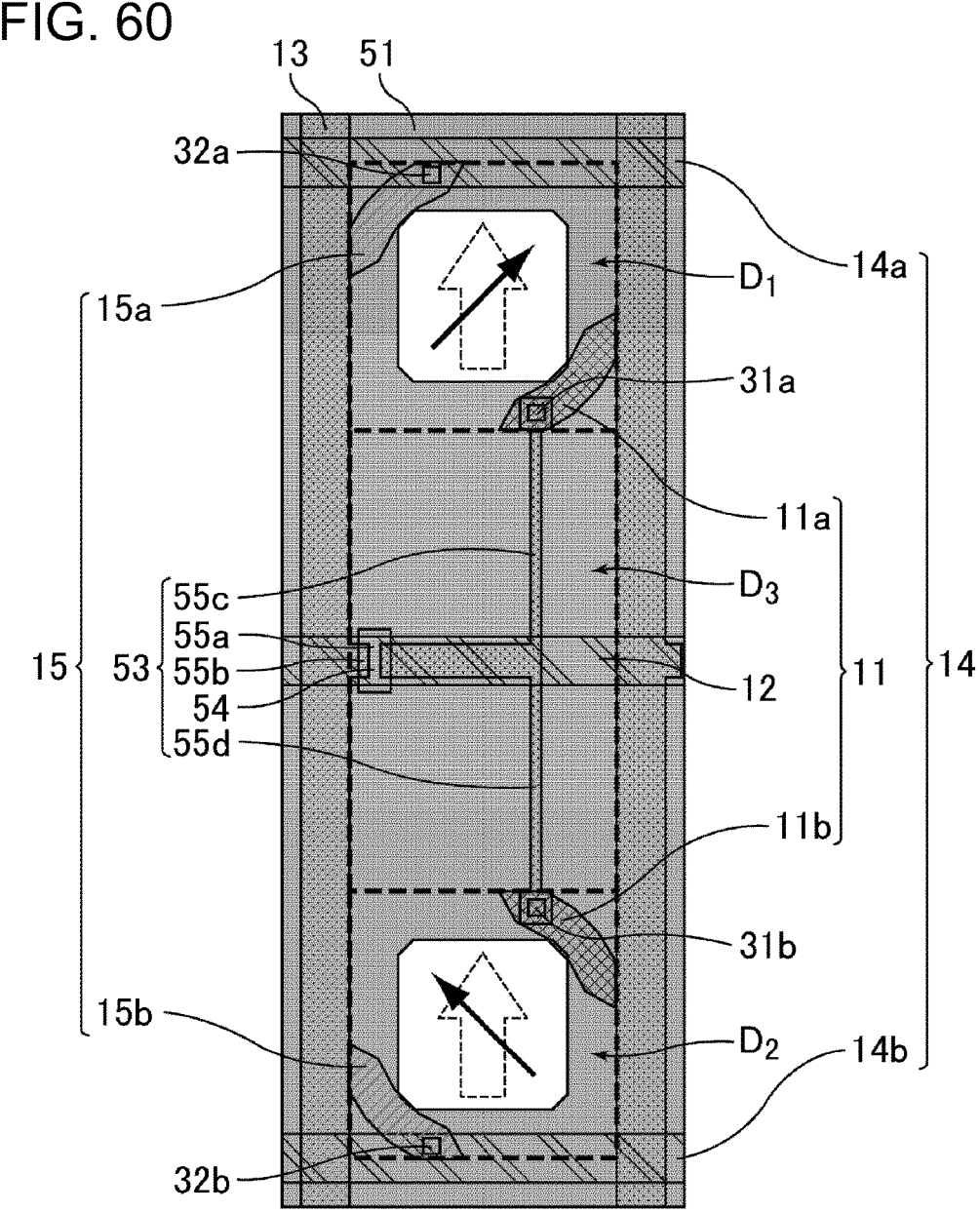
FIG. 60 is a schematic plan view showing the TFT substrate of Embodiment 8 with the location of a black matrix added.

Embodiment 8 is the same as Embodiment 1 except in that the form of the pixel electrode and common electrode differs. In Embodiment 8, a length of both end portions of the electrodes and a length of the inner profile line of the corner portion are shorter than those of Embodiment 1. FIG. 59 is a schematic plan view of the TFT substrate of the liquid crystal display device of Embodiment 8, and FIG. 60 is a schematic plan view with the location of the black matrix added.

Figure 61:
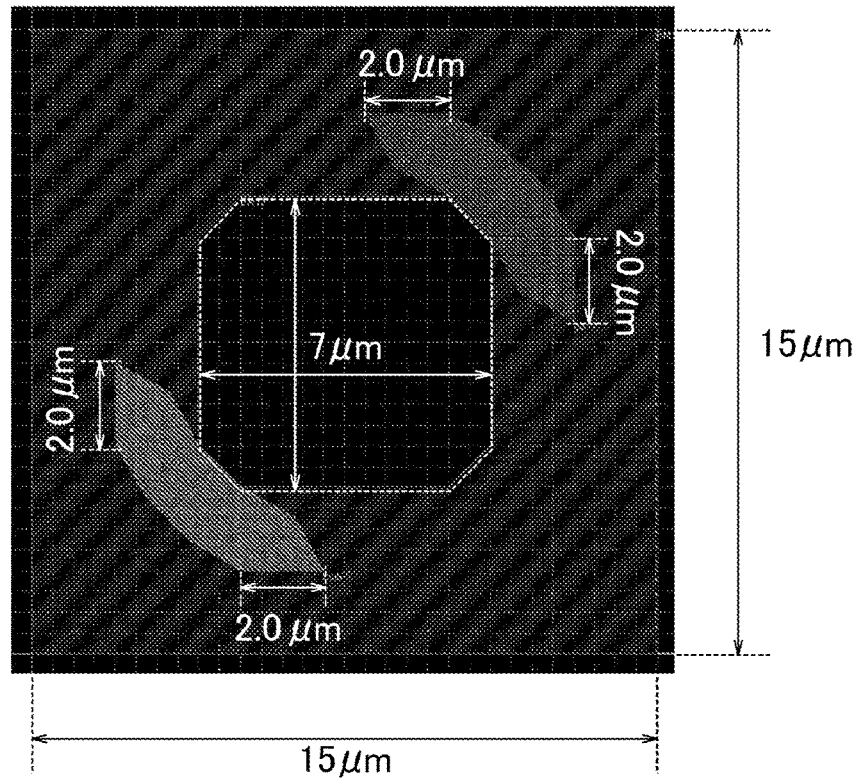
FIG. 61 is a plan view showing in extracted form the pixel electrode and the common electrode of Working Example 8.

When a specific simulation for the liquid crystal display device of Embodiment 8 was performed, the following results were obtained (Working Example 8). FIG. 61 is a plan view showing in extracted form the pixel electrode and the common electrode of Working Example 8. The simulation conditions for Working Example 8 are the same as those for Working Example 1 except for the form of the pixel electrode and common electrode. The lengths of the outer profile lines at both end portions of the pixel electrode and the common electrode were set to 2.0 μm. The inner profile lines of the pixel electrode and the common electrode were formed using five lines inclined at different angles, and the angles formed between the lines were all obtuse. More specifically, angles between, among the five lines, the centrally-positioned line (inner profile line of the corner portion) and the lines on either side thereof were set to 157°. Further, angles between the outer profile line of the corner portion that links the outer profile lines of the end portions, and the outer profile lines of the end portions were set to 30°. A distance between the pixel electrode and the common electrode (specifically, the length of a straight line linking a deepest part of the corner portion of the pixel electrode to a deepest part of a corner portion of the common electrode) was set to 8.5 (=6√2) μm.

Figure 62:
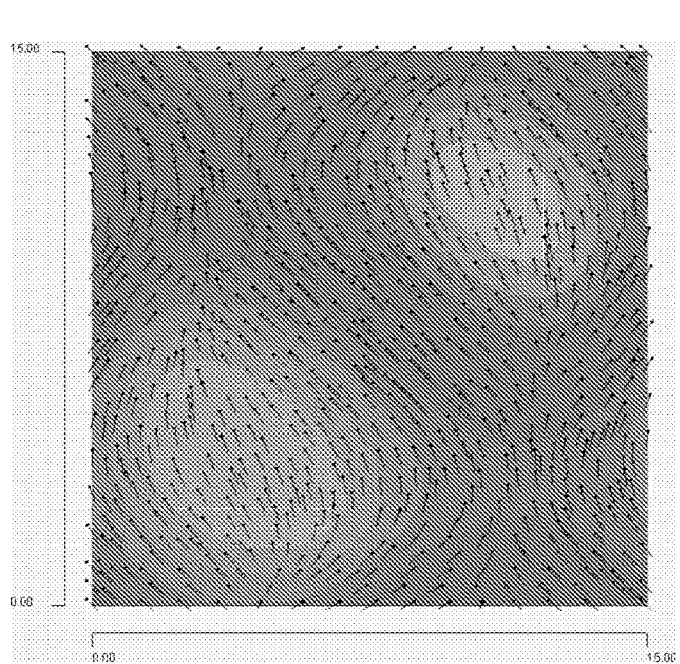
FIG. 62 is a simulation plan image illustrating behavior of the liquid crystal molecules in Working Example 8.

FIG. 62 is a simulation plan image illustrating behavior of the liquid crystal molecules in Working Example 8. As shown in FIG. 62, for the liquid crystal molecules contained in the first segmented area D1, the area over which the desired electric field can be obtained is smaller than in Working Examples 1 to 4. Even so, the liquid crystal molecules are mostly aligned with the inner profile lines of the electrodes, and thus aligned in a direction that is at approximately 45° to the initial orientation direction. Further, the change in angle is smooth and uniform. Similarly, for the liquid crystal molecules contained in the second segmented area D2, the area over which the desired electric field can be obtained is smaller than in Working Examples 1 to 4. Even so, the liquid crystal molecules are mostly aligned with the inner profile lines of the electrodes, and thus aligned in a direction that is at approximately 45° to the initial orientation direction. Further, the change in angle is smooth and uniform. Note also that, as illustrated in FIG. 62, the electric field in the area between the electrodes follows the inner profile lines of the electrodes, resulting in the formation of equipotential area boundaries that are triangular with rounded corners.

Figure 63:
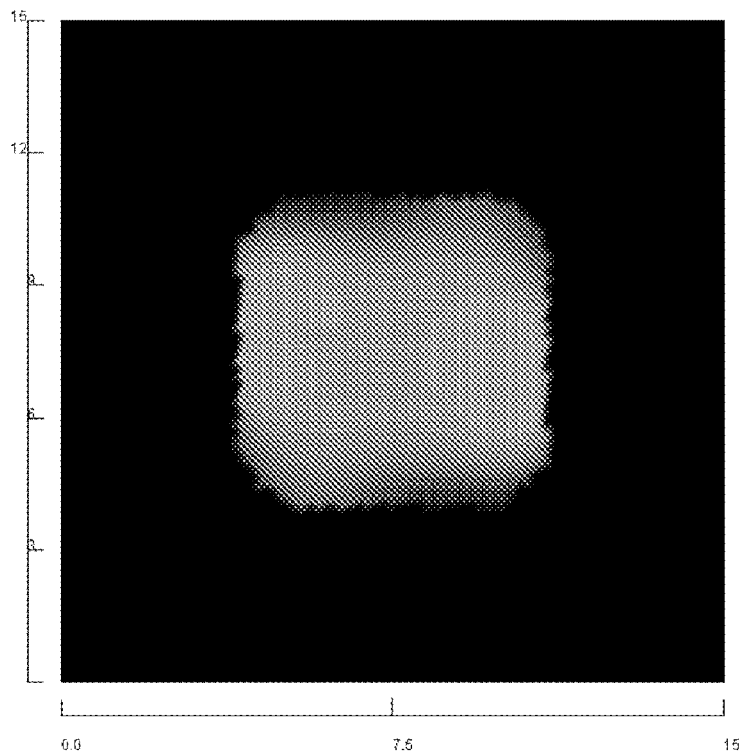
FIG. 63 is a plan image showing light transmittance using monochrome gradation for Working Example 8.
Figure 64:
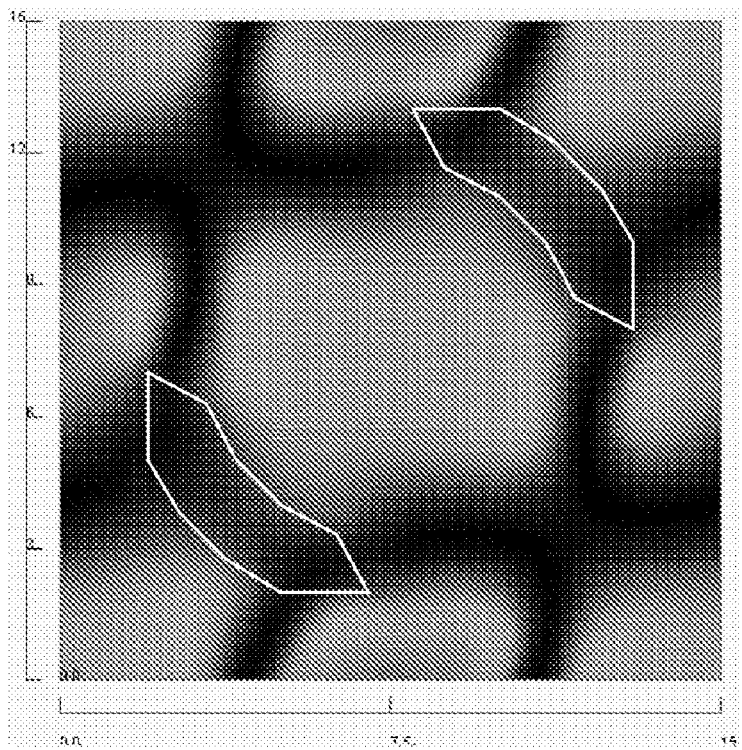
FIG. 64 is a plan image showing an enlargement of FIG. 63 with positions of electrodes added.
Figure 65:
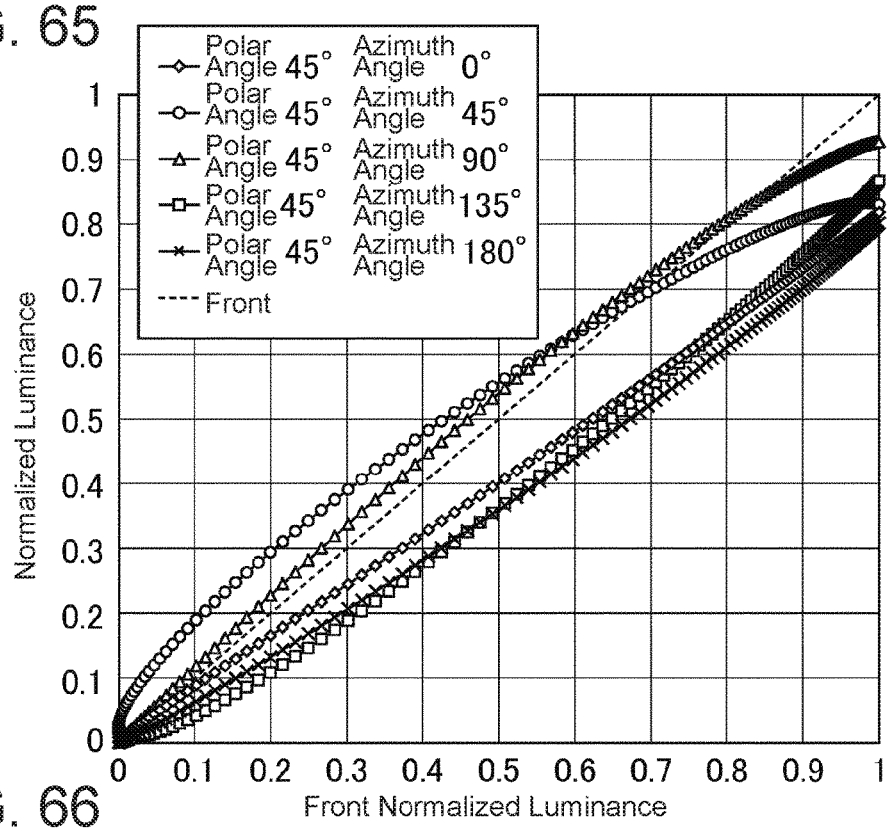
FIG. 65 is a graph showing viewing angle characteristics of Working Example 8.
Figure 66:
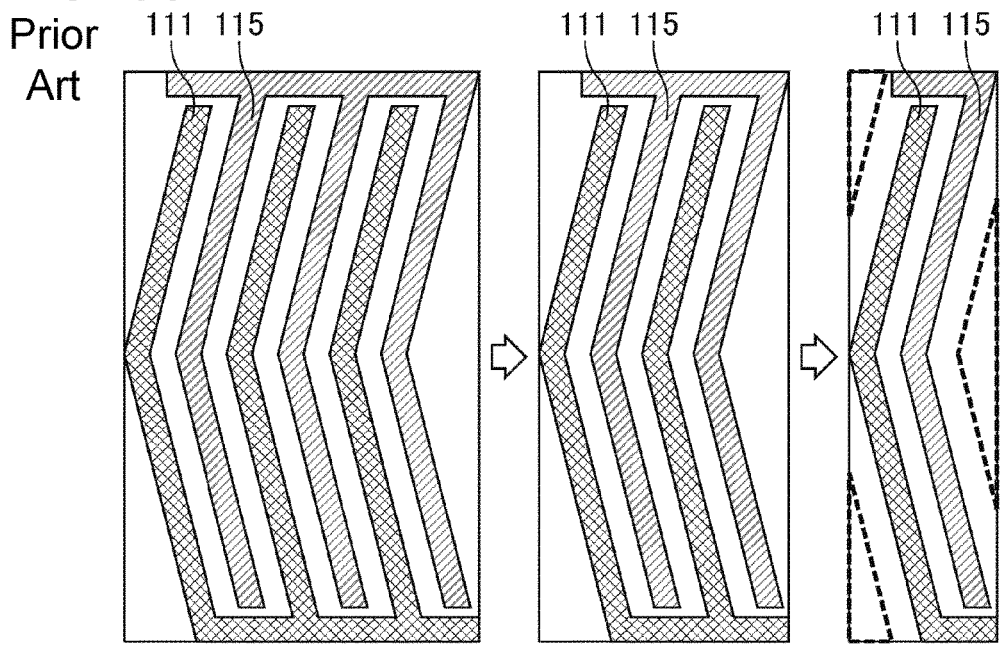
FIG. 66 is a schematic plan view showing an example of electrode arrangements in a conventional IPS mode liquid crystal display device.

FIG. 63 is a plan image showing light transmittance using monochrome gradation for Working Example 8, and FIG. 64 is an enlarged view of FIG. 63 with the electrode positions added. FIG. 64 is a graph showing viewing angle characteristics of Working Example 8. As illustrated in FIGS. 63 and 64, it can be seen from Working Example 8 that although transmittance drops slightly along the side of the region that forms the opening in the black matrix, sufficient transmittance can be secured when the region is viewed as whole. With regard to viewing angle characteristics, as illustrated in FIG. 65, there is greater variation in the positions of the end portions of the curves than in Working Examples 1 to 7, leading to small differences in brightness according to angle. While this does cause degradation in viewing angle characteristics, it is clear that, when viewed as a whole, this example still provides a substantially uniform display. For Working Example 8 too, in the case that the combination of the pixel electrode and the common electrode represents a single electrode pair and the simulation is performed for two electrode pairs, simulation results similar to those shown in FIG. 13 for Working Example 1 can be obtained.

Thus, with Embodiment 8 too, it was confirmed to be possible to obtain satisfactory transmittance and viewing angle characteristics.

Note that in Embodiments 3 to 5, 7 and 8, explanations were made on the assumption that alignment treatment had been performed vertically in the manner of Embodiment 1, but the alignment treatment may also be performed horizontally in the manner of Embodiment 2.

DESCRIPTION OF REFERENCE CHARACTERS

10 TFT substrate
11 pixel electrode (second hook-like electrode)
11*a* first pixel electrode
11*b* second pixel electrode
12 scan signal line
13 data signal line
14 common signal line
14*a* first common signal line
14*b* second common signal line
15 common electrode (first hook-like electrode)
15*a* first common electrode
15*b* second common electrode
20 opposite substrate
31, 32 contact
31*a*, 32*a* first contact
31*b*, 32*b* second contact
40 liquid crystal layer
41 liquid crystal molecules
51 black matrix
53 TFT
54 semiconductor layer
55*a* gate electrode
55*b* source electrode
55*c* first drain electrode
55*d* second drain electrode
61, 62 supporting substrate
111 pixel electrode (comb-tooth projections)
115 common electrode (comb-tooth projections)
D1 first segmented area
D2 second segmented area
D3 middle area

What is claimed is:

1. A liquid crystal display device, comprising:
a first substrate;
a second substrate; and
a liquid crystal layer sandwiched between said first substrate and said second substrate,
wherein said liquid crystal layer includes liquid crystal material having negative dielectric anisotropy,
wherein said first substrate includes a first hook-like electrode and a second hook-like electrode that are electrically isolated from each other,
wherein, when said first substrate is seen in a plan view, an inner profile line of said first hook-like electrode and an inner profile line of said second hook-like electrode face one another, and
wherein, when said first substrate is seen in a plan view, said first hook-like electrode and said second hook-like electrode are point-symmetrical to each other about a reference point located between said first hook-like electrode and said second hook-like electrode.

2. The liquid crystal display device according to claim 1, wherein, when said first substrate is seen in a plan view, a tip of at least one end portion of said first hook-like electrode is pointed.

3. The liquid crystal display device according to claim 1, wherein, when said first substrate is seen in a plan view, a tip of at least one end portion of said second hook-like electrode is pointed.

4. The liquid crystal display device according to claim 1, wherein, when said first substrate is seen in a plan view, the inner profile line of said first hook-like electrode is formed by at least three lines having different angles.

5. The liquid crystal display device according to claim 1, wherein, when said first substrate is seen in a plan view, the inner profile line of said second hook-like electrode is formed by at least three lines having different angles.

6. The liquid crystal display device according to claim 1, wherein, when said first substrate is seen in a plan view, any line among at least three lines having different angles of the inner profile line of said first hook-like electrode is parallel to a line among at least three lines having different angles of the inner profile line of said second hook-like electrode.

7. The liquid crystal display device according to claim 4, wherein, when said first substrate is seen in a plan view, two lines among the at least three lines having different angles of the inner profile line of said first hook-like electrode are perpendicular to each other.

8. The liquid crystal display device according to claim 5, wherein, when said first substrate is seen in a plan view, two lines among the at least three lines having different angles of the inner profile line of said second hook-like electrode are perpendicular to each other.

9. The liquid crystal display device according to claim 1, wherein, when said first substrate is seen in a plan view, the inner profile line of said first hook-like electrode is curved.

10. The liquid crystal display device according to claim 1, wherein, when said first substrate is seen in a plan view, the inner profile line of said second hook-like electrode is curved.

11. The liquid crystal display device according to claim 1, wherein, when said first substrate is seen in a plan view, said first hook-like electrode and said second hook-like electrode are line-symmetrical to each other about a straight reference axis that passes between said first hook-like electrode and said second hook-like electrode.

12. The liquid crystal display device according to claim 1, wherein, said first hook-like electrode and said second hook-like electrode are provided in a same layer.

13. The liquid crystal device according to claim 1,
wherein said first substrate has a plurality of electrode pairs, each pair comprising said first hook-like electrode and said second hook-like electrode,
wherein said first hook-like electrodes and said second hook-like electrodes included in each of two mutually adjacent electrode pairs are line-symmetrical to each other about a straight reference axis that passes between said electrode pairs, and
wherein a hook-like electrode located further from said reference axis is said first hook-like electrode and a hook-like electrode located nearer to said reference axis is said second hook-like electrode.

14. The liquid crystal display device according to claim 13, further comprising a scan signal line that passes between said second hook-like electrodes of said two mutually adjacent electrode pairs.

15. The liquid crystal display device according to claim 13, further comprising a switching element connected to each of said second hook-like electrodes of said two mutually adjacent electrode pairs.

16. The liquid crystal device according to claim 1,
wherein said first substrate further includes a first polarizing plate, and said second substrate further includes a second polarizing plate,
wherein a polarizing axis of said first polarizing plate is perpendicular to a polarizing axis of said second polarizing plate,
wherein, when said first substrate is seen in a plan view, the inner profile line of said first hook-like electrode is arranged so as to form an angle with the polarizing axis of said first polarizing plate and the polarizing axis of said second polarizing plate, and
wherein, when said first substrate is seen in a plan view, the inner profile line of said second hook-like electrode is arranged so as to form an angle with the polarizing axis of said first polarizing plate and the polarizing axis of said second polarizing plate.

17. The liquid crystal display device according to claim 1, wherein a rectangular area generally defined by the first hook-like electrode and the second hook-like electrode has an aspect ratio of 1.

* * * * *